US011737102B2

(12) United States Patent
Lee et al.

(10) Patent No.: US 11,737,102 B2
(45) Date of Patent: Aug. 22, 2023

(54) DETERMINING PHYSICAL CHANNEL RESOURCES IN A WIRELESS NETWORK

(71) Applicant: INTERDIGITAL PATENT HOLDINGS, INC., Wilmington, DE (US)

(72) Inventors: Moon-il Lee, Melville, NY (US); Janet A. Stern-Berkowitz, Little Neck, NY (US); Erdem Bala, East Meadow, NY (US); Afshin Haghighat, Ile-Bizard (CA); Mihaela C. Beluri, Jericho, NY (US)

(73) Assignee: InterDigital Patent Holdings, Inc., Wilmington, DE (US)

( * ) Notice: Subject to any disclaimer, the term of this patent is extended or adjusted under 35 U.S.C. 154(b) by 0 days.

(21) Appl. No.: 17/584,998

(22) Filed: Jan. 26, 2022

(65) Prior Publication Data

US 2022/0150887 A1    May 12, 2022

Related U.S. Application Data

(63) Continuation of application No. 16/088,681, filed as application No. PCT/US2017/025196 on Mar. 30, 2017, now Pat. No. 11,272,483.

(Continued)

(51) Int. Cl.
*H04W 72/21*   (2023.01)
*H04W 72/0446* (2023.01)
(Continued)

(52) U.S. Cl.
CPC ......... *H04W 72/21* (2023.01); *H04W 52/365* (2013.01); *H04W 52/367* (2013.01);
(Continued)

(58) Field of Classification Search
None
See application file for complete search history.

(56) References Cited

U.S. PATENT DOCUMENTS

| 8,649,346 B2 | 2/2014 | Park |
| 9,106,419 B2 | 8/2015 | Chen et al. |
| (Continued) | | |

FOREIGN PATENT DOCUMENTS

| CN | 102740407 A | 10/2012 |
| CN | 102740462 A | 10/2012 |
| (Continued) | | |

OTHER PUBLICATIONS

Ericsson, "Downlink control signaling design for short TTI," 3GPP TSG RAN WG1 Meeting #84 bis, R1-163322, Busan (Apr. 11-15, 2016).

(Continued)

*Primary Examiner* — Phirin Sam
(74) *Attorney, Agent, or Firm* — Volpe Koenig

(57) ABSTRACT

A method performed by a wireless transmit/receive unit (WTRU) may include receiving configuration information for reporting a power headroom (PH) associated with each of a plurality of cells, wherein a first cell uses first time intervals each having a first length and a second cell uses second time intervals each having a second length. The method may include transmitting a first uplink transmission using a first carrier frequency associated with the first cell and transmitting, in one of the second time intervals that is fully overlapped by the one of the first time intervals, based on the received configuration information, a report including information indicating a first PH corresponding to the one of the first time intervals and a second PH corresponding to the earliest one in time of the second time intervals that is fully overlapped by the one of the first time intervals.

14 Claims, 17 Drawing Sheets

Related U.S. Application Data

(60) Provisional application No. 62/377,181, filed on Aug. 19, 2016, provisional application No. 62/334,888, filed on May 11, 2016, provisional application No. 62/315,490, filed on Mar. 30, 2016.

(51) Int. Cl.
| | |
|---|---|
| *H04W 52/36* | (2009.01) |
| *H04W 72/23* | (2023.01) |
| *H04W 52/44* | (2009.01) |
| *H04W 52/34* | (2009.01) |
| *H04W 52/14* | (2009.01) |
| *H04L 1/1812* | (2023.01) |
| *H04W 84/04* | (2009.01) |

(52) U.S. Cl.
CPC ....... *H04W 72/0446* (2013.01); *H04W 72/23* (2023.01); *H04L 1/1812* (2013.01); *H04W 52/146* (2013.01); *H04W 52/34* (2013.01); *H04W 52/44* (2013.01); *H04W 84/042* (2013.01)

(56) References Cited

U.S. PATENT DOCUMENTS

| | | | |
|---|---|---|---|
| 9,553,697 | B2 | 1/2017 | Chen et al. |
| 9,559,827 | B2 * | 1/2017 | Kwong .............. H04W 52/365 |
| 9,749,992 | B2 | 8/2017 | Zhang et al. |
| 9,756,583 | B2 | 9/2017 | Hwang et al. |
| 10,491,335 | B2 | 11/2019 | Rudolf et al. |
| 10,893,486 | B2 * | 1/2021 | Dinan .................. H04L 5/0007 |
| 2010/0098012 | A1 | 4/2010 | Bala et al. |
| 2012/0113944 | A1 | 5/2012 | Yang et al. |
| 2012/0269138 | A1 | 10/2012 | Han et al. |
| 2014/0241298 | A1 | 8/2014 | Park et al. |
| 2015/0271811 | A1 * | 9/2015 | Kim ...................... H04W 52/34 370/329 |
| 2016/0164622 | A1 | 6/2016 | Yi et al. |
| 2016/0183244 | A1 | 6/2016 | Papasakellariou |
| 2016/0255594 | A1 * | 9/2016 | Vajapeyam ......... H04W 52/346 455/522 |
| 2016/0270066 | A1 | 9/2016 | Heo et al. |
| 2016/0302209 | A1 * | 10/2016 | Behravan ............ H04W 72/541 |
| 2017/0215206 | A1 | 7/2017 | Cheng |
| 2017/0230994 | A1 | 8/2017 | You et al. |
| 2018/0199336 | A1 | 7/2018 | Han et al. |
| 2018/0205534 | A1 | 7/2018 | Yi |
| 2018/0234998 | A1 | 8/2018 | You |
| 2018/0249428 | A1 | 8/2018 | Huang et al. |
| 2018/0249458 | A1 | 8/2018 | He et al. |
| 2018/0263021 | A1 | 9/2018 | He et al. |
| 2018/0302916 | A1 | 10/2018 | Lee et al. |
| 2018/0331898 | A1 | 11/2018 | Song et al. |
| 2018/0343645 | A1 | 11/2018 | Papasakellariou et al. |
| 2018/0359068 | A1 | 12/2018 | Kim et al. |
| 2019/0020381 | A1 * | 1/2019 | Tooher ................. H04W 88/04 |
| 2019/0268929 | A1 | 8/2019 | Lee et al. |
| 2019/0335463 | A1 | 10/2019 | Ng et al. |
| 2020/0154416 | A1 | 5/2020 | He et al. |
| 2020/0162224 | A1 | 5/2020 | Ahn et al. |
| 2020/0235892 | A1 | 7/2020 | Marinier et al. |
| 2020/0252928 | A1 | 8/2020 | Park et al. |
| 2020/0295865 | A1 | 9/2020 | Yang et al. |

FOREIGN PATENT DOCUMENTS

| | | |
|---|---|---|
| EP | 3 261 395 | 12/2017 |
| WO | 2015/105057 | 7/2015 |
| WO | 2015/116866 | 8/2015 |
| WO | 2017/173038 | 10/2017 |

OTHER PUBLICATIONS

Ericsson, "Link level evaluation of PUCCH for short TTI," 3GPP TSG RAN WG1 Meeting #84, R1-161169, Malta (Feb. 15-19, 2016).

Ericsson, "Physical layer aspects for PUCCH for short TTI," 3GPP TSG RAN WG1 Meeting #84 bis, R1-163321, Busan (Apr. 11-15, 2016).

Lenovo, "Considerations on TTI shortening for UL," 3GPP TSG RAN WG1 Meeting #84, R1-161018, St Julian's, Malta (Feb. 15-19, 2016).

Nokia Networks et al., "PUCCH design for sTTI," 3GPP TSG-RAN WG1 Meeting #84, R1-160805, St. Julian's, Malta (Feb. 15-19, 2016).

Ericsson, "DCI for short TTI uplink transmissions," 3GPP TSG RAN WG1 Meeting #84, R1-160938, Malta (Feb. 15-19, 2016).

Ericsson, "Physical layer aspects of short TTI for downlink transmissions,"3GPP TSG RAN WG1 Meeting #84, R1-160934, Malta (Feb. 15-19, 2016).

Ericsson, "sPUSCH power control and PHR report for sTTI,"3GPP TSG-RAN WG1 Meeting #88bis, R1-1706090, Spokane, US (Apr. 3-7, 2017).

Huawei et al., "PHR reporting in different TTI lengths,"3GPP TSG-RAN WG2 NR Ad-hoc, R2-1706478, Qingdao, China (Jun. 27-29, 2017).

Huawei et al., "Remaining issues for dynamic adaptation of PUCCH formats for HARQ-ACK feedback,"3GPP TSG RAN WG1 Meeting #83, R1-156453, Anaheim, USA (Nov. 15-22, 2015).

Huawei et al., "Short TTI for UL transmissions,"3GPP TSG RAN WG1 Meeting #84, R1-160294, St Julian's, Malta (Feb. 15-19, 2016).

Intel Corporation, "Discussion on PHR requirement for sTTI,"3GPP TSG-RAN WG4 Meeting #82bis, R4-1702971, Spokane, US (Apr. 3-7, 2017).

Interdigital Communications, "On sPUCCH Design,"3GPP TSG RAN WG1 Meeting #86bis, R1-1610098, Lisbon, Portugal (Oct. 10-14, 2016).

Interdigital Communications, "On sPUCCH Format Design," 3GPP TSG RAN WG1 Meeting #88, R1-1702306, Athens, Greece (Feb. 13-17, 2017).

Interdigital Communications, "On sPUSCH Design," 3GPP TSG RAN WG1 Meeting #86, R1-167658, Gothenburg, Sweden (Aug. 22-26, 2016).

Interdigital Communications, "Support for Short TTIs and Processing Times in LTE," 3GPP TSG-RAN WG1 #83, R1-157136, Anaheim, USA (Nov. 16-20, 2015).

Interdigital, "Consideration on sPUSCH Design," 3GPP TSG RAN WG1 Meeting #85, R1-165052, Nanjing, China (May 23-27, 2016).

Interdigital, "Short TTI PUCCH Design," 3GPP TSG RAN WG1 Meeting #84bis, R1-162965, Busan, Korea (Apr. 11-15, 2016).

LG Electronics, "Discussion on PUCCH design for Latency reduction," 3GPP TSG RAN WG1 Meeting #84, R1-160654, St Julian's, Malta (Feb. 15-19, 2016).

Nokia Networks et al., "Considerations on shorter TTI for TDD duplex mode," 3GPP TSG-RAN WG1 Meeting #84, R1-160780, St Julian's, Malta (Feb. 15-19, 2016).

Nokia Networks et al., "Remaining issues of dual connectivity," 3GPP TSG-RAN WG1 Meeting #78, R1-143245, Dresden, Germany (Aug. 18-22, 2014).

Third Generation Partnership Project, "Technical Specification Group Radio Access Network; Evolved Universal Terrestrial Radio Access (E-UTRA); Physical channels and modulation (Release 12)," 3GPP TS 36.211 V12.3.0 (Sep. 2014).

Third Generation Partnership Project, "Technical Specification Group Radio Access Network; Evolved Universal Terrestrial Radio Access (E-UTRA); Physical channels and modulation (Release 13)," 3GPP TS 36.211 V13.1 .0 (Mar. 2016).

Third Generation Partnership Project, "Technical Specification Group Radio Access Network; Evolved Universal Terrestrial Radio Access (E-UTRA); Physical channels and modulation (Release 13)," 3GPP TS 36.211 V13.5.0 (Mar. 2017).

(56) References Cited

OTHER PUBLICATIONS

Third Generation Partnership Project, "Technical Specification Group Radio Access Network; Evolved Universal Terrestrial Radio Access (E-UTRA); Physical channels and modulation (Release 14)," 3GPP TS 36.211 V14.2.0 (Mar. 2017).
Third Generation Partnership Project, "Technical Specification Group Radio Access Network; Evolved Universal Terrestrial Radio Access (E-UTRA); Physical layer procedures (Release 12)," 3GPP TS 36.213 V12.7.0 (Sep. 2015).
Third Generation Partnership Project, "Technical Specification Group Radio Access Network; Evolved Universal Terrestrial Radio Access (E-UTRA); Physical layer procedures (Release 13)," 3GPP TS 36.213 V13.1.0 (Mar. 2016).
Third Generation Partnership Project, "Technical Specification Group Radio Access Network; Evolved Universal Terrestrial Radio Access (E-UTRA); Physical layer procedures (Release 13)," 3GPP TS 36.213 V13.5.0 (Mar. 2017).
Third Generation Partnership Project, "Technical Specification Group Radio Access Network; Evolved Universal Terrestrial Radio Access (E-UTRA); Physical layer procedures (Release 14)," 3GPP TS 36.213 V14.2.0 (Mar. 2017).
Third Generation Partnership Project, "Technical Specification Group Radio Access Network; Evolved Universal Terrestrial Radio Access (E-UTRA); Medium Access Control (MAC) protocol specification (Release 13)," 3GPP TS 36.321 V13.0.0 (Dec. 2015).
Third Generation Partnership Project, "Technical Specification Group Radio Access Network; Evolved Universal Terrestrial Radio Access (E-UTRA); Medium Access Control (MAC) protocol specification (Release 13)," 3GPP TS 36.321 V13.2.0 (Jun. 2016).
Third Generation Partnership Project, "Technical Specification Group Radio Access Network; Evolved Universal Terrestrial Radio Access (E-UTRA); Medium Access Control (MAC) protocol specification (Release 13)," 3GPPTS 36.321 V13.5.0 (Mar. 2017).
Third Generation Partnership Project, "Technical Specification Group Radio Access Network; Evolved Universal Terrestrial Radio Access (E-UTRA);Medium Access Control (MAC) protocol specification (Release 14)," 3GPP TS 36.321 V14.2.0 (Mar. 2017).
Third Generation Partnership Project, "Technical Specification Group Radio Access Network; Evolved Universal Terrestrial Radio Access (E-UTRA) and Evolved Universal Terrestrial Radio Access Network (E-UTRAN); Overall description; Stage 2 (Release 13)," 3GPP TS 36.300 V13.2.0 (Dec. 2015).
Third Generation Partnership Project, "Technical Specification Group Radio Access Network; Evolved Universal Terrestrial Radio Access (E-UTRA) and Evolved Universal Terrestrial Radio Access Network (E-UTRAN); Overall description; Stage 2 (Release 13)," 3GPP TS 36.300 V13.7.0 (Mar. 2017).
Third Generation Partnership Project, "Technical Specification Group Radio Access Network; Evolved Universal Terrestrial Radio Access (E-UTRA) and Evolved Universal Terrestrial Radio Access etwork (E-UTRAN); Overall description; Stage 2 (Release 14)," 3GPPTS 36.300 V14.1.0 (Dec. 2016).
Third Generation Partnership Project, "Technical Specification Group Radio Access Network; Evolved Universal Terrestrial Radio Access (E-UTRA); Radio Resource Control (RRC); Protocol specification (Release 12)," 3GPP TS 36.331 V13.0.0 (Dec. 2015).
Third Generation Partnership Project, "Technical Specification Group Radio Access Network; Evolved Universal Terrestrial Radio Access (E-UTRA); Radio Resource Control (RRC); Protocol specification (Release 13)," 3GPPTS 36.331 V13.5.0 (Mar. 2017).
Third Generation Partnership Project, "Technical Specification Group Radio Access Network; Evolved Universal Terrestrial Radio Access (E-UTRA); Radio Resource Control (RRC); Protocol specification (Release 14)," 3GPPTS 36.331 V14.2.0 (Mar. 2017).
Third Generation Partnership Project, "Technical Specification Group Radio Access Network; Evolved Universal Terrestrial Radio Access (E-UTRA); Multiplexing and channel coding (Release 13)," 3GPP TS 36.212 V13.1.0 (Mar. 2016).
Third Generation Partnership Project, "Technical Specification Group Radio Access Network; Evolved Universal Terrestrial Radio Access (E-UTRA); Multiplexing and channel coding (Release 13)," 3GPP TS 36.212 V13.5.0 (Mar. 2017).
Third Generation Partnership Project, "Technical Specification Group Radio Access Network; Evolved Universal Terrestrial Radio Access (E-UTRA); Multiplexing and channel coding (Release 14)," 3GPP TS 36.212 V14.2.0 (Mar. 2017).
Zte et al., "Latency Reduction Solutions for TDD," 3GPP TSG RAN WG1 Meeting #85, R1-164638, Nanjing, China (May 23-27, 2016).

* cited by examiner

DETERMINING PHYSICAL CHANNEL RESOURCES IN A WIRELESS NETWORK

CROSS REFERENCE TO RELATED APPLICATIONS

This application is a continuation of U.S. patent application Ser. No. 16/088,681 filed on Sep. 26, 2018, which issued as U.S. Pat. No. 11,272,483 on Mar. 8, 2022, which is the U.S. National Stage, under 35 U.S.C. § 371, of International Application No. PCT/US2017/025196 filed Mar. 30, 2017, which claims the benefit of U.S. Provisional Application Ser. No. 62/315,490 filed Mar. 30, 2016, U.S. Provisional Application Ser. No. 62/334,888 filed May 11, 2016, and U.S. Provisional Application Ser. No. 62/377,181 filed Aug. 19, 2016, the contents of which are all hereby incorporated by reference herein.

BACKGROUND

In long term evolution (LTE) or LTE advanced (LTE-A) networks reduced latency for applications such as alarm systems, automotive safety, factory systems, machine type communications (MTC), or the like is desired. In addition, gaming and real-time applications such as Voice over LTE (VoLTE), video telephony, video conferencing, or the like may also benefit from reduced latency. Scheduling grant acquisition time, transmission time interval (TTI), processing time, hybrid-ARQ (HARQ) round-trip time (RTT), or the like may contribute to end-to-end delay. Thus, it is desirable to reduce latency in a wireless network by addressing these and other factors that may contribute to delay.

SUMMARY

A method performed by a wireless transmit/receive unit (WTRU) may include receiving configuration information for reporting a power headroom (PH) associated with each of a plurality of cells, wherein a first cell uses first time intervals each having a first length and a second cell uses second time intervals each having a second length. The method may include transmitting a first uplink transmission using a first carrier frequency associated with the first cell and transmitting, in one of the second time intervals that is fully overlapped by the one of the first time intervals, based on the received configuration information, a report including information indicating a first PH corresponding to the one of the first time intervals and a second PH corresponding to the earliest one in time of the second time intervals that is fully overlapped by the one of the first time intervals.

BRIEF DESCRIPTION OF THE DRAWINGS

A more detailed understanding may be had from the following description, given by way of example in conjunction with the accompanying drawings wherein.

DETAILED DESCRIPTION

Any elements shown or described in the figures herewith may be implemented by one or more functions or components on hardware, software, firmware, or the like. Moreover, in the examples herewith, a transmitter may be part of a transceiver or multi-component hardware, as desired. A receiver may be part of a transceiver or multi-component hardware, as desired. Lastly, the term data or information in any of the examples herewith may include control data, control information, a control packet(s), user data, user information, payload data, payload information, a data packet(s), general data, or general information.

Figure 1A:
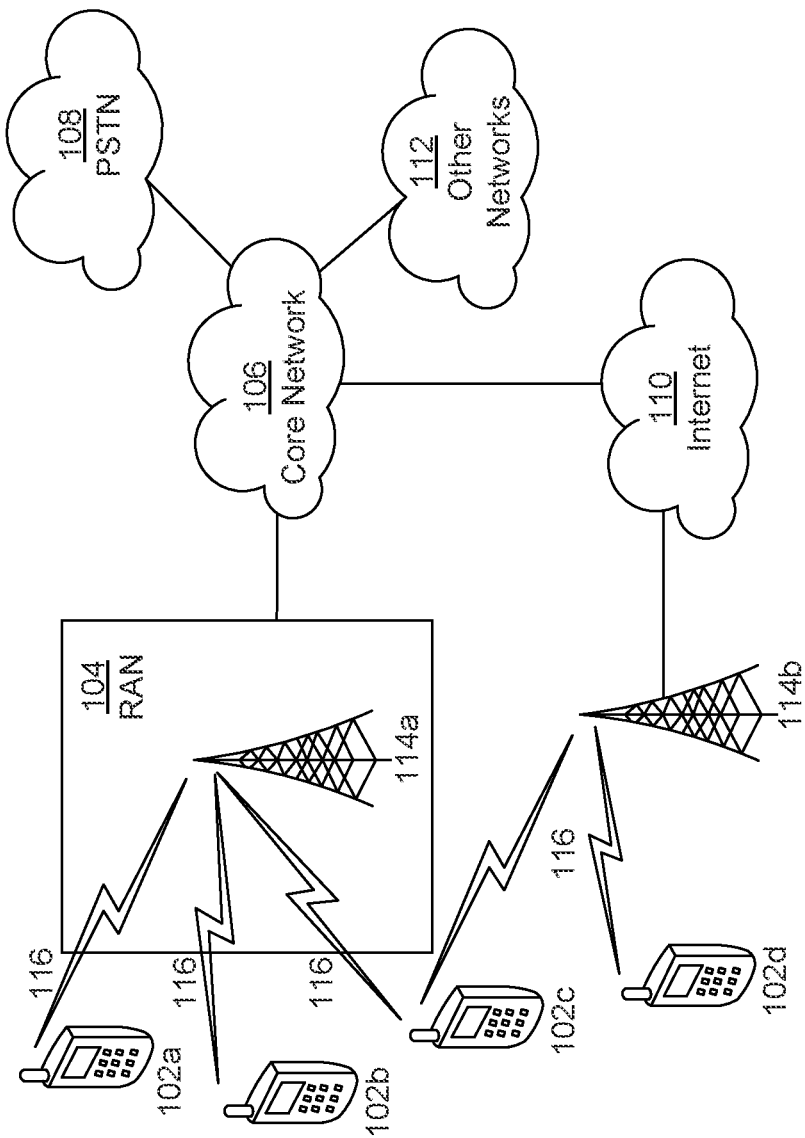
FIG. 1A is a system diagram of an example communications system in which one or more disclosed embodiments may be implemented.

FIG. 1A is a diagram of an example communications system 100 in which one or more disclosed embodiments may be implemented. The communications system 100 may be a multiple access system that provides content, such as voice, data, video, messaging, broadcast, etc., to multiple wireless users. The communications system 100 may enable multiple wireless users to access such content through the sharing of system resources, including wireless bandwidth. For example, the communications systems 100 may employ one or more channel access methods, such as code division multiple access (CDMA), time division multiple access (TDMA), frequency division multiple access (FDMA), orthogonal FDMA (OFDMA), orthogonal frequency division multiplexing (OFDM), single-carrier FDMA (SC-FDMA), or the like.

As shown in FIG. 1A, the communications system 100 may include wireless transmit/receive units (WTRUs) 102a, 102b, 102c, or 102d, a radio access network (RAN) 104, a core network 106, a public switched telephone network (PSTN) 108, the Internet 110, and other networks 112, though it will be appreciated that the disclosed embodiments contemplate any number of WTRUs, base stations, networks, or network elements. Each of the WTRUs 102a, 102b, 102c, or 102d may be any type of device configured to operate or communicate in a wireless environment. By way of example, the WTRUs 102a, 102b, 102c, or 102d may be configured to transmit or receive wireless signals and may include user equipment (UE), a mobile station, a fixed or mobile subscriber unit, a pager, a cellular telephone, a personal digital assistant (PDA), a smartphone, a laptop, a netbook, a personal computer, a wireless sensor, consumer electronics, or the like. A signal may be or may include a channel, a physical channel, a control channel, a data channel, a physical channel that may be a control channel or a data channel, or the like. A signal may be or may include a reference signal (RS). Signal and channel may be used interchangeably.

The communications systems 100 may also include a base station 114a and a base station 114b. Each of the base stations 114a or 114b may be any type of device configured to wirelessly interface with at least one of the WTRUs 102a, 102b, 102c, or 102d to facilitate access to one or more communication networks, such as the core network 106, the Internet 110, or the other networks 112. By way of example, the base stations 114a or 114b may be a base transceiver station (BTS), a Node-B, an eNode B, a Home Node B, a Home eNode B, a site controller, an access point (AP), a wireless router, or the like. While the base stations 114a or 114b are each depicted as a single element, it will be appreciated that the base stations 114a or 114b may include any number of interconnected base stations or network elements.

The base station 114a may be part of the RAN 104, which may also include other base stations or network elements (not shown), such as a base station controller (BSC), a radio network controller (RNC), relay nodes, etc. The base station 114a or the base station 114b may be configured to transmit or receive wireless signals within a particular geographic region, which may be referred to as a cell (not shown). The cell may further be divided into cell sectors. For example, the cell associated with the base station 114a may be divided into three sectors. Thus, in one embodiment, the base station 114a may include three transceivers, i.e., one for each sector of the cell. In another embodiment, the base station 114a may employ multiple-input multiple-output (MIMO) technology and, therefore, may utilize multiple transceivers for each sector of the cell.

The base stations 114a or 114b may communicate with one or more of the WTRUs 102a, 102b, 102c, or 102d over an air interface 116, which may be any suitable wireless communication link (e.g., radio frequency (RF), microwave, infrared (IR), ultraviolet (UV), visible light, etc.). The air interface 116 may be established using any suitable radio access technology (RAT).

More specifically, as noted above, the communications system 100 may be a multiple access system and may employ one or more channel access schemes, such as CDMA, TDMA, FDMA, OFDMA, SC-FDMA, or the like. For example, the base station 114a in the RAN 104 and the WTRUs 102a, 102b, or 102c may implement a radio technology such as Universal Mobile Telecommunications System (UMTS) Terrestrial Radio Access (UTRA), which may establish the air interface 116 using wideband CDMA (W-CDMA). W-CDMA may include communication protocols such as High-Speed Packet Access (HSPA) or Evolved HSPA (HSPA+). HSPA may include High-Speed Downlink Packet Access (HSDPA) or High-Speed Uplink Packet Access (HSUPA).

In another embodiment, the base station 114a and the WTRUs 102a, 102b, or 102c may implement a radio technology such as Evolved UMTS Terrestrial Radio Access (E-UTRA), which may establish the air interface 116 using Long Term Evolution (LTE) or LTE-Advanced (LTE-A). In addition, for the examples given herewith WTRU 102a may utilize a sidelink resource or frequency to communication with WTRU 102b or 102c.

In other embodiments, the base station 114a and the WTRUs 102a, 102b, or 102c may implement radio technologies such as IEEE 802.16 (i.e., Worldwide Interoperability for Microwave Access (WiMAX)), cdma2000, cdma2000 1x, cdma2000 EV-DO, Interim Standard 2000 (IS-2000), Interim Standard 95 (IS-95), Interim Standard 856 (IS-856), Global System for Mobile communications (GSM), Enhanced Data rates for GSM Evolution (EDGE), GSM EDGE (GERAN), or the like.

The base station 114b in FIG. 1A may be a wireless router, Home Node B, Home eNode B, or access point, for example, and may utilize any suitable RAT for facilitating wireless connectivity in a localized area, such as a place of business, a home, a vehicle, a campus, or the like. In one embodiment, the base station 114b and the WTRUs 102c or 102d may implement a radio technology such as IEEE 802.11 to establish a wireless local area network (WLAN). In another embodiment, the base station 114b and the WTRUs 102c or 102d may implement a radio technology such as IEEE 802.15 to establish a wireless personal area network (WPAN). In yet another embodiment, the base station 114b and the WTRUs 102c or 102d may utilize a cellular-based RAT (e.g., W-CDMA, cdma2000, GSM, LTE, LTE-A, etc.) to establish a picocell or femtocell. As shown in FIG. 1A, the base station 114b may have a direct connection to the Internet 110. Thus, the base station 114b may not be required to access the Internet 110 via the core network 106.

The RAN 104 may be in communication with the core network 106, which may be any type of network configured to provide voice, data, applications, or voice over internet protocol (VoIP) services to one or more of the WTRUs 102a, 102b, 102c, or 102d. For example, the core network 106 may provide call control, billing services, mobile location-based services, pre-paid calling, Internet connectivity, video distribution, etc., or perform high-level security functions, such as user authentication. Although not shown in FIG. 1A, it will be appreciated that the RAN 104 or the core network 106 may be in direct or indirect communication with other RANs that employ the same RAT as the RAN 104 or a different RAT. For example, in addition to being connected to the RAN 104, which may be utilizing an E-UTRA radio technology, the core network 106 may also be in communication with another RAN (not shown) employing a GSM radio technology.

The core network 106 may also serve as a gateway for the WTRUs 102a, 102b, 102c, or 102d to access the PSTN 108, the Internet 110, or other networks 112. The PSTN 108 may include circuit-switched telephone networks that provide plain old telephone service (POTS). The Internet 110 may include a global system of interconnected computer networks and devices that use common communication protocols, such as the transmission control protocol (TCP), user datagram protocol (UDP) and the internet protocol (IP) in the TCP/IP internet protocol suite. The networks 112 may include wired or wireless communications networks owned or operated by other service providers. For example, the networks 112 may include another core network connected to one or more RANs, which may employ the same RAT as the RAN 104 or a different RAT.

Some or all of the WTRUs 102a, 102b, 102c, or 102d in the communications system 100 may include multi-mode capabilities, i.e., the WTRUs 102a, 102b, 102c, or 102d may include multiple transceivers for communicating with different wireless networks over different wireless links. For example, the WTRU 102c shown in FIG. 1A may be configured to communicate with the base station 114a, which may employ a cellular-based radio technology, and with the base station 114b, which may employ an IEEE 802 radio technology.

Figure 1B:
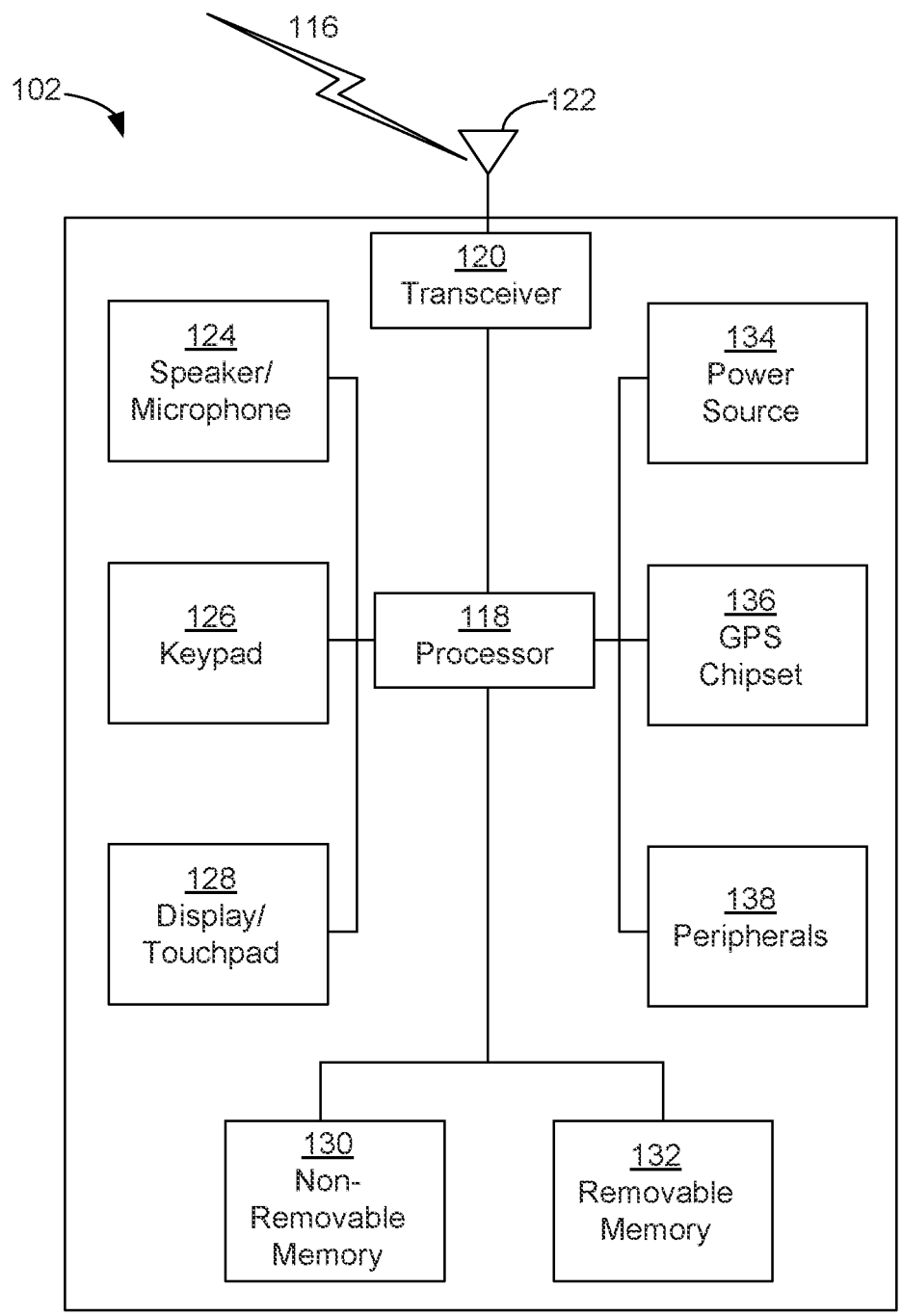
FIG. 1B is a system diagram of an example wireless transmit/receive unit (WTRU) that may be used within the communications system illustrated in FIG. 1A.

FIG. 1B is a system diagram of an example WTRU 102. As shown in FIG. 1B, the WTRU 102 may include a processor 118, a transceiver 120, a transmit/receive element 122, a speaker/microphone 124, a keypad 126, a display/touchpad 128, non-removable memory 130, removable memory 132, a power source 134, a global positioning system (GPS) chipset 136, and other peripherals 138. It will be appreciated that the WTRU 102 may include any subcombination of the foregoing elements while remaining consistent with an embodiment.

The processor 118 may be a general purpose processor, a special purpose processor, a conventional processor, a digital signal processor (DSP), a plurality of microprocessors, one or more microprocessors in association with a DSP core, a controller, a microcontroller, Application Specific Integrated Circuits (ASICs), Field Programmable Gate Array (FPGAs) circuits, any other type of integrated circuit (IC), a state machine, or the like. The processor 118 may perform signal coding, data processing, power control, input/output processing, or any other functionality that enables the WTRU 102 to operate in a wireless environment. The processor 118 may be coupled to the transceiver 120, which may be coupled to the transmit/receive element 122. While FIG. 1B depicts the processor 118 and the transceiver 120 as separate components, it will be appreciated that the processor 118 and the transceiver 120 may be integrated together in an electronic package or chip.

The transmit/receive element 122 may be configured to transmit signals to, or receive signals from, a base station (e.g., the base station 114a) over the air interface 116. For example, in one embodiment, the transmit/receive element 122 may be an antenna configured to transmit or receive RF signals. In another embodiment, the transmit/receive element 122 may be an emitter/detector configured to transmit or receive IR, UV, or visible light signals, for example. In yet another embodiment, the transmit/receive element 122 may be configured to transmit and receive both RF and light signals. It will be appreciated that the transmit/receive element 122 may be configured to transmit or receive any combination of wireless signals.

In addition, although the transmit/receive element 122 is depicted in FIG. 1B as a single element, the WTRU 102 may include any number of transmit/receive elements 122. More specifically, the WTRU 102 may employ MIMO technology. Thus, in one embodiment, the WTRU 102 may include two or more transmit/receive elements 122 (e.g., multiple antennas) for transmitting and receiving wireless signals over the air interface 116.

The transceiver 120 may be configured to modulate the signals that are to be transmitted by the transmit/receive element 122 and to demodulate the signals that are received by the transmit/receive element 122. As noted above, the WTRU 102 may have multi-mode capabilities. Thus, the transceiver 120 may include multiple transceivers for enabling the WTRU 102 to communicate via multiple RATs, such as UTRA and IEEE 802.11, for example.

The processor 118 of the WTRU 102 may be coupled to, and may receive user input data from, the speaker/microphone 124, the keypad 126, or the display/touchpad 128 (e.g., a liquid crystal display (LCD) display unit or organic light-emitting diode (OLED) display unit). The processor 118 may also output user data to the speaker/microphone 124, the keypad 126, or the display/touchpad 128. In addition, the processor 118 may access information from, and store data in, any type of suitable memory, such as the non-removable memory 130 or the removable memory 132. The non-removable memory 130 may include random-access memory (RAM), read-only memory (ROM), a hard disk, or any other type of memory storage device. The removable memory 132 may include a subscriber identity module (SIM) card, a memory stick, a secure digital (SD) memory card, or the like. In other embodiments, the processor 118 may access information from, and store data in, memory that is not physically located on the WTRU 102, such as on a server or a home computer (not shown).

The processor 118 may receive power from the power source 134, and may be configured to distribute or control the power to the other components in the WTRU 102. The power source 134 may be any suitable device for powering the WTRU 102. For example, the power source 134 may include one or more dry cell batteries (e.g., nickel-cadmium (NiCd), nickel-zinc (NiZn), nickel metal hydride (NiMH), lithium-ion (Li-ion), etc.), solar cells, fuel cells, or the like.

The processor 118 may also be coupled to the GPS chipset 136, which may be configured to provide location information (e.g., longitude and latitude) regarding the current location of the WTRU 102. In addition to, or in lieu of, the information from the GPS chipset 136, the WTRU 102 may receive location information over the air interface 116 from a base station (e.g., base stations 114a, 114b) or determine its location based on the timing of the signals being received from two or more nearby base stations. It will be appreciated that the WTRU 102 may acquire location information by way of any suitable location-determination method while remaining consistent with an embodiment.

The processor 118 may further be coupled to other peripherals 138, which may include one or more software or hardware modules that provide additional features, functionality or wired or wireless connectivity. For example, the peripherals 138 may include an accelerometer, an e-compass, a satellite transceiver, a digital camera (for photographs or video), a universal serial bus (USB) port, a vibration device, a television transceiver, a hands free headset, a Bluetooth® module, a frequency modulated (FM) radio unit, a digital music player, a media player, a video game player module, an Internet browser, or the like.

Figure 1C:
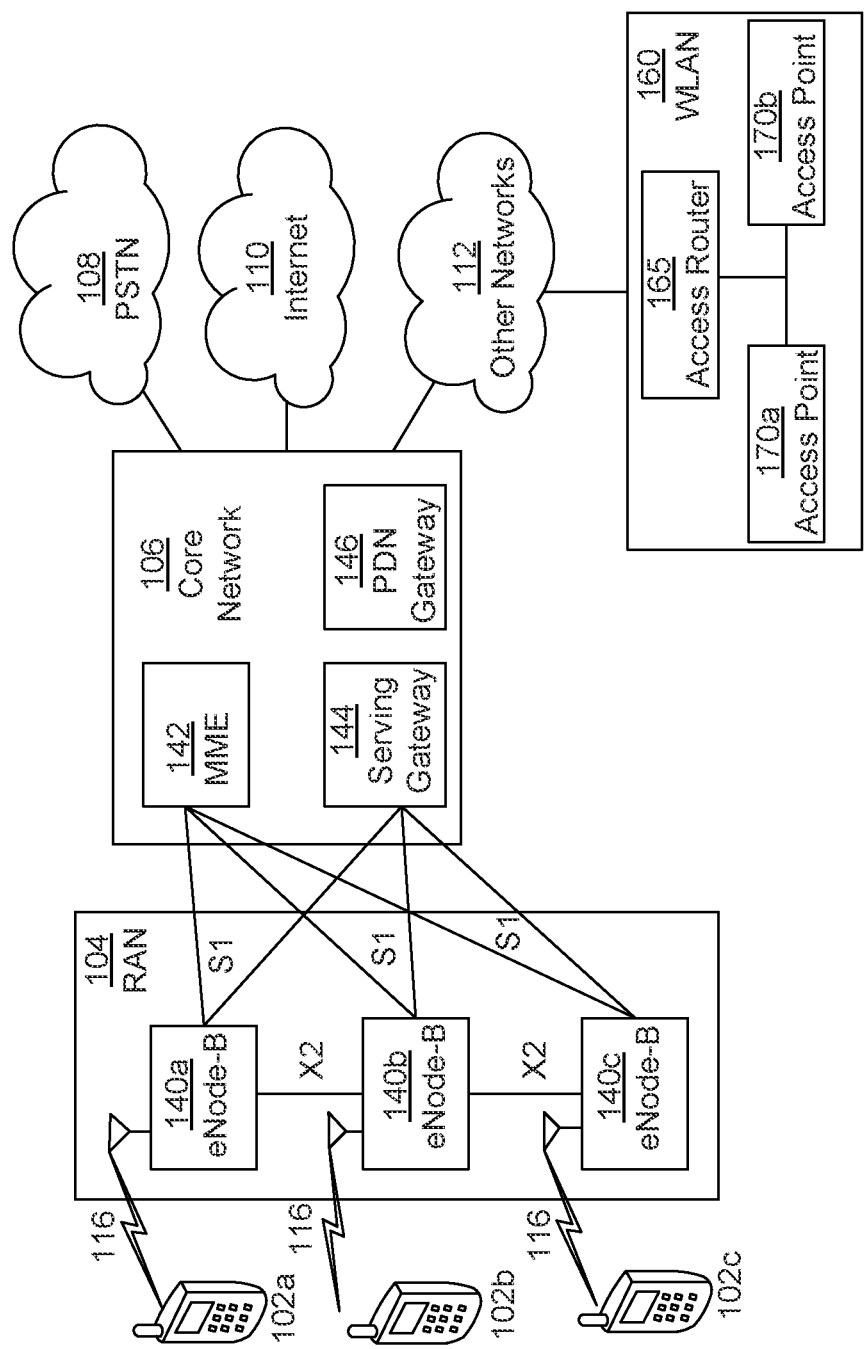
FIG. 1C is a system diagram of an example radio access network and an example core network that may be used within the communications system illustrated in FIG. 1A.

FIG. 1C is a system diagram of the RAN 104 and the core network 106 according to an embodiment. As noted above, the RAN 104 may employ an E-UTRA radio technology to communicate with the WTRUs 102a, 102b, or 102c over the air interface 116. The RAN 104 may also be in communication with the core network 106.

The RAN 104 may include eNode-Bs 140a, 140b, or 140c, though it will be appreciated that the RAN 104 may include any number of eNode-Bs while remaining consistent with an embodiment. The eNode-Bs 140a, 140b, or 140c may each include one or more transceivers for communicating with the WTRUs 102a, 102b, or 102c over the air interface 116. In one embodiment, the eNode-Bs 140a, 140b, or 140c may implement MIMO technology. Thus, the eNode-B 140a, for example, may use multiple antennas to transmit wireless signals to, and receive wireless signals from, the WTRU 102a.

Each of the eNode-Bs 140a, 140b, or 140c may be associated with a particular cell (not shown) and may be configured to handle radio resource management decisions, handover decisions, scheduling of users in the uplink (UL) or downlink (DL), or the like. As shown in FIG. 1C, the eNode-Bs 140a, 140b, or 140c may communicate with one another over an X2 interface.

The core network 106 shown in FIG. 1C may include a mobility management entity (MME) gateway 142, a serving gateway 144, and a packet data network (PDN) gateway 146. While each of the foregoing elements are depicted as part of the core network 106, it will be appreciated that any one of these elements may be owned or operated by an entity other than the core network operator.

The MME 142 may be connected to each of the eNode-Bs 140a, 140b, or 140c in the RAN 104 via an Si interface and may serve as a control node. For example, the MME 142 may be responsible for authenticating users of the WTRUs 102a, 102b, or 102c, bearer activation/deactivation, selecting a particular serving gateway during an initial attach of the WTRUs 102a, 102b, or 102c, or the like. The MME 142 may also provide a control plane function for switching between the RAN 104 and other RANs (not shown) that employ other radio technologies, such as GSM or W-CDMA.

The serving gateway 144 may be connected to each of the eNode Bs 140a, 140b, or 140c in the RAN 104 via the Si interface. The serving gateway 144 may generally route and forward user data packets to/from the WTRUs 102a, 102b, or 102c. The serving gateway 144 may also perform other functions, such as anchoring user planes during inter-eNode B handovers, triggering paging when downlink data is available for the WTRUs 102a, 102b, or 102c, managing and storing contexts of the WTRUs 102a, 102b, or 102c, or the like.

The serving gateway 144 may also be connected to the PDN gateway 146, which may provide the WTRUs 102a, 102b, or 102c with access to packet-switched networks, such as the Internet 110, to facilitate communications between the WTRUs 102a, 102b, or 102c and IP-enabled devices.

The core network 106 may facilitate communications with other networks. For example, the core network 106 may provide the WTRUs 102a, 102b, or 102c with access to circuit-switched networks, such as the PSTN 108, to facilitate communications between the WTRUs 102a, 102b, or 102c and traditional land-line communications devices. For example, the core network 106 may include, or may communicate with, an IP gateway (e.g., an IP multimedia subsystem (IMS) server) that serves as an interface between the core network 106 and the PSTN 108. In addition, the core network 106 may provide the WTRUs 102a, 102b, or 102c with access to other networks 112, which may include other wired or wireless networks that are owned or operated by other service providers.

Other network 112 may further be connected to an IEEE 802.11 based wireless local area network (WLAN) 160. The WLAN 160 may include an access router 165. The access router may contain gateway functionality. The access router 165 may be in communication with a plurality of access points (APs) 170a or 170b. The communication between access router 165 and APs 170a or 170b may be via wired Ethernet (IEEE 802.3 standards), or any type of wireless communication protocol. AP 170a may be in wireless communication over an air interface with WTRU 102d.

In the examples given herewith, WTRU 102 may be configured to determine a short TTI (sTTI) time resource in a time period. A sTTI may be a subframe, radio frame, slot, timeslot, a symbol, a plurality of symbols, an OFDM symbol, a plurality of OFDM symbols, or the like. The terms time or a time period may be substituted for symbol in the disclosure herein. A WTRU may transmit a single physical uplink control channel (PUCCH) comprising a plurality of short or sTTI hybrid automatic repeat request (sHARQ) transmissions together with one or more regular HARQ transmission. In addition, transmissions by a WTRU may be scaled to avoid exceeding a maximum power level. Scaling may comprise scaling the power, for example, the calculated power, of a channel, frequency, timeslot, symbol, or the like. A WTRU may also or may be configured to perform a power headroom (PH) report (PHR) procedure using an nTTI, sTTI, or combinations of both. An nTTI may be a nominal, normal or regular TTI or subframe such as a LTE/LTE-A TTI or subframe. An nTTI may be a TTI longer than an sTTI. The duration of an nTTI may any value such as 1 ms or any other duration. A WTRU may receive an indication to perform a PHR procedure, which includes a resource grant for an uplink transmission(s). In response to receiving the indication, a WTRU may transmit a PH report on the indicated resource grant. The resource grant may indicate an nTTI, sTTI, or combinations of both to utilize. An nTTI may be of a first serving cell and a short or sTTI may be of a second serving cell. The first serving cell and second serving cell may be the same or different serving cells. A WTRU may or may be configured to aggregate the first serving cell and second serving cell.

Also in the examples given herewith, a PUCCH may be used for one or more HARQ-ACK transmissions or reporting that may be associated with one or more physical downlink shared data channel (PDSCH) transmissions, one or more scheduling request (SR) transmissions, or one or more channel state information (CSI) transmissions. One or more PUCCH formats may be defined, determined, or used, for example, based on the information carried in the PUCCH. For example, PUCCH formats that may carry HARQ-ACK information (e.g., only HARQ-ACK information) may be referred to as PUCCH format 1a or PUCCH format 1b.

Figure 2:
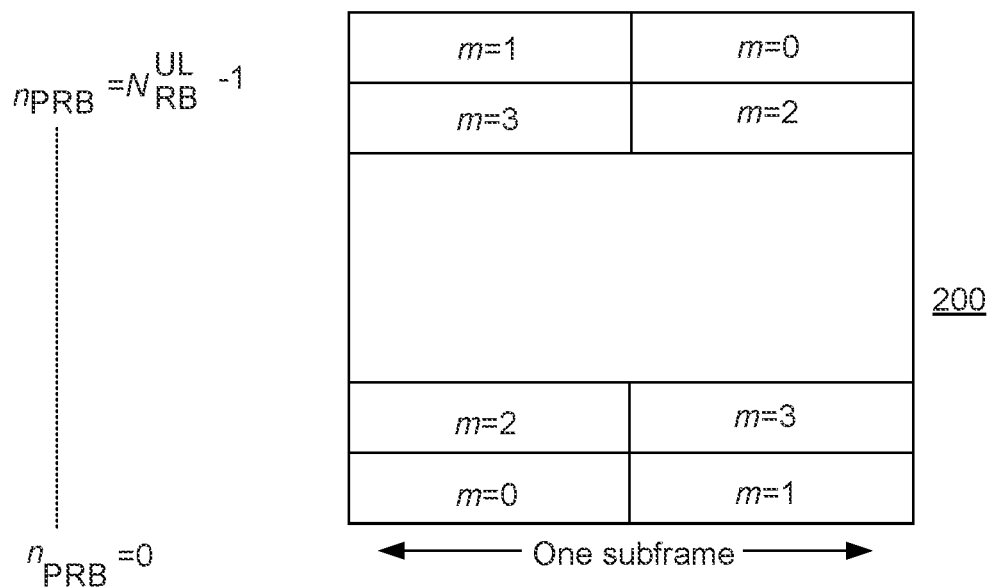
FIG. 2 is an example of a physical resource block (PRB) mapping for a physical uplink control channel (PUCCH) transmission(s) or PUCCH format transmission(s)

FIG. 2 is an example of a physical resource block (PRB) mapping 200 for a PUCCH transmission(s) or PUCCH format transmission(s). A PUCCH may be allocated in relation to a physical downlink control channel (PDCCH). Physical resources that may be used for a PUCCH may be determined based on one or more parameters, for example $N_{RB}^{(2)}$ and $N_{sc}^{(1)}$, that may be provided by a higher layer, such as a radio resource control (RRC) layer. The parameter $N_{RB}^{(2)}$, where $N_{RB}^{(2)}$ may be $\geq 0$, may be or may represent a frequency resource such as a bandwidth in frequency. A PRB or resource block (RB) may be or may include a set of subcarriers, such as 12 subcarriers, that may be in or related to a system bandwidth. Scheduling or resource allocation may be in terms of RBs. An RB may represent or correspond to a set of one or more time units. For example, an RB may correspond to a TTI length or a portion of a TTI length. A frequency resource may be defined, allocated, or represented in terms of PRBs that may or may be configured, determined, or used for a PUCCH format or PUCCH format transmission. Examples of a PUCCH format include 1/1a/1b, 2/2a/2b, and 3. PRB and RB may be substituted for each other in the embodiments and examples herein.

A PUCCH transmission or PUCCH format transmission may be in one or more slots or timeslots. There may be two slots in a subframe. A PUCCH or PUCCH format transmission may be in each slot of a subframe. The parameter $N_{cs}^{(1)}$ may be used to determine the number of cyclic shifts that may be used for a PUCCH format, such as PUCCH formats 1/1a/1b, for example in a physical resource block that may or may be configured for a mix of PUCCH formats. A mix of PUCCH formats may for example be a mix of formats 1/1a/1b) and 2/2a/2b. A value of $N_{cs}^{(1)}$ may be an integer multiple of $\Delta_{shift}^{PUCCH}$ that may be within a range of $\{0, 1, \ldots, 7\}$, where $\Delta_{shift}^{PUCCH}$ may be provided or signaled by a higher layer. A mixed resource block may not be present (e.g., no mixed resource block may be present), for example when $N_{cs}^{(1)}=0$. A resource block, for example one resource block or at most one resource block, in a slot, for example each slot, may support a mix of PUCCH formats such as PUCCH formats 1/1a/1b and 2/2a/2b.

Resources that may be used for transmission of PUCCH formats 1/1a/1b, 2/2a/2b, and 3 may be represented by the non-negative indices $n_{PUCCH}^{(1,\tilde{p})}$, $$n_{PUCCH}^{(2,\tilde{p})} < N_{RB}^{(2)} N_{sc}^{RB} + \left\lceil \frac{N_{cs}^{(1)}}{8} \right\rceil \cdot (N_{sc}^{RB} - N_{cs}^{(1)} - 2), \text{ and}$$

$n_{PUCCH}^{(3,\tilde{p})}$, respectively. Physical resource blocks $n_{PRB}$ that may or may be configured or used for a PUCCH transmission or PUCCH format transmission in slot $n_s$ may be determined by the parameter m, for example according to:

$$n_{PRB} = \begin{cases} \left\lfloor \frac{m}{2} \right\rfloor & \text{if } (m+n_s \bmod 2) \bmod 2 = 0 \\ N_{RB}^{UL} - 1 - \left\lfloor \frac{m}{2} \right\rfloor & \text{if } (m+n_s \bmod 2) \bmod 2 = 1 \end{cases} \quad \text{Equation (1)}$$

The value of m may be determined based on a PUCCH format. For example, for PUCCH formats such as PUCCH formats 1, 1a, and 1b, the following may be used to determine m:

Equation (2)

$$m = \begin{cases} N_{RB}^{(2)} & \text{if } n_{PUCCH}^{(1,\tilde{p})} < c \cdot N_{cs}^{(1)} / \Delta_{shift}^{PUCCH} \\ \left\lfloor \frac{n_{PUCCH}^{(1,\tilde{p})} - c \cdot N_{cs}^{(1)} / \Delta_{shift}^{PUCCH}}{c \cdot N_{sc}^{RB} / \Delta_{shift}^{PUCCH}} \right\rfloor + N_{RB}^{(2)} + \left\lceil \frac{N_{cs}^{(1)}}{8} \right\rceil & \text{otherwise} \end{cases}$$

$$c = \begin{cases} 3 & \text{normal cyclic prefix} \\ 2 & \text{extended cyclic prefix} \end{cases}.$$

For a PUCCH format, such as PUCCH formats 2, 2a and 2b, the following may be used to determine m:

$$m = \lfloor n_{PUCCH}^{(2,\tilde{p})} / N_{sc}^{RB} \rfloor. \quad \text{Equation (3)}$$

For a PUCCH format such as PUCCH format 3, the following may be used to determine m:

$$m = \lfloor n_{PUCCH}^{(3,\tilde{p})} / N_{SF,0}^{PUCCH} \rfloor. \quad \text{Equation (4)}$$

In the FIG. 2 example, the PRB mapping for the PUCCH transmission is shown as based on the parameter m within a subframe.

A shortened PUCCH format may be provided or used. The last SC-FDMA symbol in the second slot of a subframe may be left empty when a shortened PUCCH format is used. A shortened PUCCH format may be used, for example, when there may be simultaneous transmission of a sounding reference signal (SRS) and a PUCCH transmission or PUCCH format transmission. Such a configuration may be utilized for PUCCH format 1, 1a, 1b or 3 transmissions or with one serving cell.

Figure 3:
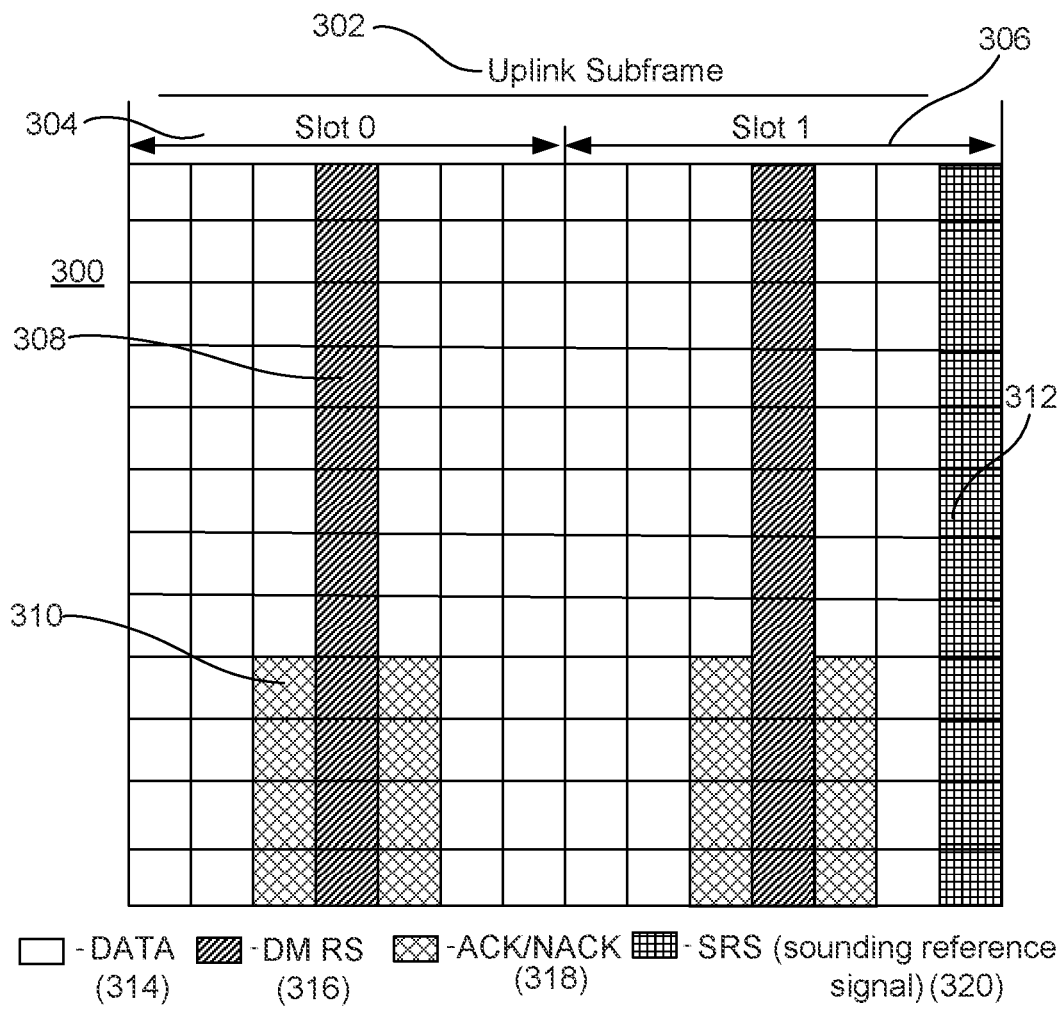
FIG. 3 is an example of a physical uplink shared channel (PUSCH) resource mapping.

FIG. 3 is an example of a physical uplink shared channel (PUSCH) resource mapping 300 within a PRB and uplink subframe 302. A PUSCH may be used for transmission(s) of data 314. A reference signal for demodulation (DM-RS) 316 for PUSCH may be signaled, for example in the middle of a first slot 304 or a second slot 306 or in the middle or 4th symbol of each slot 308. Acknowledgements (ACKs) or negative acknowledgements (NACKS) 318 may be communicated on one or more symbol(s) 310. The last symbol 312 of an uplink subframe 302, for example a subframe that may be allocated, scheduled, or used for PUSCH, may be used for a sounding reference signal (SRS) 320. A symbol, for example the last symbol in a subframe, may be used for SRS transmission by the same WTRU that may transmit a PUSCH, for example in the subframe, or by a different WTRU. If an uplink subframe is potentially used for a SRS transmission and a PRB allocated for a PUSCH transmission may be used for a SRS transmission, a WTRU may not send a PUSCH in the last symbol. First slot 304 may be designated as slot 0 and second slot 306 may be designated as slot 1. A different frequency location or PRB location may be used for PUSCH transmission in first slot 304 and second slot 306, for example if PUSCH frequency hopping is configured or activated.

In addition, one or more subframes may or may be configured or used at least in part for the uplink and at least in part for the downlink. A special subframe may be or may be used to represent a subframe that may be configured or used at least in part for the uplink and at least in part for the downlink. A special subframe may be or may be used to represent a subframe that may be configured or used at least sometimes for the uplink and at least sometimes for the downlink. Special subframes may be configured or used, for example within a frame or radio frame. One or more special subframes may apply for time division duplex (TDD) operation or operation where a frequency or frequency band may be timeshared between uplink and downlink transmissions. The number of special subframes, for example in a radio frame, or the time location(s) for the special subframe(s), for example in a radio frame, may be determined based on an UL-DL subframe configuration such as a TDD UL-DL subframe configuration.

TABLE 1

| Uplink-downlink configuration | Downlink-to-Uplink Switch-point Periodicity | Subframe number | | | | | | | | | |
|---|---|---|---|---|---|---|---|---|---|---|---|
| | | 0 | 1 | 2 | 3 | 4 | 5 | 6 | 7 | 8 | 9 |
| 0 | 5 ms | D | S | U | U | U | D | S | U | U | U |
| 1 | 5 ms | D | S | U | U | D | D | S | U | U | D |
| 2 | 5 ms | D | S | U | D | D | D | S | U | D | D |
| 3 | 10 ms | D | S | U | U | U | D | D | D | D | D |
| 4 | 10 ms | D | S | U | U | D | D | D | D | D | D |
| 5 | 10 ms | D | S | U | D | D | D | D | D | D | D |
| 6 | 5 ms | D | S | U | U | U | D | S | U | U | D |

Table 1 shows an example of TDD UL-DL subframe configurations within a radio frame where D may represent a downlink subframe that may contain downlink symbols, U may represent an uplink subframe that may contain uplink symbols, and S may represent a special subframe. A special subframe may include at least one of a downlink symbol, an uplink symbol, and a guard time or symbol. For example, a special subframe may include at least one downlink symbol, at least one uplink symbol, and at least one symbol (or other time) as a guard period between a downlink symbol and an uplink symbol. In a special subframe, one or more downlink symbols may be referred to as a downlink pilot time slot (DwPTS) and one or more uplink symbols may be referred to as an uplink pilot time slot (UpPTS). Moreover, one or more symbols (or time) unused for DwPTS or UpPTS may be referred to as a gap period or a guard period (GP).

A GP in a special subframe may be located in between the DwPTS and UpPTS. The number of symbols or time that may be used for DwPTS, UpPTS, and GP for a special subframe may be determined based on a special subframe configuration. Table 2 shows an example of special subframe configurations and the number of symbols that may be used for DwPTS, UpPTS, and GP.

TABLE 2

| | Normal Cyclic prefix in Downlink | | | | |
|---|---|---|---|---|---|
| | DwPTS | | | UpPTS | |
| Special Subframe Configuration | # of DL OFDM Symbols | GP # of GP Symbols | | # of SC-FDMA Symbols | Normal Cyclic Prefix in Uplink |
| 0 | 3 | 6592 · $T_s$ | 10 | 1 | 2192 · $T_s$ |
| 1 | 9 | 19760 · $T_s$ | 4 | | |
| 2 | 10 | 21952 · $T_s$ | 3 | | |
| 3 | 11 | 24144 · $T_s$ | 2 | | |
| 4 | 12 | 26336 · $T_s$ | 1 | | |
| 5 | 3 | 6592 · $T_s$ | 9 | 2 | 4384 · $T_s$ |
| 6 | 9 | 19760 · $T_s$ | 3 | | |
| 7 | 10 | 21952 · $T_s$ | 2 | | |
| 8 | 11 | 24144 · $T_s$ | 1 | | |

Figure 4:
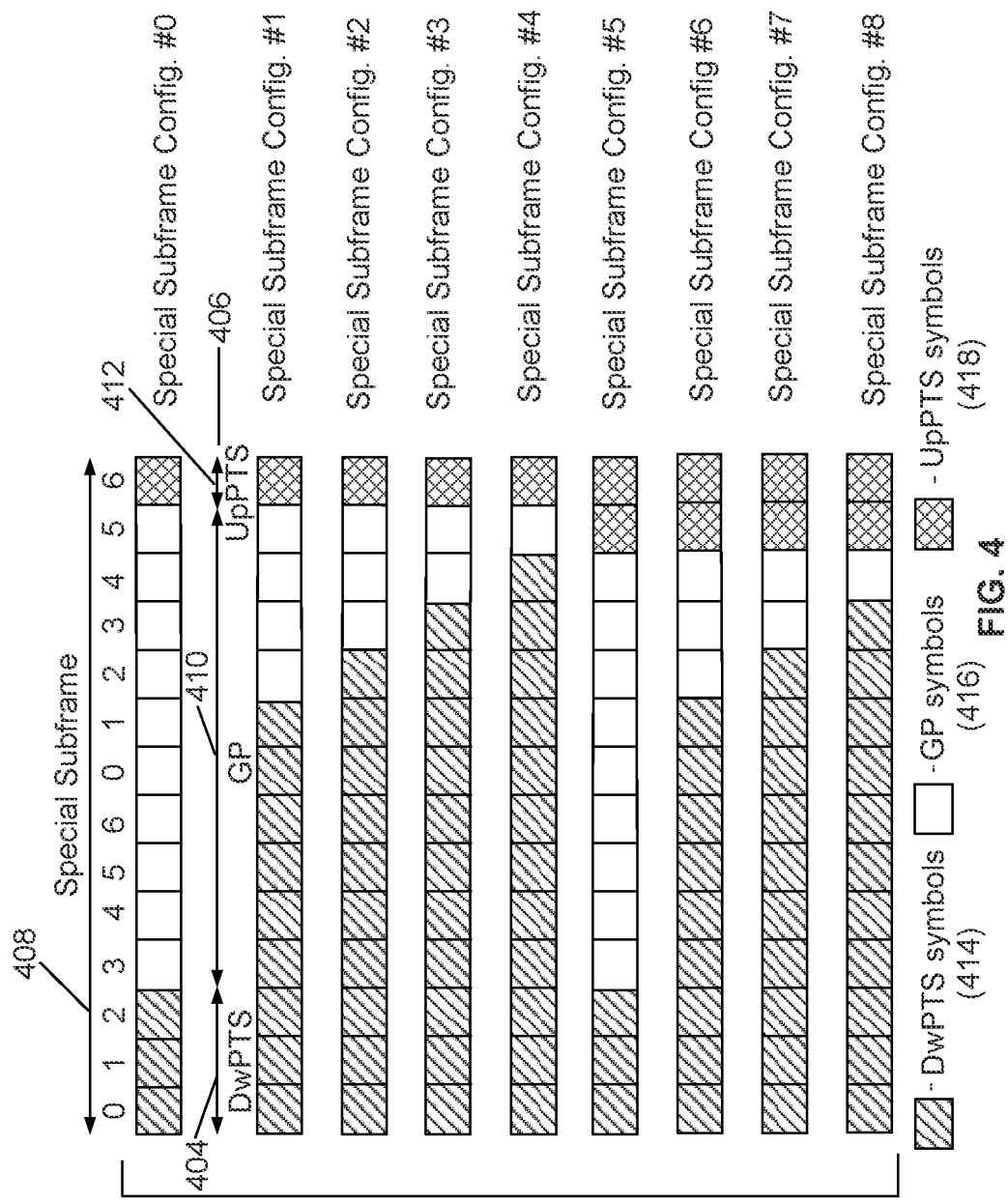
FIG. 4 is an example of a time division duplex (TDD) special subframe configuration.

FIG. 4 is an example of a special subframe 408 configuration with DwPTS symbols 414, GP symbols 416, and UpPTS symbols 418. In special subframe 408, special subframe configurations 0-8, such as those from Table 2, may be configured or utilized. For example, three downlink symbols 404 may be used for a DwPTS, one uplink symbol 412 may be used for an UpPTS 406, and the rest of symbols 410 in a subframe may be used as a GP in special subframe configuration #0.

A WTRU may assume that a downlink signal is not present in GP symbols 416. In symbols that may be used for or may be intended for use for a GP, a WTRU may not attempt to decode a signal or transmission, receive a signal or transmission, measure a signal or transmission, estimate a signal or transmission, transmit a signal or other transmission, or the like.

One or more downlink (DL) signals, channels, data channels, or control channels may be transmitted or received in DL symbols or DwPTS symbols 414. The one or more DL signals or channels may include one or more reference signals, a cell-specific reference signal (CRS), DL DM-RS, or the like. One or more uplink (UL) signals, channels, data channels, or control channels may be transmitted or received in UL symbols or UpPTS symbols 418. The one or more UL signals or channels may include one or more reference signals, such as a UL DM-RS or SRS. A pilot signal may also be a reference signal.

A subframe that may or may be configured or used as a multicast-broadcast single-frequency network (MBSFN) subframe for at least some WTRUs may be configured or used as a special subframe for at least some, for example some other, WTRUs.

A WTRU may determine the power or energy for a transmission based on one or more of pathloss, resources allocated for the transmission in time or frequency, desired receive power, power control commands, static parameters, semi-static parameters, or the like. Static or semi-static parameters may be provided by a base station or other network resources.

Parameters, a power control formula, or a power control procedure may be established based on LTE or Advanced Long Term Evolution (LTE-A) network specifications. The power or energy for each of a set of transmissions may be determined prior to actual transmission and one or more of the transmission powers may be adjusted or scaled, prior to transmission. For example, a transmission power may be adjusted or scaled if the transmission or simultaneous transmission of a set of transmissions would result in a WTRU exceeding a maximum power limit.

A WTRU may calculate a channel power without consideration or substantially independent of a maximum power or energy constraint. A WTRU may adjust a channel power or a calculated channel power such that a sum of the powers of a set of channels a WTRU may transmit or may intend to transmit, for example in a subframe, may not exceed a maximum power. For channels with adjusted powers, the adjusted powers may be used when a WTRU transmits the channels. For the other channels, the calculated powers may be used when a WTRU transmits the channels.

The maximum allowed transmit power/energy or configured maximum output power, such as $P_{CMAX}$, may be a function of at least one of the power class of a WTRU, a power limit that may be signaled by a base station, or allowable power reductions by a WTRU. Power reductions by a WTRU that may be allowed may be based on signals to be transmitted by a WTRU, for example to avoid exceeding out of band emissions requirements or allowed values or levels.

If a WTRU has multiple serving cells, the WTRU may have a maximum allowed transmission power or a configured maximum output power, $P_{CMAX,c}$, per serving cell, for example, per serving cell with a configured or activated uplink.

A WTRU may determine the power for a channel such as an UL channel it may transmit or for a channel such as an UL channel set for transmission, for example in a subframe.

A WTRU may determine the power for a channel such that at least one of the following is satisfied: (i) the sum of the powers for the channels for a serving cell, for example to be transmitted by a WTRU in the subframe, does not exceed $P_{CMAX,c}$ for the serving cell; or (ii) the sum of the powers for the channels across some, all, or substantially all serving cells on which a WTRU may transmit, for example fully or at least partially in the subframe, does not exceed $P_{CMAX}$.

If a WTRU determines that it may exceed a maximum power, such as in a subframe or TTI, a WTRU may adjust the power of one or more channels. The adjustment may be according to the relative priority of logical or physical channels.

Constraints regarding power allocation may exist if a WTRU has serving cells that belong to different eNode-Bs or schedulers. Constraints may be with respect to power allocation among the eNode-Bs or schedulers. Transmissions by a WTRU, may have a minimum guaranteed power (MGP) that may be a percentage of $P_{CMAX}$. When transmitting, e.g., in the same, at least partially overlapping, or substantially overlapping subframes, a WTRU may take the MGP for each eNode-B into account, e.g., in addition to channel priority, when determining which channel power or powers to adjust.

A PH may be computed, determined, or reported by a WTRU. A PH for a serving cell c (PHc) may be computed as the difference between a WTRU's computed power and a WTRU maximum power. A WTRU maximum power may be a WTRU's configured maximum output power, such as $P_{CMAX,c}$. A WTRU's computed power, such as Pcomputed_unconstrained,c, may be a computed power without or prior to adjusting or accounting for one or more constraints. The constraints may, for example, be imposed on the transmission power by the WTRU's maximum power or a power allocation to higher priority channels.

PH may be represented by equation (5) for a serving cell or component carrier (CC) c in a TTI or subframe i:

$$PHc(i) = P_{CMAX,c}(i) - \text{Pcomputed\_unconstrained } c(i). \quad \text{Equation (5)}$$

For example, a PH for a TTI, subframe, LTE/LTE-A TTI, or LTE/LTE-A subframe in which there may be a PUSCH without a PUCCH transmission or PUCCH format transmission may be expressed as:

$$PH_{type1,c}(i) = \\ P_{CMAX,c}(i) - \{10\log_{10}(M_{PUSCH,c}(i)) + P_{O\_PUSCH,c}(j) + \\ \alpha_c(j) \cdot PL_c + \Delta_{TF,c}(i) + f_c(i)\}. \quad \text{Equation(6)}$$

$M_{PUSCHc}(i)$ may be the bandwidth of the PUSCH resource assignment and may be expressed in number of resource blocks (RBs) valid for TTI or subframe i and serving cell c. $P_{O\_PUSCHc}(j)$ may be a parameter composed of the sum of a component $P_{O\_NOMINAL\_PUSCH,c}(j)$ that may be provided by higher layers for j=0 and 1 and a component $P_{O\_UE\_PUSCH,c}(j)$ that may be provided by higher layers for j=0 and 1 for serving cell c. For PUSCH (re)transmissions corresponding to a semi-persistent grant j may be 0, for PUSCH (re)transmissions corresponding to a dynamic scheduled grant j may be 1, and for PUSCH (re)transmissions corresponding to the random access response grant j may be 2. For j=2, the value of $P_{O\_NOMINAL\_PUSCH,c}(j)$ may be determined based on a random access procedure results and $P_{O\_UE\_PUSCH,c}(j)$ may be 0. $\alpha_c(j)$ may be a parameter provided by higher layers or may be a fixed value. $PL_c$ may be a downlink pathloss estimate that may be calculated or determined in the WTRU for serving cell c. $\Delta_{TF,c}(i)$ may be a parameter computed by a WTRU based on parameters provided by higher layers or one or more of a number of code blocks, size of each code block, the number of channel quality indicator (CQI) or precoding matrix indicator (PMI) bits to be transmitted, and the number of resource elements. $f_c(1)$ may be a power control accumulation term that may be an accumulation of transmit power control (TPC) commands, for example for PUSCH on CC c.

A PHR may be triggered or transmitted periodically, for example based on a period or periodicity. A periodicity or period may be configured. A PHR may be event triggered or transmitted based on the occurrence of an event. A triggering event for a PHR may comprise a change in pathloss, for example for a serving cell. A triggering event for a PHR may also comprise a change in a power backoff that may be due to power management, for example for a serving cell. A triggering event for a PHR may also comprise expiry of a timer (e.g., a periodic timer). A change, for example a change that may trigger a PHR, may include passing or going above a threshold value. A triggering event for a PHR may also comprise an activation of a secondary cell (SCell) of a WTRU, such as a SCell of a medium access control (MAC) entity of a WTRU with configured UL. A serving cell change may also be a triggering event. In the examples and embodiments described herein WTRU and MAC entity may be used interchangeably.

Moreover, a triggering event may be conditioned on the expiry of a timer, such as a prohibit timer, that may be used to limit the frequency of PH report transmissions. A triggering event may be conditioned on availability of UL resources for transmission of a PHR. A WTRU may transmit a PHR when at least one trigger event may occur. A WTRU may transmit a PHR when it may have an UL grant or allocation, such as for a new data transmission.

The transmission of a request, grant, HARQ feedback, or data may be performed according to the timing of blocks such as TTIs or subframes. Processing time may be proportional to a transport block (TB) size.

A short TTI (sTTI) may be used to reduce latency. Physical channels that have been designed based on one TTI length, for example, 1 ms, may not be optimized for or may not work properly for a shorter TTI length, for example, one or several symbols in duration. Shortening the TTI of a control channel, such as a UL control channel, or reducing the number of symbols available for a control channel may impact performance of the control channel.

A WTRU may make multiple transmissions that may overlap or be concurrent in time. In any of the examples given herewith, overlap or concurrency in time or frequency may mean partially overlapping, substantially partially overlapping, fully overlapping, substantially fully overlapping, or the like. When transmissions use the same TTI, the overlap of the transmissions may occur at the beginning or end of the transmission. The existence of the overlap may also be known in advance of both transmissions since, for example, the scheduling for the transmissions may be within +/−½ TTI of each other.

If maximum power or energy may be exceeded during the overlap of transmissions, the power or energy of one or more of the transmissions may be adjusted, such as by scaling, to avoid exceeding maximum power during the overlap. The adjustment may apply to the entire TTI or substantially the entire TTI of the transmission, for example if the overlap is more than a threshold such as one symbol in duration. The adjustment may apply to the overlap portion, for example if the overlap is less than a threshold or less than or equal to one symbol.

When transmissions use different TTIs, the overlap of the transmission may not occur at the beginning or the end of the transmission. A sTTI transmission may occur, for example it may start or end, at any point during a longer TTI transmission. In addition, the existence of the overlap may not be known in advance of both transmissions. For example, the scheduling of the sTTI transmission may not be provided or known before beginning the transmission of the long TTI.

Low latency transmission, reduced latency transmission, and short or sTTI transmission may be substituted for each other in the examples and embodiments herein. TTI and TTI length may be substituted for each other in the examples and embodiments herein.

A reduced latency transmission may use a reduced TTI (rTTI) or sTTI. A rTTI or sTTI length may refer to a first TTI length that may be shorter than a second TTI length that may be a preconfigured, predetermined, typical, normal, regular, or legacy TTI length. The second TTI length may be 1 ms, 14 symbols, or 14 SC-FDMA symbols. A regular, normal, or legacy transmission may use or may be configured to use a regular TTI. Typical, normal, regular, and legacy may be substituted for each other in the examples and embodiments herein. Normal may also be used to represent non-short.

A sTTI length may be defined as or correspond to Ns OFDM or SC-FDMA symbols, where Ns may be smaller than the number of OFDM or SC-FDMA symbols for a normal TTI. For example, Ns may be less than 14. A SC-FDMA symbol may be an uplink modulation symbol, a modulation symbol, or a sidelink symbol. One or more sTTI resource units or time units may be used, configured, predefined, or determined in a time period. A resource unit may be a time unit. The time period may be one or more subframes, radio frames, slots, or symbols and may sometimes be referred to herein as a sTTI time window. A sTTI resource may correspond to a set of one or more time units where a time unit may be at least one of a time sample, a symbol, or a timeslot. sTTI resource unit, sTTI, sTTI resource, and sTTI time resource may be used interchangeably herein.

A sTTI time window may be determined based on a value that may be defined, predefined, fixed, or configured. The value may be referred to as NsTTI. The units of NsTTI may be ms. A sTTI time window may be determined based on an operation mode such as TDD or FDD. A sTTI time window may be determined based on a sTTI length, for example a sTTI time window may be a multiple of sTTI length. A sTTI time window may be determined based on one or more system parameters such as cell-ID or system bandwidth. A sTTI time window may be determined based on subframe number (SFN), hyper-SFN, or the like. A sTTI time window may be determined based on a TTI length for a normal subframe.

A control channel, such as a downlink control channel, may be transmitted in the first Nsym symbols in a sTTI time window. Nsym may be an integer greater than or equal to 1. One or more sTTIs or a number of sTTIs that may be used for a gap, such as a DL-UL gap, may be indicated by at least one of a control channel, a signal, an indication, or the like. A control channel may be or may include a signal or indication that may indicate one or more sTTIs or a number of sTTIs that may be used for a gap, for example, a DL-UL gap. The signal or indication may be a predefined, configured, or a known signal or indication. The number of sTTIs may be an integer greater than or equal to one. The number may be 0, for example for a direction switch that may not need or may not use a gap, such as a UL-to-DL switch.

Figure 5:
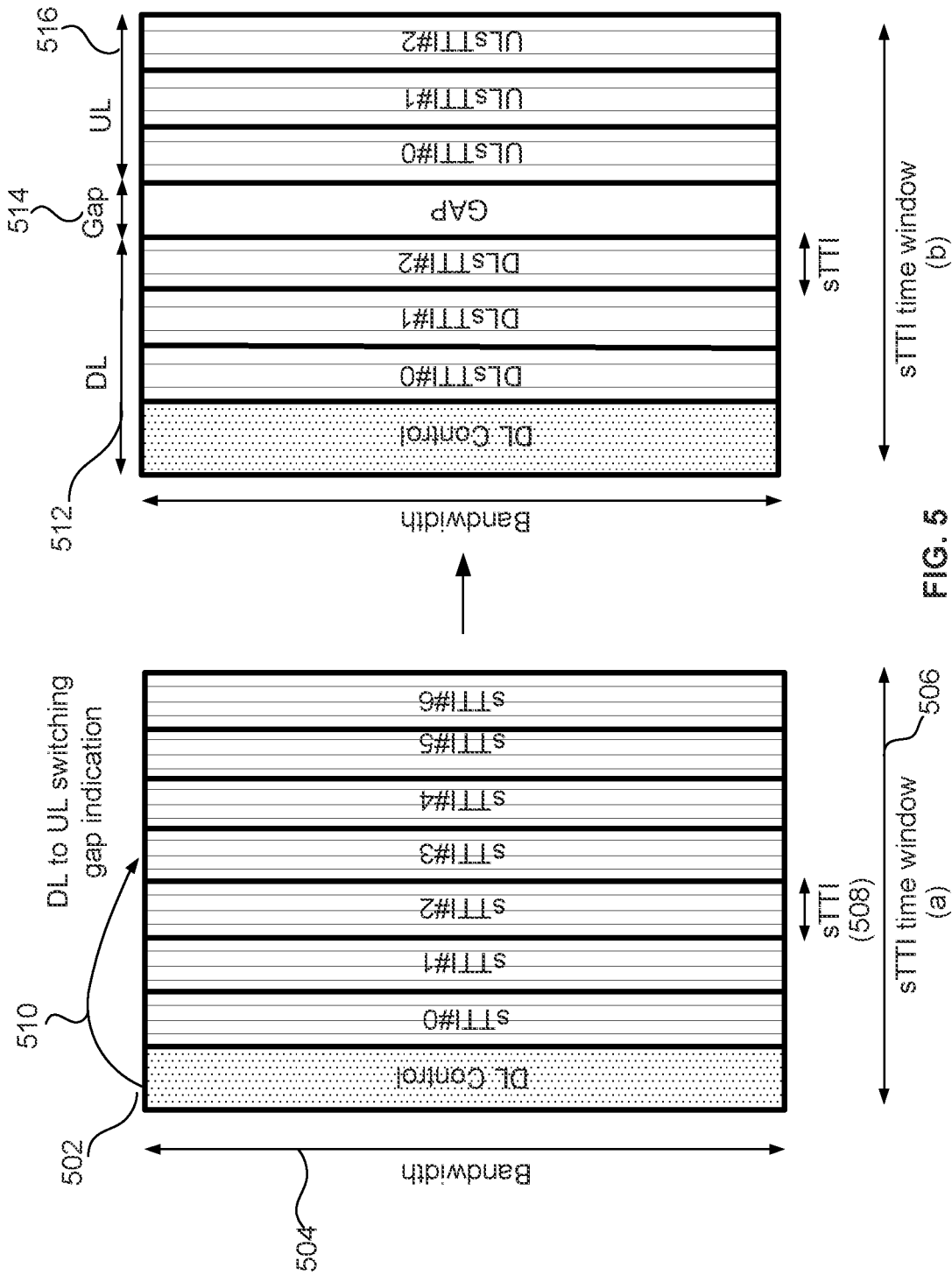
FIG. 5 is an example of a short transmission time interval (sTTI) gap indication.

FIG. 5 is an example of a sTTI gap indication that may be used to indicate the configuration or usage of sTTI resources for uplink, downlink, and gap. sTTI #3 may be indicated, such as in DL control 502, as a gap sTTI 514 where a switch between DL and UL 510 may occur. The first set of sTTI resources may be sTTIs #0, #1, #2 and may be utilized as DL sTTIs 512. The second set of sTTI resources may be sTTI #4, #5, #6 and may be utilized as UL sTTIs 516. In the example, the sTTI window 506 may be a subframe and the sTTI time resource unit 508 may be a number of symbols such as 2. The sTTI time window 506 may apply over bandwidth 504. sTTI window and sTTI time window may be used interchangeably.

A DL-UL gap may be a gap between a DL direction and an UL direction that may be used for switching, for example for switching a radio or RF front end from a DL direction to an UL direction. A DL-UL gap, gap, DL-UL switching gap, DL-to-UL gap, TDD switching gap, switching gap, gap sTTI, sTTI gap, GP, TDD GP, TDD gap, may be substituted for each other in the examples and embodiments herein. In addition, one or more sTTI time windows may be associated with a control channel or PDCCH, for example a legacy PDCCH, that may carry one or more downlink control information (DCI).

A first set of sTTI resources that may be in or exist during a sTTI window may be determined or configured as a set of downlink sTTI resources or DL sTTIs. A second set of sTTI resources that may be in the sTTI window, for example the same sTTI window, may be determined or configured as a set of uplink sTTI resources or UL sTTIs. The first set of sTTI resources and the second set of sTTI resources may be non-overlapped or mutually exclusive. One or more sTTI resources may be indicated as a gap within a sTTI window. The location of the gap may determine the first set of sTTI resources and the second set of sTTI resources.

If more than one sTTI resource is indicated as a gap, the sTTI resources indicated as a gap may be consecutive or substantially consecutive in time. The number of sTTI resources used, determined, selected, or configured for a gap may be based on higher layer signaling, one or more system parameters, dynamic indication from a control channel, operation mode, or the like. The number of sTTI resources for a gap may be determined, configured, or indicated in a cell-specific manner. Cell-specific higher layer signaling may be used to indicate the number of sTTI resources that may be used for a gap.

The number of sTTI resources for a gap may be determined, configured, or indicated in a WTRU-specific manner. A timing advance value for a WTRU may be used to configure or determine the number of sTTI resources for a gap. WTRU specific RRC signaling may be used to configure or determine the number of sTTI resources for a gap. A DCI associated with a WTRU-ID or a cell radio network temporary identifier (C-RNTI) may indicate the number of sTTI resources for a gap. The DCI may be received from a base station.

A number of sTTI resources for downlink may be indicated. The number of sTTI resources for downlink may determine the sTTI resource index for a gap. For example, if three sTTI resources may be determined, used, or indicated for downlink transmission or as DL sTTIs the 4th sTTI resource in a sTTI time window may be a starting sTTI resource for a gap. If one sTTI resource is used for a gap, the 4th sTTI resource may be used as a gap and the 5th sTTI resource may be the first sTTI resource for uplink transmission, for example, UL sTTI.

One or more sTTIs may be or may be used for a switchpoint such as a DL-to-UL switchpoint or UL-to-DL switchpoint. One or more sTTIs that may be used for a switchpoint may be indicated or identified by at least one of a control channel, a signal, an indication, or the like. For example, a control channel may be or may include a signal or indication that may indicate one or more sTTIs as a switchpoint. The signal or indication may be a predefined, configured, or a known signal or indication. A switchpoint may be a start of a gap such as a gap for a DL-to-UL or UL-to-DL switchpoint. A switchpoint may also be the start of a sTTI where the direction may switch from a first direction to a second direction. A switchpoint may be the start of a sTTI where no gap may be needed or used, for example by a WTRU, between the first direction and the second direction.

In addition, a switchpoint may be the start of a gap where the gap size may be 0 or may be substantially 0. An indication of sTTI gap may include an indication of a switchpoint such as a sTTI for the switchpoint or a gap size. A gap size may be a number of sTTIs that may be consecutive sTTIs. A gap with a size of zero or may be used to indicate a switchpoint. Also, a gap size of zero or no indication of gap size may or may be used to indicate a switchpoint with no gap. Switchpoint and gap may be substituted for each other in the examples and embodiments herein.

Multiple sTTI gaps may be indicated in a sTTI window. A first sTTI gap may be used to determine the time location of DL-to-UL switching and a second sTTI gap may be used to determine the time location of UL-to-DL switching. A time location may be or may include one or more sTTI resources. One or more sTTI resources that may be indicated as a first gap may not be used for uplink or downlink transmission(s). For example, a WTRU may use one or more sTTI resources, for example in a gap, as a switching time such as from DL to UL. The number of sTTI resources for the gap may be indicated, predefined, configured, configured semi-statically, or configured partially statically via higher layer signaling. One or more sTTI resources indicated as a second gap may be used for uplink or downlink transmission(s). A WTRU may receive or transmit a signal in the one or more sTTI resources used as a second gap. The number of sTTI resources for the gap may be indicated or known, for example indicated or known to be 0 or substantially 0.

Figure 6:
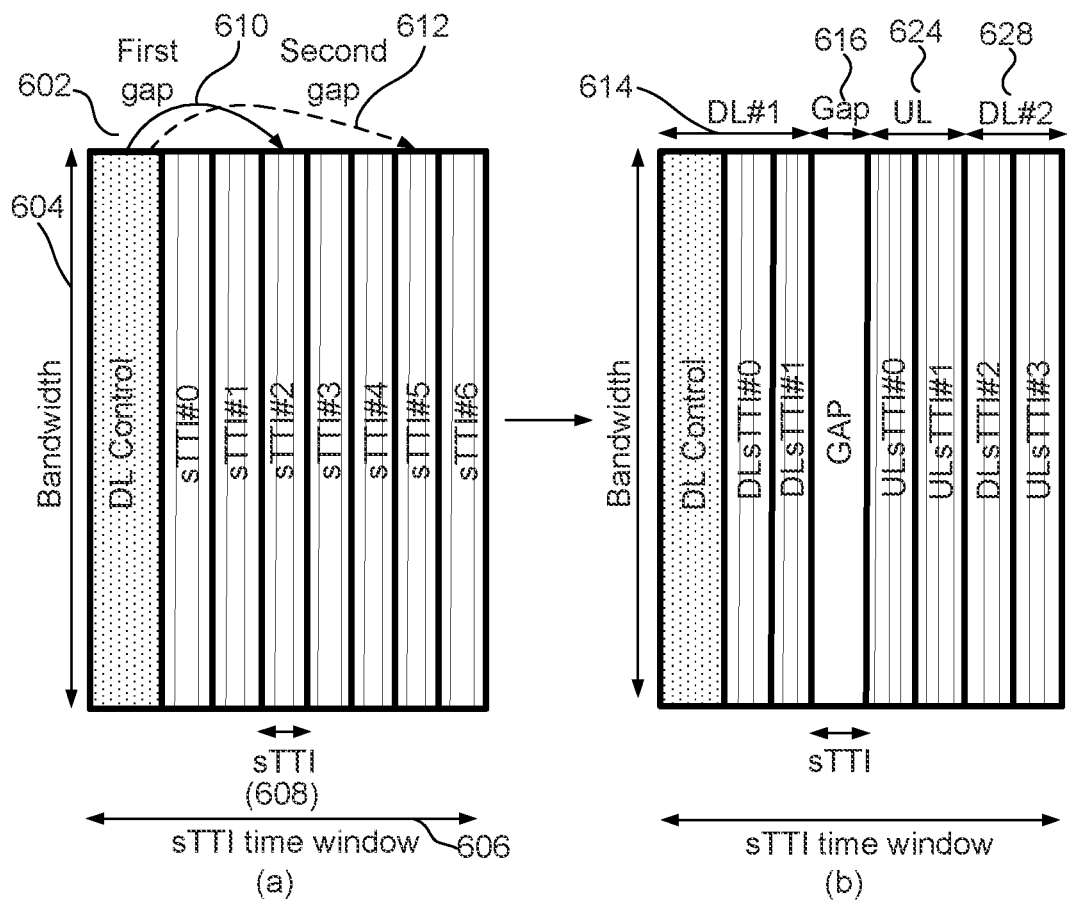
FIG. 6 is an example of multiple gap sTTI indications.

FIG. 6 is an example of multiple gap sTTI indications. DL control 602 may comprise at least part of a control channel for sending control information to a WTRU. sTTI #2 or sTTI resource #2 may be indicated as a first gap 616 and the sTTI #5 or sTTI resource #5 may be indicated as a second gap. sTTI window 606 may be one or more subframes and the sTTI time resource unit 608 may be any number of symbols, for example over bandwidth 604. For example, the sTTI window 606 may be a subframe and the sTTI time resource unit 608 may be a number of symbols such as 2 over bandwidth 604.

In FIG. 6, the set of sTTI resources for downlink transmission(s) 614 or 628 and the set of sTTI resources for uplink transmission(s) 624 may be determined based on the location of gap sTTI resources such as the location of the sTTI resources for the first gap 610 and the sTTI resources for the second gap 612. The sTTI resource indicated as a first gap may be indicated with a gap size of 1 sTTI 608. The sTTI resource indicated as a second gap may be indicated without a gap size or with a gap size of 0 or substantially 0. As illustrated in FIG. 6b, the sTTI resource indicated as a second gap may be used as a downlink sTTI, for example when a previous sTTI resource or the resource preceding the gap sTTI is used as an uplink sTTI, such as 624.

An UL sTTI resource configuration using a TDD GP may be utilized in the examples given herein. In one embodiment, a GP in a subframe may be used for sTTI signal transmission or reception. For example, one or more UL sTTI resources may be allocated in the GP of a special subframe.

Figure 7:
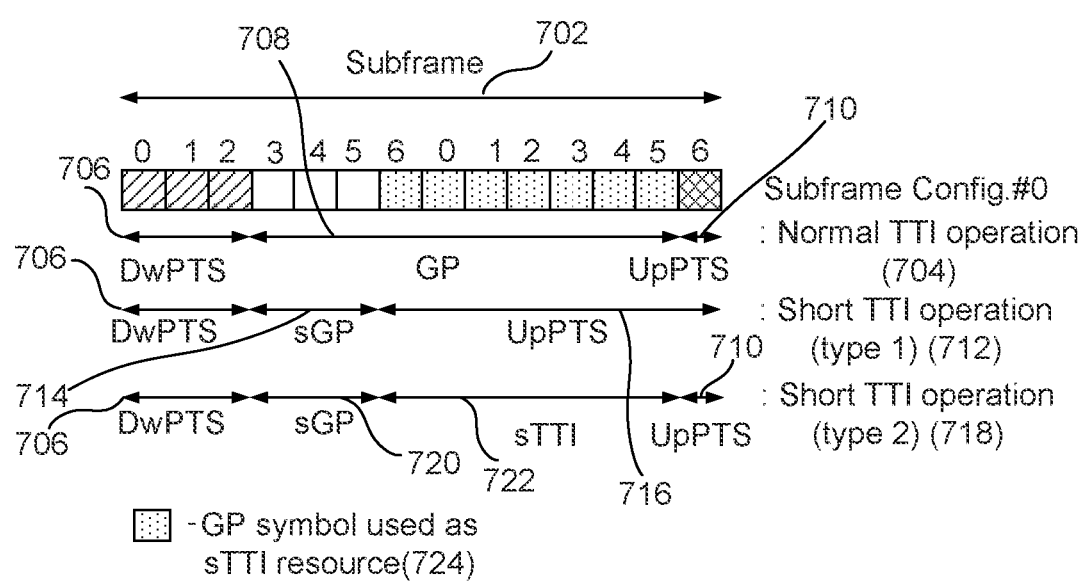
FIG. 7 is an example of sTTI resource configurations in a guard period (GP) of a subframe.

FIG. 7 is an example of sTTI resource configurations in a GP of a subframe 702. The subframe may be a special subframe. A WTRU may be configured, instructed, or indicated to use a first TTI operation 704 that may be a normal TTI operation. A WTRU may determine to use a first TTI operation 704. DwPTS 706, GP 708, and UpPTS 710 may be determined, e.g., by a WTRU, based on a subframe configuration such as subframe configuration #0, for example received from higher layer signaling such as broadcast signaling. A subframe configuration may be a special subframe configuration. A WTRU may assume that no downlink signal may be received or no uplink signal may be transmitted in the symbols that may be used for GP 708.

A WTRU may or may be configured to, may determine to, or may be indicated to use a sTTI resource or to make a sTTI transmission. A WTRU may use one or more symbols that may be determined as a GP based on a subframe configuration such as configuration #0 as an UpPTS or sTTI resource.

One or more symbols that may be determined as GP 708, for example based on a subframe configuration such as subframe configuration #0, may be referred to as GP symbols. A short or sTTI GP (sGP) 714 or 720 may be determined based on the number of GP symbols used for a sTTI resource. A sGP may be used for one or more of a guard period for sTTI operation, a sTTI transmission scheme, a sTTI operation mode, or DL-UL switching for sTTI transmission, or the like. In addition, one or more GP symbols may be used as additional symbols for DwPTS or UpPTS. For example, 7 of GP 708 symbols may be used as or determined as UpPTS 716. Use of part of the GP for UpPTS is referred to in FIG. 7 as type 1 sTTI operation 712. The sTTI resource may be or may include one or more symbols, for example all the symbols, in the UpPTS or the UpPTS extended to include one or more GP symbols.

One or more GP symbols may be used, determined, or indicated as sTTI resources that may be substantially separate from DwPTS or UpPTS in subframe 702. This configuration may be identified as type 2 sTTI operation 718. The GP symbols that may be utilized, determined, or indicated as sTTI resources may be referred as sTTI symbols. sTTI symbols may be used for one or more of a sTTI UL, sTTI DL, or a gap transmission. In the example shown in FIG. 7, 7 GP symbols 708 may be used or determined as sTTI resource 722.

The number of sTTI symbols or the location of sTTI symbols, for example within a GP such as GP 708 of subframe 702, may be determined or predetermined based on at least one of a received subframe configuration, the use of the sTTI symbols for UL sTTI, or the use of the sTTI symbols for DL sTTI. Table 3 shows an example of possible sTTI symbol configurations. A sTTI symbol configuration may be based on a subframe configuration such as a special subframe configuration. The location, such as time location, of sTTI symbols may be determined based on the use of a sTTI resource as DL sTTI or UL sTTI.

TABLE 3

| | Normal Cyclic Prefix in Downlink | | | | | |
|---|---|---|---|---|---|---|
| | DwPTS | | GP | sTTI | UpPTS | |
| Subframe Configuration | # of DL Symbols | | # of GP Symbols | # of sTTI Symbols | # of UL Symbols | Normal CP in Uplink |
| 0 | 3 | 6592 · $T_s$ | 10 | 7 | 1 | 2192 · $T_s$ |
| 1 | 9 | 19760 · $T_s$ | 4 | 3 | | |
| 2 | 10 | 21952 · $T_s$ | 3 | 2 | | |
| 3 | 11 | 24144 · $T_s$ | 2 | 1 | | |
| 4 | 12 | 26336 · $T_s$ | 1 | 0 | | |
| 5 | 3 | 6592 · $T_s$ | 9 | 6 | 2 | 4384 · $T_s$ |
| 6 | 9 | 19760 · $T_s$ | 3 | 2 | | |
| 7 | 10 | 21952 · $T_s$ | 2 | 1 | | |
| 8 | 11 | 24144 · $T_s$ | 1 | 0 | | |

If sTTI symbols are utilized for a UL sTTI, the sTTI symbols may be located at the last $N_{UL}$ GP symbols. If sTTI symbols are utilized for a DL sTTI, the sTTI symbols may be located at the first $N_{DL}$ GP symbols. If sTTI symbols are utilized for a combination of a DL sTTI and a UL sTTI, a first set of sTTI symbols may be used for DL sTTI and a second set of sTTI symbols may be used for UL sTTI.

The number of sTTI symbols within a GP such as GP 708 may or may not be configured via higher layer signaling. One or more parameters that may be related to sTTI operation may be signaled and the number of sTTI symbols within a GP may be indicated from the one or more parameters. The number of sTTI symbols, for example within a GP, may be determined based on a special subframe configuration, one or more parameters related to sTTI operation, or one or more system parameters such as physical cell identification (cell-ID), virtual cell-ID, system bandwidth, and frame structures. The number of sTTI symbols, for example within a GP, may be determined based on a WTRU-specific parameter such as a C-RNTI, a dynamic indication, or the like.

The number of sTTI symbols may be determined based on a timing advance value used, indicated, or determined for or by a WTRU. For example, a WTRU that be indicated with, determine, or use a first timing advance value may use a first number of sTTI symbols in a GP such as GP 708. A WTRU that may be indicated with, determine, or use a second timing advance value may use a second number of sTTI symbols in a GP such as GP 708.

One or more downlink sTTI signals, such as a short or sTTI physical downlink shared channel (sPDSCH) or a short or sTTI physical downlink control channel (sPDCCH), may be received by a WTRU in a sTTI resource. One or more uplink sTTI signals such as a short or sTTI physical uplink control channel (sPUCCH) or a short or sTTI physical uplink shared channel (sPUSCH) may be transmitted by a WTRU in a sTTI resource. One or more reference signals associated with DL or UL sTTI signals may be transmitted or received by a WTRU in a sTTI resource.

Figure 8:
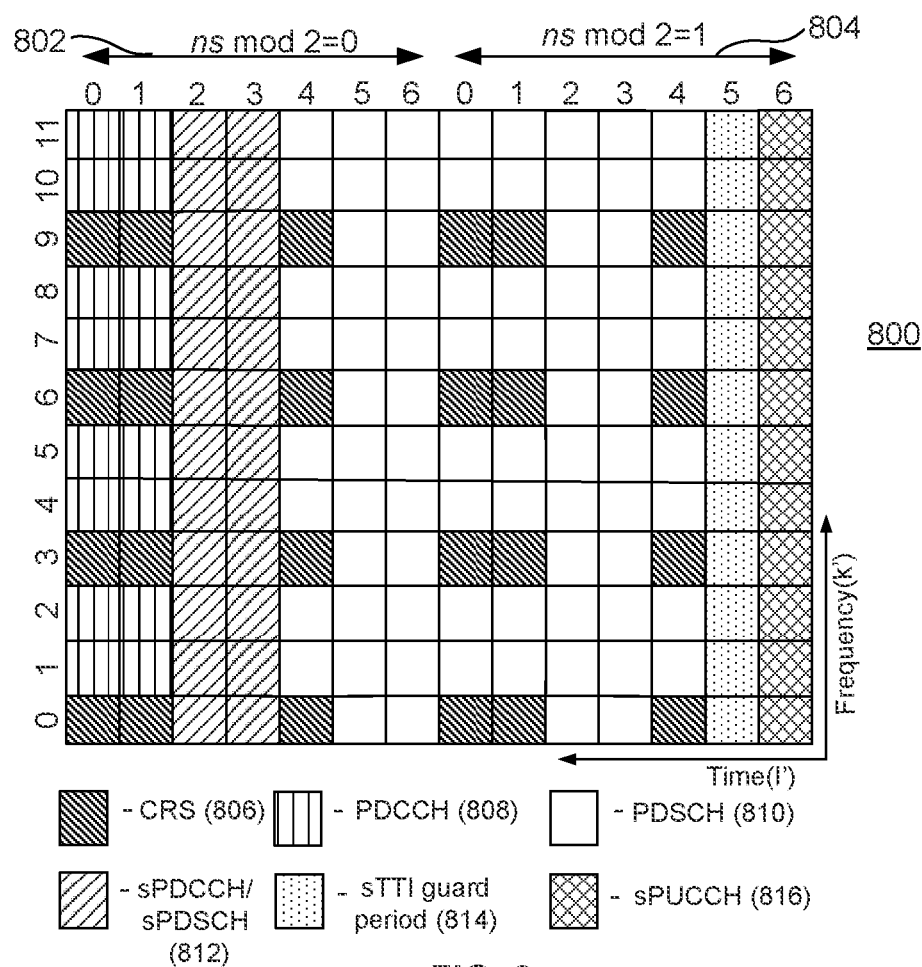
FIG. 8 is an example of a short or sTTI PUCCH (sPUCCH) resource configuration provided in a downlink subframe or PRB.

FIG. 8 is an example of a sPUCCH resource configuration provided or used in a downlink subframe or physical resource block (PRB) 800. In FIG. 8, a first time slot 802 may correspond to an even slot number in a radio frame, for example slot number in a radio frame ns mod 2=0, and the second time slot 804 may correspond to an odd number slot in a radio frame, for example ns mod 2=1. In an example, a timeslot may be 7 symbols wide over 12 subcarriers. Downlink subframe or PRB 800 may comprise one or more of CRS 806, PDCCH 808, PDSCH 810, sPDCCH/sPDSCH 812, sGP 814, and sPUCCH 816.

One or more DL symbols in a subframe may be used, configured, or determined as a UL sTTI resource. DL symbols may be symbols in a subframe that may be configured or used for DL, for example for at least one or some WTRUs. A DL symbol without a cell-specific reference signal may be used, or determined as a UL sTTI resource. The last $N_{UL}$ DL symbols in a subframe may be used, determined, or configured as a UL sTTI resource. $N_{UL}$ may be determined based on the number of antenna ports used for a cell-specific reference signal. In an example, $N_{UL}$ may be a first number such as 2 if the number of CRS ports may be four, for example, antenna ports-0/1/2/3. $N_{UL}$ may a second number such as 5 if the number of CRS ports may be one or two.

$N_{UL}$ may be determined based on sTTI length used, determined, indicated, or configured for an associated downlink sTTI transmission. $N_{UL}$ may also be determined as a function of at least one of a system parameter, a subframe number, a SFN, a hyper-SFN, a WTRU-specific parameter, a WTRU-ID, a number of OFDM symbols that may be used for a PDCCH region such as a legacy PDCCH region, a time location of an associated downlink sTTI transmission, or the like.

At least two consecutive DL symbols may be used as a UL sTTI resource and the first one or more DL symbols may be used as a sGP. FIG. 8 shows an example of a sPUCCH resource configuration using the last two downlink symbols. The first symbol of a sTTI resource may be used for sGP and the second symbol of sTTI resource may be used for sPUCCH 816 transmission. The sPUCCH transmission(s) may include a HARQ-ACK transmission(s) or reporting and may be associated with a sPDSCH transmission(s). The sPDSCH transmission(s) may be in a same subframe or a previous subframe. A sPUCCH may be utilized for one or more HARQ-ACKs transmissions for one or more associated sPDSCH transmissions.

In addition, a sPUCCH may be utilized to communicate a scheduling request of an uplink resource for a reduced latency transmission A sPUCCH may be defined, determined, configured, or utilized to provide an indication of a specific traffic type of data in a buffer. A specific traffic type may include reduced latency traffic, emergency traffic, ultra-low latency traffic, short TTI traffic, ultra-reliable traffic, or the like.

A sPUCCH may be defined, determined, configured, or utilized for (e.g., for the transmission of) or to communicate CSI for one or more sTTI resources configured, determined, indicated or used. The CSI may include a CQI associated with one or more sTTI resources. The CSI may include one or more preferred sTTI resources for a downlink or an uplink sTTI transmission(s). The CSI may include one or more multiple antenna transmission(s) related CSI including but not limited to a precoding matrix indicator (PMI), a rank indicator (RI), a precoding type indicator (PTI), a CSI-RS index (CRI), a quasi-collocation indication (QCI), or the like. A sPUCCH may be defined, determined, configured, or utilized to provide or communicate an uplink reference signal for an uplink channel measurement.

One or more sPUCCH formats, types, structures, or resources may be defined, configured, determined, or used for a reduced latency transmission or to improve uplink performance. sPUCCH format, sPUCCH type, sPUCCH structure, sPUCCH resource, and resource for sPUCCH transmission may be used interchangeably to be consistent with the embodiments and examples herein.

A sPUCCH type may be determined or identified based on a sTTI length of a sPUCCH transmission(s) that may be a number of uplink symbols, a sTTI length of an associated downlink transmission(s) or channel such as, a sPDCCH or a sPDSCH, a DCI(s), higher layer signalling, a dynamic indication, reference signal location(s) within a sPUCCH transmission(s), a transmission power level or maximum transmission power level, reference signal overhead or density of a sPUCCH transmission(s), or the like. A sPUCCH type may also be determined or identified based on the number of frequency resources used for a sPUCCH transmission(s) that may be a number of PRBs, a number of tones, or a number of subcarriers. A sPUCCH type may also be determined or identified based on a set of frequency locations, for example, even numbered subcarriers or odd numbered subcarriers. A sPUCCH type may also be determined or identified based on a sequence type used such as a Zadoff-Chu sequence, a Golay sequence, a gold sequence, or the like. A sPUCCH type may also be determined or identified based on a modulation scheme used such as binary phase-shift keying (BPSK), quadrature PSK (QPSK), pi/2-BPSK, pi/4-QPSK, or a set of modulation schemes used. For example, a first set of modulation schemes may be BPSK and QPSK and a second set of modulation schemes may be pi/2-BPSK and pi/4-QPSK.

Moreover, a sPUCCH type may be determined or identified based on a scheme used to transmit a HARQ-ACK transmission(s) or reporting, such as a subcarrier based scheme, a cyclic shift based scheme, or a frequency-hopping scheme. In a HARQ-ACK scheme, a set of subcarriers may be determined for a HARQ-ACK transmission(s) or reporting. For example, a first set of subcarriers may be used or selected for an ACK transmission(s) or for reporting ACK and a second set of subcarriers may be used or selected for a NACK transmission(s) or for reporting NACK. In another HARQ-ACK scheme, a set of cyclic shifts of a sequence may be used for HARQ-ACK transmission(s). For example, a first cyclic shift index may be used or selected for ACK transmission(s) or for reporting ACK and a second cyclic shift index may be used or selected for NACK transmission(s) or for reporting NACK. In another HARQ-ACK scheme, a set of frequency hopping patterns may be used for HARQ-ACK transmission(s). For example, a first frequency-hopping pattern may be used or selected for ACK transmission(s) or for reporting ACK and a second frequency-hopping pattern may be used or selected for NACK transmission(s) or for reporting NACK.

In a sTTI time window, such as a subframe, one or more sPUCCH resources or types may be configured, defined, or utilized. One or more sPUCCH resources may be intended for one or more WTRUs. A sTTI time window may be fixed, predefined, preconfigured, or predetermined as a specific value. For example, a sTTI window may be predefined as a normal TTI length or with a length of 1 ms. A sTTI time window may also be determined based on a sTTI length or a multiple, such as an integer multiple, of a sTTI length. For example, if sTTI length is referred to as $L_{sTTI}$ and $N_{sTTI}$ is a positive integer number used to determine sTTI length, a sTTI window length may be determined based on $L_{sTTI} \times N_{sTTI}$. A sTTI time window may also be determined based on a downlink sTTI time window, higher layer signaling, RRC signaling, dynamic signaling from a downlink physical channel, or the like.

A sPUCCH type may be determined based on a coverage level that may be configured or determined. A coverage level may be configured via higher layer signaling for at least one of but not limited to a downlink control channel, a downlink data channel, an uplink control channel, and an uplink data channel. A coverage level may be determined based on a coverage level selected or determined for a physical random access channel (PRACH) transmission(s), for example by a WTRU. A sPUCCH type may also be determined based on a downlink measurement level. For example, predefined or configured thresholds may be used to determine a sPUCCH type. A downlink measurement may include at least one of a reference signal received power (RSRP), a reference signal received quality (RSRQ), and CQI.

A sPUCCH type may be determined based on a sTTI length of an associated DL channel. A sTTI length used for sPDCCH or sPDSCH may determine a sPUCCH type. A sPUCCH type may be determined based on higher layer signaling. A sPUCCH type may be indicated implicitly or explicitly by higher layer signaling. A sPUCCH type may be determined based on a dynamic indication. A DCI associated with a sPUCCH transmission may indicate or determine the sPUCCH type for the sPUCCH transmission.

A sPUCCH type may be determined based on a number of sPDSCHs that may be associated with a sPUCCH transmission(s). For example, a first sPUCCH type or format may be used if a single sPDSCH transmission(s) may be associated with a sPUCCH transmission(s), for example, for a HARQ-ACK transmission(s) or reporting. A second sPUCCH type or format may be used when more than one sPDSCH transmission(s) may be associated with a sPUCCH transmission(s), for example, for a HARQ-ACK transmission(s) or reporting.

A sPUCCH type may be determined based on a number of HARQ-ACK bits for the associated one or more sPDSCHs. For example, a first sPUCCH type or format may be used when the number of HARQ-ACK bits is less than or equal to a threshold that may be defined, predefined, or configured. A second sPUCCH type or format may be used when the number of HARQ-ACK bits is larger than a threshold that may be defined, predefined, or configured. One or more thresholds may be used with one or more sPUCCH types or formats.

A sPUCCH may be transmitted with repetition or repetitively in one or more sTTI resources. A higher layer signal may indicate a number of repetitions for a sPUCCH transmission(s). For example, a sPUCCH type and a repetition number or number of repetitions of a sPUCCH transmission may or may be configured via higher layer signaling such as broadcast or RRC signaling. The number of sPUCCH repetitions may be predefined, configured, dynamically indicated from an associated DCI, or determined based on a sTTI resource used for sPUCCH transmission(s).

The number of repetitions for a sPUCCH transmission(s) may also be determined based on a number of repetitions used for an associated sPDSCH or sPDCCH transmission(s). A modulation and coding scheme (MCS) level of an associated sPDSCH transmission(s) may determine the number of sPUCCH repetitions. For example, if a higher MCS level is used for an associated sPDSCH transmission(s), the number of repetitions for sPUCCH may be lower. A larger number of repetitions for sPUCCH may be used if a lower MCS level is used for an associated sPDSCH transmission(s). The number of repetitions for a sPUCCH transmission(s) may be determined based on a short or sTTI control channel element (sCCE) aggregation level of a sPDCCH that may be used for an associated sPDCCH. For example, if a larger number of sCCE aggregation levels is used for an associated sPDCCH, the number of repetitions for sPUCCH may be larger. A smaller number of repetitions for sPUCCH may be used if a lower sCCE aggregation level is used for an associated sPDCCH. In the embodiments and examples described herein, sPUCCH may be substituted for sPUSCH and vice versa.

A sPUSCH may be defined, determined, configured, or used for an uplink data transmission(s). One or more sPUSCH types, structures, or resources may be defined, configured, determined, or used, for example for a reduced latency transmission or improved uplink performance. sPUSCH type, sPUSCH structure, and sPUSCH resource may be substituted for each other in the examples and embodiments herein.

A sPUSCH type may be determined based on a sTTI length of a sPUSCH transmission(s) that may be a number of uplink symbols. A sPUSCH type may be determined based on a sTTI length of an associated downlink control channel for an uplink grant, a sTTI length of an associated sPDCCH carrying an uplink grant, a reference signal location(s) within a sPUSCH transmission(s), a reference signal overhead or density of a sPUSCH transmission(s) in a PRB, a set of frequency locations such as a subset of subcarriers that may be used for a PUSCH or sPUSCH transmission(s) in a PRB, a modulation scheme, or the like. A subset of subcarriers may, for example, be even numbered subcarriers or odd numbered subcarriers.

In a sTTI time window, such as a subframe, one or more sPUSCH resources or types may be configured, defined, or used and one or more sPUSCH resources may be intended for one or more WTRUs.

sPUSCH link adaptation may be provided or used. A sPUSCH type or a number of repetitions for a sPUSCH transmission(s) may be determined based on a coverage level. A coverage level may be configured or determined. A coverage level may be configured via higher layer signaling for at least one of a downlink control channel, a downlink data channel, an uplink control channel, an uplink data channel, or the like. A coverage level may also be determined based on a coverage level selected or determined for a PRACH transmission(s) such as by a WTRU.

A sPUSCH type or a number of repetitions for a sPUSCH transmission(s) may also be determined based on a downlink measurement level. For example, predefined or configured thresholds may be used to determine a sPUSCH type or a number of repetitions for a sPUSCH transmission(s). A downlink measurement may include at least one of a RSRP, a RSRQ, a CQI, or the like. A sPUSCH type or a number of repetitions for a sPUSCH transmission(s) may be determined based on a sTTI length of an associated downlink channel.

A sTTI length used for sPDCCH or sPDSCH may determine a sPUSCH type or a number of repetitions for a sPUSCH transmission(s). A sPUSCH type or a number of repetitions for a sPUSCH transmission(s) may be determined based on higher layer signaling, a dynamic indication, a DCI associated with a sPUSCH transmission(s), or the like. A sPUSCH type or number of repetitions for a sPUSCH transmission may be indicated implicitly or explicitly from higher layer signaling. A DCI associated with a sPUSCH transmission may indicate a sPUSCH type or a number of repetitions for a sPUSCH transmission. A transport block size (TBS) that may be indicated in an associated DCI for a sPUSCH scheduling may determine or may be used to determine a sPUSCH type or a number of repetitions for a sPUSCH transmission(s). A MCS level that may be indicated in an associated DCI for a sPUSCH scheduling may determine or may be used to determine a sPUSCH type or a number of repetitions for a sPUSCH transmission(s). A sCCE aggregation level of a sPDCCH used for an uplink grant of a sPUSCH may determine or may be used to determine a sPUSCH type or a number of repetitions for a sPUSCH transmission(s) for example for the granted sPUSCH transission(s).

Figure 9:
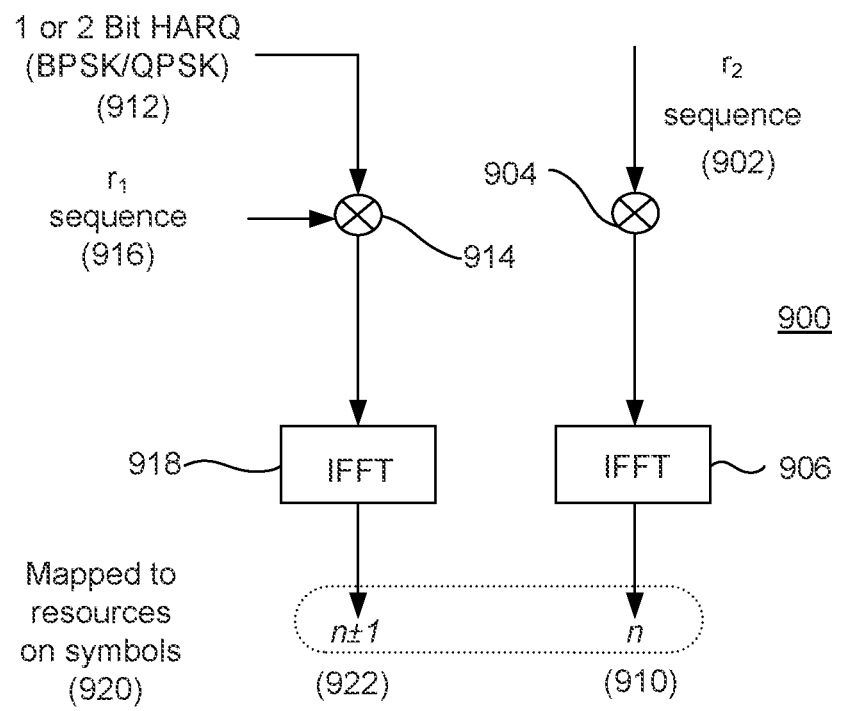
FIG. 9 is an example of a 2-symbol short or sTTI PUCCH (sPUCCH)
Figure 10:
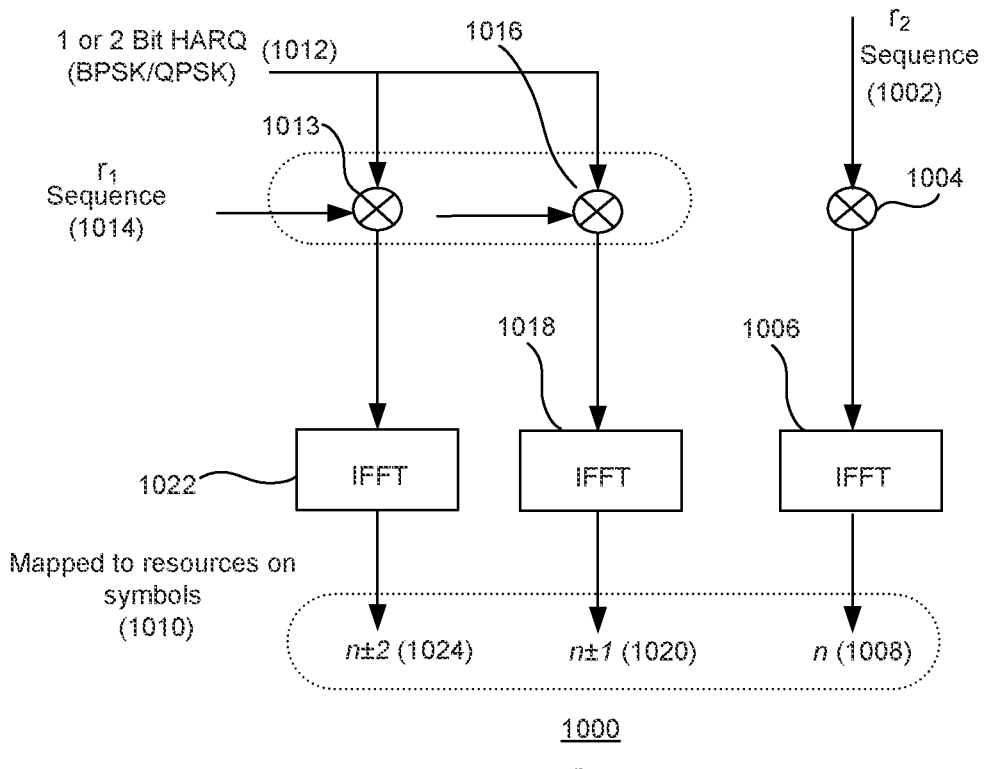
FIG. 10 is an example of a 3-symbol sPUCCH.
Figure 11:
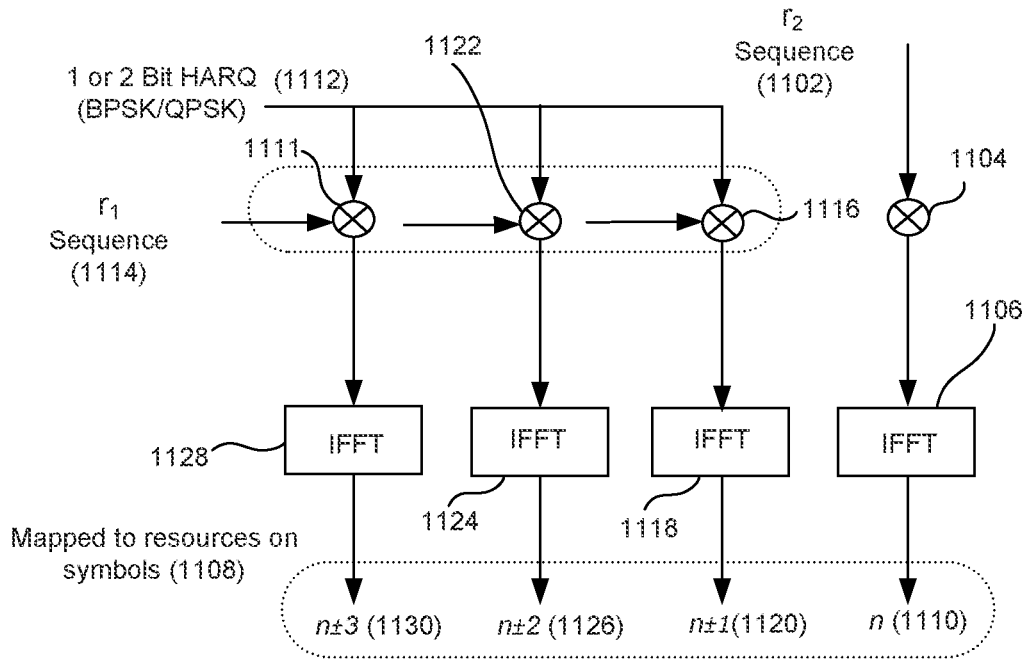
FIG. 11 is an example of a 4-symbol sPUCCH.

FIG. 9 is an example of a 2-symbol short or sTTI PUCCH (sPUCCH) 900, FIG. 10 is an example of a 3-symbol sPUCCH 1000, and FIG. 11 is an example of a 4-symbol sPUCCH 1100. sPUCCH 1000 or 1100 may utilize a cover code on $r_1$ sequence when interference mitigation is desired. A sPUCCH may use a UL reference signal $r_2$ 902 and a number of symbols for transmission of 1 or 2 bits of information such as HARQ feedback 912. HARQ feedback 912 may be modulated using BPSK, QPSK, or the like and combined with sequence $r_1$ 916 by multiplication operation 914. The output of multiplication operation 914 may be processed by inverse fast Fourier transform (IFFT) 918 and mapped to resources on symbols 920.

UL reference signal $r_2$ 902 may be multiplied by 1 at 904. The output of multiplication operation 904 may be processed by inverse fast Fourier transform (IFFT) 906 and mapped to resources on symbols 920. Alternatively, the multiplication at 904 may be skipped and UL reference signal $r_2$ 902 may go directly to the IFFT 906. Sequence $r_1$ 916 and $r_2$ 902 may be sequences or a pair of sequences with desirable correlation properties such as Zadoff-Chu (ZC) or Golay. For a ZC-based configuration, sequence $r_1$ 916 and $r_2$ 902 may be based on different root values (or indices), or based on different cyclic shift of the same root value (or index). sPUCCH 900, 1000, or 1100 may be mapped over m PRB's. The sequence length for $r_1$ sequence may be set to cover 12m subcarriers.

Variables n 910 and n±i, for instance n±1 922, may indicate that a relative position of mapping of UL reference signal $r_2$ 902 in time may be before or after a symbol carrying HARQ feedback 912. The location of a UL reference signal may be placed or moved to between symbols carrying HARQ feedback 912, for example to reduce channel estimation error for other or farther symbols.

For sPUCCH 1000 a UL reference signal $r_2$ 1002 and a number of symbols for transmission of 1 or 2 bits of information such as HARQ feedback 1012 may be utilized. HARQ feedback 1012 may be modulated using BPSK, QPSK, or the like over two symbols. HARQ feedback 1012 may be combined with sequence $r_1$ 1014 by multiplication operation 1016. The output of multiplication operation 1016 may be processed by IFFT 1018 and mapped to resources on symbols 1010 at n±1 1020. HARQ feedback 1012 may also be combined with sequence $r_1$ 1014 by multiplication operation 1013. The output of multiplication operation 1013 may be processed by IFFT 1022 and mapped to resources on symbols 1010 at n±2 1024. UL reference signal $r_2$ 1002 may be multiplied by 1 at 1004 and the output of multiplication operation 1004 may be processed by IFFT 1006 and mapped to resources on symbols 1010 at n 1008. Alternatively the multiplication at 1004 may be skipped.

For sPUCCH 1100 a UL reference signal $r_2$ 1102 and a number of symbols for transmission of 1 or 2 bits of information such as HARQ feedback 1112 may be utilized. HARQ feedback 1112 may be modulated using BPSK, QPSK, or the like over three symbols. HARQ feedback 1112 may be combined with sequence $r_1$ 1114 by multiplication operation 1116. The output of multiplication operation 1116 may be processed by IFFT 1118 and mapped to resources on symbols 1108 at n±1 1120. HARQ feedback 1112 may also be combined with sequence $r_1$ 1114 by multiplication operation 1122. The output of multiplication operation 1122 may be processed by IFFT 1124 and mapped to resources on symbols 1108 at n±2 1126.

HARQ feedback 1112 may also be combined with sequence $r_1$ 1114 by multiplication operation 1111. The output of multiplication operation 1111 may be processed by IFFT 1128 and mapped to resources on symbols 1108 at n±3 1130. UL reference signal $r_2$ 1102 may be multiplied by 1 at 1104. The output of multiplication operation 1104 may be processed by IFFT 1106 and mapped to resources on symbols 1108 at n 1110. Alternatively the multiplication at 1104 may be skipped.

Table 4 shows examples of sPUCCH configurations for a slot with 7 symbols. The indices of the (N)ACK may indicate the corresponding (s)PDSCH payload. A sPUCCH combination may represent the use of a set of symbols for data, for example, ACK/NACK or one or more UL reference signals. The set of symbols may be a sPUCCH resource.

Figure 12:
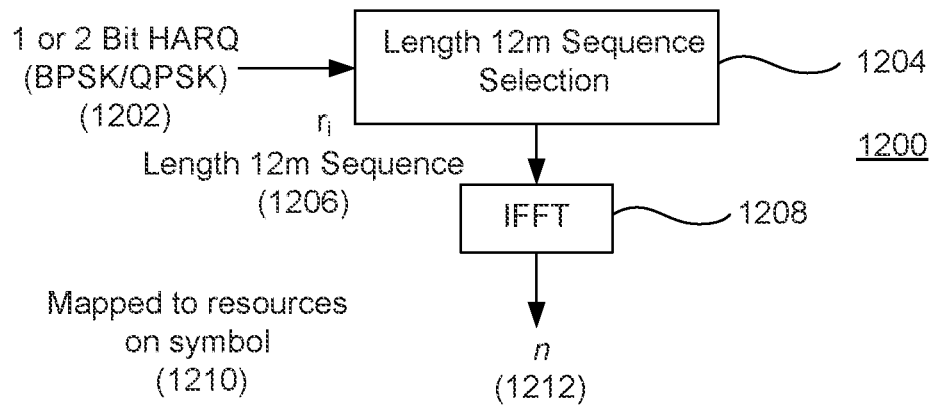
FIG. 12 is an example of a signal structure for a 1-symbol sPUCCH.

FIG. 12 is an example of a signal structure for a 1-symbol sPUCCH 1200. For sPUCCH 1200, an UL reference signal may not be transmitted. HARQ feedback information 1202 comprising of 1 or 2 bits may be communicated utilizing sequence $r_1$ 1206. Sequence length for $r_1$ sequence may be selected by sequence selection component 1204. The output of sequence selection component 1204 may be processed at IFFT 1208 and mapped to resources on symbol 1210 at symbol n 1212. For a ZC-based configuration, HARQ feedback information 1202 may be communicated by choosing a different root of a ZC sequence or based on different cyclic shifts of a same root value.

sPUCCH 1200 may be mapped over m PRB's. A sequence length for $r_i$ sequence may or may be configured to cover 12m subcarriers. A multi-symbol sPUCCH may rely on the transmission(s) of multiple instantiations of 1-symbol. The frequency mapping of each symbol may be done on a same PRB or hopped to a different PRB.

Figure 13:
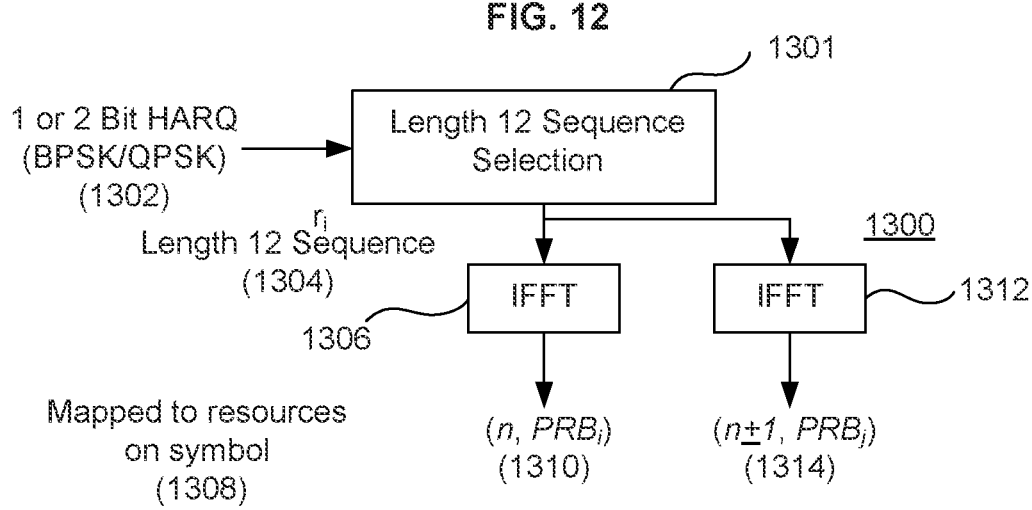
FIG. 13 is an example of a signal structure for a multi-symbol sPUCCH without an UL reference signal.

FIG. 13 is an example of a signal structure for a multi-symbol sPUCCH without an UL reference signal 1300 transmission where $PRB_i$ and $PRB_j$ may be different. HARQ feedback information 1302 comprising of 1 or 2 bits may be communicated utilizing sequence $r_1$ 1304. Sequence length for $r_i$ sequence may be selected by sequence selection component 1301. The output of sequence selection component 1301 may be processed at IFFT 1306 mapped to resources on symbol 1308 at resource (n, $PRB_i$) 1310. The output of sequence selection component 1301 may also be processed at IFFT 1312 mapped to resources on symbol 1308 at resource (n±1, $PRB_j$) 1314.

Figure 14:
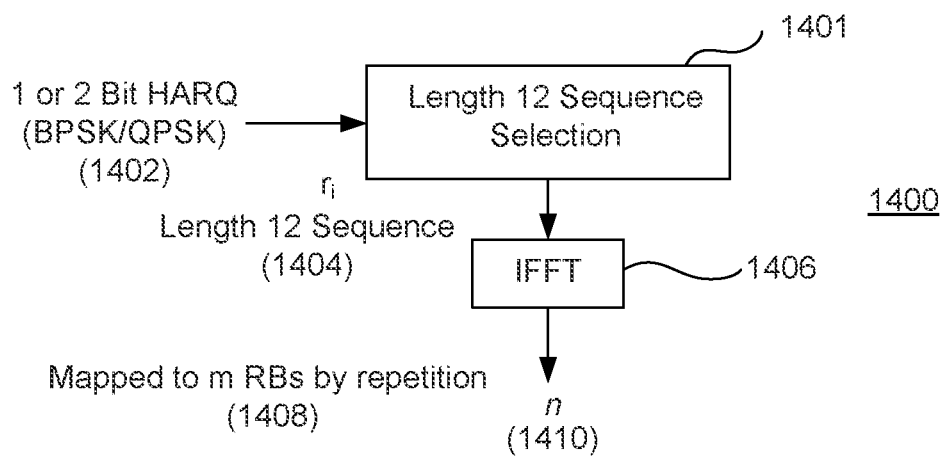
FIG. 14 is an example of a signal structure for a 1-symbol sPUCCH with repetition over several resource blocks (RBs)

FIG. 14 is an example of a signal structure for a 1-symbol sPUCCH with repetition over several RBs 1400. HARQ feedback information 1402 comprising of 1 or 2 bits may be communicated utilizing sequence $r_i$ 1404. Sequence length for $r_i$ sequence may be selected by sequence selection component 1401. The output of sequence selection component 1401 may be processed at IFFT 1406 mapped to m RBs by repetition 1408 at resource n 1410. For this configuration, a sequence with length such as length 12 may be selected and mapped to m RBs on that symbol. Sequence $r_i$ may be repeated over the used RBs.

When there are multiple symbols available for transmission, a selected sequence may be repeated over m RBs on the symbols allocated for data transmission. Table 5 illustrates an example, where sequence r may be repeated over RBs k and k+1 in symbols n and n+3.

TABLE 5

|  | Symbol n | Symbol n + 1 | Symbol n + 2 | Symbol n + 3 |
|---|---|---|---|---|
| RB k | r | RS | RS | r |
| RB k + 1 | r | RS | RS | r |

TABLE 4

| Number of sPUCCH in a 7 Symbol slot | Symbol 1 | Symbol 2 | Symbol 3 | Symbol 4 | Symbol 5 | Symbol 6 | Symbol 7 |
|---|---|---|---|---|---|---|---|
| 1 | $(N)ACK_1$ | $(N)ACK_1$ | $(N)ACK_1$ | UL Ref. | $(N)ACK_1$ | $(N)ACK_1$ | $(N)ACK_1$ |
| 1 | $(N)ACK_{0,1}$ | $(N)ACK_{0,1}$ | $(N)ACK_{0,1}$ | UL Ref. | $(N)ACK_{2,3}$ | $(N)ACK_{2,3}$ | $(N)ACK_{2,3}$ |
| 2 | $(N)ACK_1$ | $(N)ACK_1$ | UL Ref. 1 | $(N)ACK_1$ | $(N)ACK_1$ | UL Ref. 2 | $(N)ACK_2$ |
| 2 | $(N)ACK_1$ | $(N)ACK_1$ | UL Ref. 1 | $(N)ACK_1$ | $(N)ACK_2$ | UL Ref. 2 | $(N)ACK_2$ |
| 3 | $(N)ACK_1$ | UL Ref. 1 | $(N)ACK_2$ | UL Ref. 2 | $(N)ACK_2$ | $(N)ACK_3$ | UL Ref. 3 |

One or more sPUCCH combination configurations that may be available or used may be fixed, configured, signaled, signaled via higher layer signaling, dynamically signaled, indicated in physical layer signaling such as in a DL grant or DCI, or the like. For example, a sPUCCH combination to use for HARQ-ACK feedback associated with a PDSCH, may be indicated in a DCI that grants or allocates the PDSCH.

A sPUCCH combination configuration may be fixed for all configured subframes or vary according to the subframe number. A sPUCCH combination configuration may be based on the frequency location of PRB(s) that may be used for sPUCCH transmission(s) or a subframe number. In FDD, a sPUCCH combination configuration for subframes 0 and 5 may be different from that of other subframes.

A WTRU or a group of WTRUs may or may be configured to use, such as for substantially most of the time, the same $i_{th}$ location for sPUCCH for a fixed or a semi-static sPUCCH combination configuration. A sPUCCH combination configuration may be dynamically signaled through reuse of an existing DCI field or a new 2-3 bit DCI field.

A WTRU may use or may be configured to use a subset of the sequences for sPUCCH that may be defined or used for a regular PUCCH. A WTRU may also use or may be configured to use a set for sPUCCH operation that may not be the same as or may not overlap the set that may be used for regular PUCCH.

One or more uplink short or sTTI transmissions may have a first sTTI length and one or more downlink transmissions may have a second sTTI length, where the first sTTI length and the second sTTI length may be the same or different. One or more uplink short or sTTI channels, such as sPUCCH or sPUSCH, may have a same or a different sTTI length. One or more downlink sTTI channels, such as a sPDSCH or sPDCCH, may have a same or a different sTTI length. The terms short channel and sTTI channel may be used interchangeably.

Figure 15:
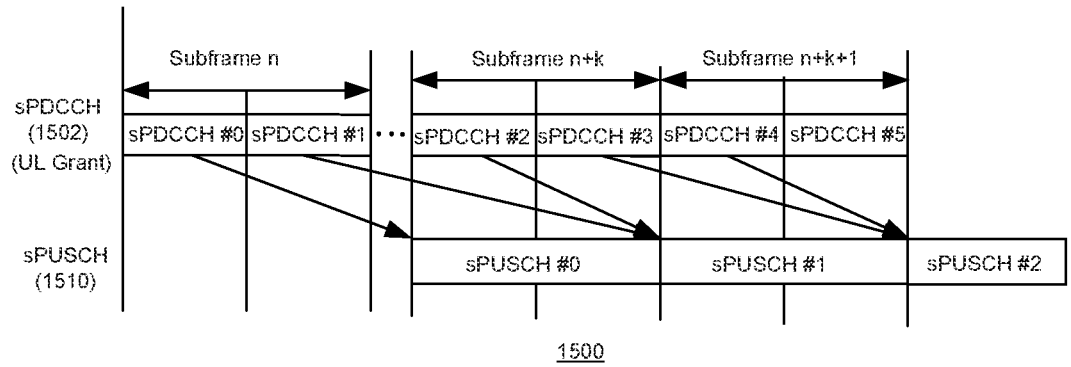
FIG. 15 is an example of short or sTTI PUSCH (sPUSCH) scheduling with one or more associated short or sTTI physical downlink control channel (sPDCCH) regions.

FIG. 15 is an example of short or sTTI PUSCH (sPUSCH) scheduling in communication 1500 with one or more associated short or sTTI PDCCH (sPDCCH) regions of sPDCCH transmission(s) 1502. One or more sPDCCH candidates may be located, transmitted, monitored, or decoded by a WTRU in a sPDCCH region or transmission(s). A WTRU may receive a scheduling grant for sPUSCH transmission(s) 1510 in one or more associated sPDCCH regions or transmission(s). sPUSCH resource #1 for a sPUSCH transmission(s) 1510 may be associated with two sPDCCH regions or transmissions such as sPDCCH #1 of subframe n and sPDCCH #2 of subframe n+k. Correspondingly, sPUSCH resource #2 for a sPUSCH transmission(s) 1510 may be associated with two sPDCCH regions or transmissions such as sPDCCH #3 of subframe n+k and sPDCCH #4 of subframe n+k+1.

A sTTI length for sPUSCH transmission(s) 1510 may be configured to be longer than a sTTI length for an associated sPDSCH. A WTRU may also receive, decode, attempt to decode, or monitor a DCI for a scheduling grant for a sPUSCH transmission(s) 1510. A sPDCCH candidate may carry a DCI for uplink or downlink scheduling.

Figure 16:
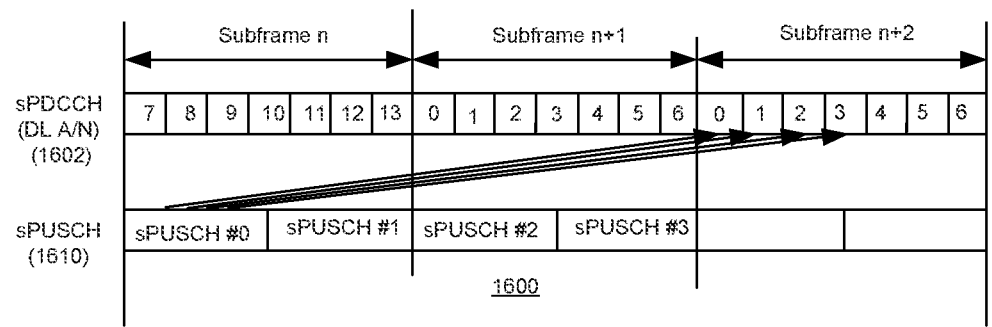
FIG. 16 is an example of an association of a sPUSCH and at least one sPDCCH for HARQ-ACK reception when the UL and DL sTTI lengths are different.

FIG. 16 shows an example of an association of a sPUSCH and at least one sPDCCH 1602 for HARQ-ACK reception when the UL and DL sTTI lengths are different. In communication 1600, one or more sPDCCH regions may be associated with a sPUSCH region for sPUSCH scheduling or HARQ-ACK transmission(s) or reporting. For example, sPUSCH transmission(s) in communication 1600 in sPUSCH region or transmission #0 of subframe n may be associated with sPDCCH regions or transmissions #0, #1, #2, and #3 of subframe n+2. In addition, the sTTI length of sPDCCH may be longer than that of sPUSCH.

For sPUSCH transmission(s) 1610, a WTRU may receive a HARQ-ACK, such as on a physical hybrid-ARQ indicator channel (PHICH) associated with a sPUSCH transmission. If a WTRU receives a negative HARQ-ACK or NACK, a WTRU may transmit the same transport block in a pre-defined or a predetermined location. A WTRU may receive an uplink grant with an indication of retransmission, for example, a new data indicator. For this configuration, new data indicator bit in the uplink grant may not be toggled and a WTRU may retransmit the transport block in a scheduled uplink resource related to the uplink grant, wherein if new data indicator bit is toggled, the new data indicator bit is changed from 0 to 1 or 1 to 0. Otherwise, new data indicator bit is not toggled.

The number of sPDCCH regions associated with a sPUSCH region or transmission(s), a sPUSCH sTTI resource, or a sPUSCH sTTI may be determined based on the sTTI length of sPDCCH and the sTTI length of a sPUSCH. As an example, Nsp sPDCCH regions may be associated with a sPUSCH region. Nsp may be determined based on sTTI length of a sPUSCH. If one or more sPUSCH regions have a different sTTI length, Nsp may be different for one or more sPUSCH regions. For certain configurations, a sPUSCH region with a shorter sTTI length may have a smaller number of associated sPDCCH regions and a sPUSCH region with a longer sTTI length may have a larger number of associated sPDCCH regions.

Nsp may be determined based on a sTTI length of a sPDCCH or sPDCCH region or a time location of a sPDCCH region or a sPUSCH region. For example, a first sPUSCH region in a sTTI time window may have a larger Nsp than a subsequent or last sPUSCH region in the same sTTI time window. Nsp may be determined based on a SFN or hyper-SFN for a sPUSCH region, a sPUSCH region index within a sTTI time window, a sPUCCH type, a sPUSCH type, or the like.

A WTRU may monitor, attempt to decode, or receive a UL DCI or DL HARQ-ACK for a sPUSCH transmission(s) in a sPDCCH region. A WTRU may monitor a subset of Nsp sPDCCH regions for a UL DCI, UL grant, uplink grant, sPUSCH scheduling DCI, DCI for a UL grant, or the like. An UL DCI may include scheduling information related to a sPUSCH transmission(s). The UL DCI or CRC of the UL DCI may be scrambled with a WTRU-specific parameter such as a C-RNTI, WTRU-ID, or the like. The UL DCI size may be the same as a DL DCI. A subset of the Nsp sPDCCH regions may or may be configured as a single sPDCCH region. A WTRU may exclusively monitor, receive, or attempt to decode one sPDCCH region for UL DCI within Nsp sPDCCH regions. A subset of Nsp sPDCCH regions, e.g., for UL DCI for a WTRU, may be determined based on one or more WTRU-specific parameters.

A sPDCCH region within Nsp sPDCCH regions may be determined, by a WTRU, as a function of a modulo operation of Nsp, a WTRU-ID, a C-RNTI, or the like. By distributing the sPDCCH region for a UL DCI in a WTRU-specific manner, the sPDCCH blocking probability for a UL DCI may be reduced. In addition, when more than one sPDCCH region is included in a subset of the Nsp sPDCCH regions that may be used for a UL DCI, for example, by or for a WTRU, the number of sPDCCH candidates that may be monitored by a WTRU may be split among the subset of sPDCCH regions.

A sPDCCH region within Nsp sPDCCH regions associated with a sPUSCH resource may have a sPDCCH region index. The index may be a function of the time or frequency location of the sPDCCH region. The index may be a function of its position in time or frequency within the Nsp sPDCCH regions. In addition, the subset of Nsp sPDCCH regions e.g., for UL DCI for one or more WTRUs, may be determined based on the time (or frequency) location or sPDCCH region index. For example, a first sPDCCH region in Nsp sPDCCH regions may be determined as the subset of Nsp sPDCCH regions that may be used for a UL DCI. The first sPDCCH region may be the region earliest in time, the region with the lowest frequency, the region with the highest frequency, the region with the lowest index, or the like.

The subset of Nsp sPDCCH regions may be determined based on the sPDCCH region index and/or system parameters, wherein the system parameters may include at least one of physical cell-ID (PCID), slot number, subframe number, and radio frame number. For example, a modulo operation with sPDCCH region index and PCID may be used. A subset of Nsp sPDCCH regions may also be determined based on sPDCCH regions that may be used, monitored, determined, or configured for a DL DCI for a sPDSCH transmission(s). For example, if a WTRU is configured or determined to monitor a subset of sPDCCH regions for a DL DCI which may be the same subset for a UL DCI.

A WTRU may monitor a DL DCI and a UL DCI in a same set of sPDCCH regions, transmissions, or candidates. The DL DCI may be a DCI used for a fallback transmission and determined based on a configured transmission scheme or mode. In a configuration, a subset of Nsp sPDCCH regions may be determined based on the presence of a predefined signal. For example, a predefined signal may be transmitted in a first sPDCCH region and the predefined signal may indicate the subset of Nsp sPDCCH regions for a UL DCI.

sPDCCH candidates for UL DCI may be located in Nsp sPDCCH regions. At least one of the sPDCCH candidates located in Nsp sPDCCH regions may be used for a UL DCI. For example, Ntot sPDCCH candidates may be used, configured, or monitored in a sPDCCH region when Nsp=1. The Ntot sPDCCH candidates may be split among Nsp sPDCCH regions, for example when Nsp>1. The Ntot sPDCCH candidates may be evenly distributed over Nsp sPDCCH regions. For example, if Ntot=16 and Nsp=4, each sPDCCH region may include 4 sPDCCH candidates for a UL grant.

A subset of sCCE aggregation levels (ALs) may be monitored in a sPDCCH region. For example, if sCCE aggregation levels {1, 2, 4, 8} are used and Nsp=4, sPDCCH candidates with sCCE AL {1} may be monitored in a first sPDCCH region and sPDCCH candidates with sCCE AL {2} may be monitored in a second sPDCCH region, and so on. The search space of each sPDCCH region, for example, a starting sCCE number for each sCCE aggregation level may be determined based on sPDCCH region index, WTRU-ID, a predefined number, a hashing parameter, or the like.

A sPDCCH candidate may be transmitted over one or more sPDCCH regions within Nsp sPDCCH regions. In addition, one or more sPDCCH candidates in a search space may be repetitively transmitted over Nsp sPDCCH regions. sCCEs for a sPDCCH candidate may also be distributed over Nsp sPDCCH regions. The number of repetitions of a sPDCCH candidate within Nsp sPDCCH regions may be determined based on a search space type, a WTRU-specific search space, a common search space, the number of sPDCCH regions, Nsp, a WTRU coverage level, a configured coverage level, a determined coverage level, or a higher layer configured number. sCCEs may be numbered from 0 to Ncce-1 by using all configured sCCEs in Nsp sPDCCH regions. Moreover, a set of sCCEs may be selected, determined, configured, or used based on a search space determination.

Figure 17:
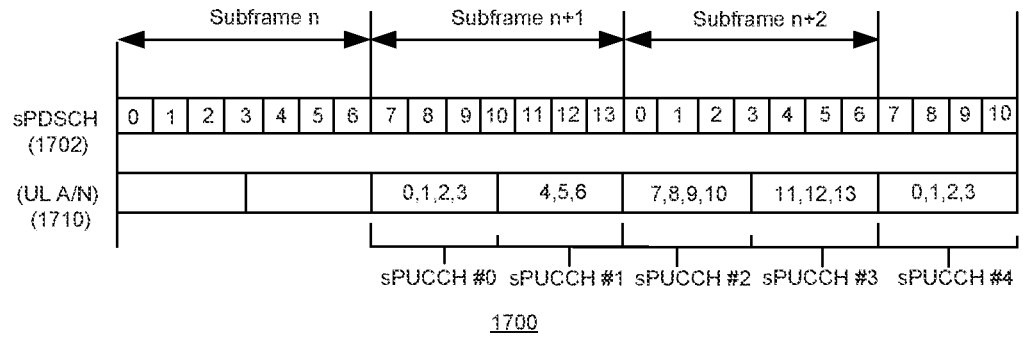
FIG. 17 is an example of an association of a sPUCCH for HARQ-ACK transmission and at least one short or sTTI physical downlink shared data channel (sPDSCH) when the UL and DL sTTI length are different.

FIG. 17 shows an example of an association of a sPUCCH for HARQ-ACK transmission 1710 and at least one short or sTTI physical downlink shared data channel (sPDSCH) when the UL and DL sTTI length are different. In communication 1700, the sTTI length for sPDSCH transmission(s) 1702 may be shorter than the sTTI length for sPUCCH regions #0-#4. For example, the sPDSCH regions #0, #1, #2, and #3 of subframe n+1 may be associated with a sPUCCH region #0. Put another way, in communication 1700 the sTTI length of a sPUCCH region #0 is longer than the sTTI length of a sPDSCH transmission(s) 1702.

One or more sPDSCH regions may be associated with a sPUCCH region, resource, or transmission for HARQ-ACK transmissions. For example, in communication 1700 a WTRU may receive a sPDSCH in a first sPDSCH region #1 and may receive a sPDSCH in a second sPDSCH region #3 while the HARQ-ACK transmissions or reporting for the first sPDSCH region #1 and the second sPDSCH region #3 may be associated with sPUCCH region #0.

In communication 1700, sPUCCH #0 may be associated with one or more sPDSCHs and may include one or more sPUCCH resources. A WTRU may send a HARQ-ACK in uplink using a sPUCCH resource in an associated sPUCCH region after reception of a sPDSCH.

In a sPUCCH region, one or more sPUCCH resources may be defined, configured, determined, or indicated as at least one of a PRB index, UL symbol number(s), cyclic shift index, tone, subcarrier index, or the like. One or more DL sTTI transmissions, for example, sPDCCH or sPDSCH, may be associated with a sPUCCH region and a sPUCCH resource based on a starting DL symbol, an OFDM symbol number of a DL sTTI transmission, a DL sTTI resource index, a sTTI number or index in a sTTI time window, or the like. One or more DL sTTI transmissions in a sTTI time window may also have a different starting DL symbol number or index. For example, a first DL sTTI transmission may start from the DL symbol #2 and a second DL sTTI transmission may start from the DL symbol #4. One or more DL sTTI transmissions in a sTTI time window may be indexed in an increasing order.

A set of sPUCCH resources may be configured, reserved, used, determined, or indicated to be associated with a DL sTTI. When a sPUCCH region is associated with Ndstti downlink sTTI resources, Ndstti sets of sPUCCH resources may be configured, used, or determined within a sPUCCH region and a set of sPUCCH resources may be determined based on the downlink sTTI time location, a starting OFDM symbol, a DL sTTI number, or the like. Nstti sets of sPUCCH resources may be non-overlapped, fully overlapped, partially overlapped, or the like within a sPUCCH region.

In an embodiment, a WTRU may receive one or more DL sTTI transmissions associated with a sPUCCH region and transmit a sPUCCH resource as a HARQ-ACK transmission or report. The sPUCCH resource may contain one or more HARQ-ACK associated with the one or more DL sTTI transmission. When a WTRU receives more than one DL sTTI transmission that may be associated with a sPUCCH region, a single sPUCCH resource may be transmitted. For this configuration, a single sPUCCH resource may be used to transmit a bundled HARQ-ACK transmission or report. For example, a WTRU may send a negative HARQ-ACK or NACK for the one or more DL sTTI transmissions if at least one of the DL sTTI transmissions has an error. An error may be when a WTRU may fail to receive at least one of the DL sTTI transmissions. If all configured DL sTTI transmissions are received without an error, a WTRU may send a positive HARQ-ACK or ACK.

A first sPUCCH resource may be used for a bundled HARQ-ACK transmission or report that may be associated with a first DL sTTI transmission within one or more DL sTTI transmissions for a WTRU. A single sPUCCH resource may be selected, determined, or used within a set of sPUCCH resources to indicate one or more HARQ-ACK transmissions or reporting. The selection of a sPUCCH resource may indicate HARQ-ACK information. For example, if a WTRU selects or uses a first sPUCCH resource, the selection may indicate a negative HARQ-ACK for a second DL sTTI transmission. If a WTRU selects or uses a second sPUCCH resource, the selection may indicate a positive HARQ-ACK for a second DL sTTI transmission. In addition, for the examples given herewith, a constellation of a modulation scheme or a modulation scheme, such as BPSK or QPSK, may be used to indicate positive/negative HARQ-ACK.

Table 6 shows an example of HARQ-ACK transmission or reporting with sPUCCH resource selection and QPSK modulation when a WTRU is scheduled a sPDSCH in one or more sPDSCH resources associated with a sPUCCH region. If a single sPDSCH is scheduled in one or more sPDSCH resources, a sPUCCH resource may be associated with a sPDSCH for HARQ-ACK transmission or reporting. If multiple codewords are transmitted, a QPSK constellation, for example constellation 0 (00), 1 (01), 2 (10), and 3 (11), may indicate the HARQ-ACK information of two codewords. If a single codeword is used, BPSK may be used or a subset of QPSK constellation may be used.

TABLE 6

|  | QPSK (00) | QPSK (01) | QPSK (10) | QPSK (11) |
|---|---|---|---|---|
| sPUCCH Resource #0 | sPDSCH#1: ACK | — | sPDSCH#1: NACK | — |
| sPUCCH Resource #1 | sPDSCH#2: ACK | — | sPDSCH#2: NACK | — |
| sPUCCH Resource #2 | sPDSCH#3: ACK | — | sPDSCH#3: NACK | — |
| sPUCCH Resource #3 | sPDSCH#4: ACK | — | sPDSCH#4: NACK | — |

Tables 7 and 8 show examples of HARQ-ACK transmissions or reporting with sPUCCH resource selection and QPSK modulation. A WTRU may select or determine a sPUCCH resource selection and a QPSK constellation to indicate HARQ-ACK of one or more sPDSCH transmissions. If multiple scheduled sPDSCHs for a WTRU are associated with a sPUCCH, the WTRU may select or determine a sPUCCH resource within a set of sPUCCH resources and a constellation of a modulation scheme. The combination of sPUCCH resource selection and constellation selection of a modulation scheme may indicate HARQ-ACK information for one or more sPDSCHs received. If a WTRU receives one or more sPDSCHs associated with a sPUCCH region, a HARQ-ACK(k) may be sent, where k may be determined based on the ACK, NACK, or DTX of the one or more sPDSCHs received. In Table 8, NACK may be interchangeably used with discontinuous transmission (DTX) and NACK/DTX.

TABLE 7

|  | QPSK (00) | QPSK (01) | QPSK (10) | QPSK (11) |
|---|---|---|---|---|
| sPUCCH Resource #0 | HARQ-ACK (1) | HARQ-ACK (2) | HARQ-ACK (3) | HARQ-ACK (4) |
| sPUCCH Resource #1 | HARQ-ACK (5) | HARQ-ACK (6) | HARQ-ACK (7) | HARQ-ACK (8) |
| sPUCCH Resource #2 | HARQ-ACK (9) | HARQ-ACK (10) | HARQ-ACK (11) | HARQ-ACK (12) |

TABLE 7-continued

|  | QPSK (00) | QPSK (01) | QPSK (10) | QPSK (11) |
|---|---|---|---|---|
| sPUCCH Resource #3 | HARQ-ACK (13) | HARQ-ACK (14) | HARQ-ACK (15) | HARQ-ACK (16) |

In an embodiment, one or more HARQ-ACK (k) association rules or types may be used to support a different combination of sPDSCH scheduling or sPDSCH and normal PDSCH (nPDSCH) scheduling. Table 8 shows an example type-1 association rule. Table 9 shows an example type-2 association rule. One or more HARQ-ACK (k) association rules may be predefined, preconfigured, or determined based on at least one of the number of sPDSCHs associated with a sPUCCH region, a sTTI length of sPDSCH and/or sPUCCH, or a sTTI time window (e.g., sTTI time window size). A HARQ-ACK (k) association rule or type for a sTTI time window may be determined based on an indication from a DCI, a first DCI such as a first DCI in or for the sTTI time window, that may be used to schedule or indicate a sTTI resource, an indication from a DCI that may be used to schedule one or more sPDSCHs, the number of sPDSCHs scheduled in a sTTI time window, a higher layer configuration, a sTTI time window number, or the like. A HARQ-ACK (k) association rule or type for a sTTI time window may also be determined based on a subframe number, a larger time window such as a radio frame, a SFN number, a Hyper-SFN number, or a predefined or known signal that may be used as a sTTI-resource indicator, for example, that may be used to indicate the presence of a sTTI resource within a sTTI time window.

TABLE 8

|  | sPDSCH #1 | sPDSCH #2 | sPDSCH #3 | sPDSCH #4 |
|---|---|---|---|---|
| HARQ-ACK (1) | ACK | ACK | ACK | ACK |
| HARQ-ACK (2) | ACK | ACK | ACK | NACK/DTX |
| HARQ-ACK (3) | ACK | ACK | NACK/DTX | ACK |
| HARQ-ACK (4) | ACK | ACK | NACK/DTX | NACK/DTX |
| HARQ-ACK (5) | ACK | NACK/DTX | ACK | ACK |
| HARQ-ACK (6) | ACK | NACK/DTX | ACK | NACK/DTX |
| HARQ-ACK (7) | ACK | NACK/DTX | NACK/DTX | ACK |
| HARQ-ACK (8) | ACK | NACK/DTX | NACK/DTX | NACK/DTX |
| HARQ-ACK (9) | NACK/DTX | ACK | ACK | ACK |
| HARQ-ACK (10) | NACK/DTX | ACK | ACK | NACK/DTX |
| HARQ-ACK (11) | NACK/DTX | ACK | NACK/DTX | ACK |
| HARQ-ACK (12) | NACK/DTX | ACK | NACK/DTX | NACK/DTX |
| HARQ-ACK (13) | NACK/DTX | NACK/DTX | ACK | ACK |
| HARQ-ACK (14) | NACK/DTX | NACK/DTX | ACK | NACK/DTX |
| HARQ-ACK (15) | NACK/DTX | NACK/DTX | NACK/DTX | ACK |
| HARQ-ACK (16) | NACK/DTX | NACK/DTX | NACK/DTX | NACK/DTX |

TABLE 9

| | sPDSCH #1 | sPDSCH #2 | sPDSCH #3 | sPDSCH #4 |
|---|---|---|---|---|
| HARQ-ACK (1) | ACK | — | — | — |
| HARQ-ACK (2) | NACK | — | — | — |
| HARQ-ACK (3) | ACK | ACK | — | — |
| HARQ-ACK (4) | ACK | NACK | — | — |
| HARQ-ACK (5) | — | ACK | — | — |
| HARQ-ACK (6) | — | NACK | — | — |
| HARQ-ACK (7) | NACK | ACK | — | — |
| HARQ-ACK (8) | NACK | NACK | — | — |
| HARQ-ACK (9) | — | — | ACK | — |
| HARQ-ACK (10) | — | — | NACK | — |
| HARQ-ACK (11) | — | — | ACK | ACK |
| HARQ-ACK (12) | — | — | ACK | NACK |
| HARQ-ACK (13) | — | — | — | ACK |
| HARQ-ACK (14) | — | — | — | NACK |
| HARQ-ACK (15) | — | — | NACK | ACK |
| HARQ-ACK (16) | — | — | NACK | NACK |

A first HARQ-ACK(k) type-1 association rule may be used when a WTRU is scheduled for a plurality of sPDSCHs, for example, 4 sPDSCHs, in a sTTI time window. A second HARQ-ACK(k) type-2 association rule, may be used when one or more WTRUs may be scheduled for one or more sPDSCHs in a sTTI time window. A type-1 HARQ-ACK (k) association rule may allow that a WTRU is scheduled with N1 sPDSCHs within a sTTI time window and a type-2 HARQ-ACK (k) association rule may allow a WTRU to be scheduled with N2 sPDSCHs. N1 and N2 may be different.

In an embodiment, a WTRU may perform sPUCCH resource selection for a HARQ-ACK transmission or reporting based on a number of sPDSCH transmissions within a sTTI time window or the number of sPDSCHs associated with a sPUCCH region. A sTTI time window may be determined based on the number of sPDSCHs associated with a sPUCCH region or the sTTI length of each sPDSCH. For example, if sPDSCH length is Nstti symbols and Nsp sPDSCHs are associated with a same sPUCCH, the sTTI time window may be Nstti×Nsp [symbols]. A sTTI time window may also be a predefined parameter, a configured parameter, a subframe, or the like. If a single sPDSCH is received or scheduled in a sTTI time window, a WTRU may use a sPUCCH resource corresponding to the sPDSCH for HARQ-ACK transmission or reporting. If multiple sPDSCHs are received or scheduled in a sTTI time window, a WTRU may determine or select a sPUCCH resource within a set of sPUCCH resources for HARQ-ACK transmission or reporting.

In some examples and embodiments described herein, two transmissions with different TTIs are used where one TTI is shorter that the other. The examples and embodiments may be applied to any number of transmissions, TTIs, and overlaps. In the examples, the shorter TTI may be referred to as sTTI and the longer TTI may be referred to as nTTI. An nTTI may be a normal or regular TTI or subframe that may be 1 ms in duration. An nTTI may be a LTE-A TTI or subframe. A subframe may be a non-limiting example of a nTTI. Another TTI or time period may be used and still be consistent with the examples and embodiments described herein.

A PDSCH transmission based on or that uses nTTI may be referred to as nPDSCH. A PDSCH transmission based on or that uses sTTI may be referred to as sPDSCH. A PUCCH transmission or PUCCH format transmission based on or that uses nTTI may be referred to as nPUCCH and a PUSCH transmission based on or that uses nTTI may be referred to as nPUSCH. PDSCH may be used to represent PDSCH, nPDSCH, or sPDSCH in the examples and embodiments described herein. PUSCH may be used to represent PUSCH, nPUSCH or sPUSCH in the examples and embodiments described herein. PUCCH may be used to represent PUCCH, nPUCCH, or sPUCCH in the examples and embodiments described herein.

An associated HARQ-ACK for a PDSCH such as an nPDSCH or sPDSCH, may be transmitted in the TTI n+k when the PDSCH may be received by a WTRU in the TTI n, wherein k may be a positive integer. For example, if a WTRU received a sPDSCH in TTI n, the WTRU may transmit an associated HARQ-ACK in the TTI n+k. In the examples and embodiments described herein, TTI may be replaced by nTTI or sTTI. In addition, if a TTI length is the same as subframe length, the TTI may be replaced by subframe.

A WTRU may receive an nPDSCH in a subframe. A WTRU may receive one or more sPDSCHs in a subframe, for example instead or in addition to an nPDSCH. When the UL HARQ-ACK timing is different between nPDSCH and sPDSCH, an associated HARQ-ACK for both nPDSCH and sPDSCH may need to be or may be scheduled to be transmitted from a WTRU in the same uplink subframe, which may be referred to as a HARQ-ACK collision for the nTTI and sTTI.

Figure 18:
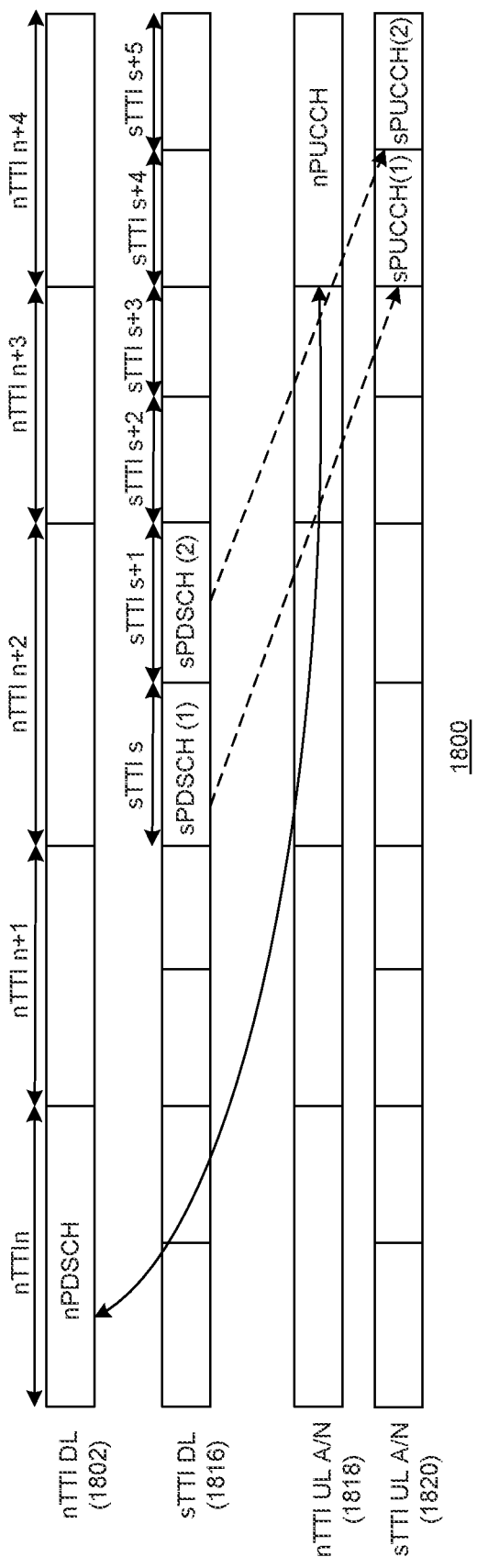
FIG. 18 is an example of a collision occurring between a PUCCH and an sPUCCH.

FIG. 18 is an example of a HARQ-ACK collision occurring between a nPUCCH and a sPUCCH. Communication 1800 may comprise nTTI DL 1802, sTTI DL 1816, nTTI UL A/N 1818, and sTTI UL A/N 1820. A HARQ-ACK collision for nTTI and sTTI may occur when a WTRU receives an nPDSCH in nTTI n and receives sPDSCH(1) and sPDSCH (2) in nTTI n+2 and a WTRU may transmit HARQ-ACKs for these transmissions in the same uplink subframe nTTI n+4 as nPUCCH, sPUCCH(1), or sPUCCH(2).

A HARQ-ACK for nPDSCH may be or may be referred to as a normal or nTTI HARQ (nHARQ), nACK, nNACK, nHARQ-ACK, nHARQ-NACK, nACKNACK, or the like. nHARQ, nACK, nNACK, nHARQ-ACK, nHARQ-NACK, nACKNACK may be used interchangeably herein. In addition, HARQ-ACK for sPDSCH may be or may be referred to as a short or sTTI HARQ (sHARQ), sACK, sNACK, sHARQ-ACK, sHARQ-NACK, sACKNACK, or the like. sHARQ, sACK, sNACK, sHARQ-ACK, sHARQ-NACK, and sACKNACK may be used interchangeably herein. Furthermore, HARQ, ACK, NACK, HARQ-ACK, HARQ-NACK, and ACKNACK may be used interchangeably herein.

In an embodiment, nHARQ and sHARQ may be multiplexed in a PUCCH transmission when a WTRU may or may need to transmit nHARQ and sHARQ in a subframe. The PUCCH transmission may be at least one of a nPUCCH or sPUCCH transmission. For example, one or more sHARQs may be transmitted together with nHARQ using a single PUCCH transmission or PUCCH format transmission.

One or more nPUCCH formats may be used and a first nPUCCH format may be used if nHARQ is transmitted and a second nPUCCH format may be used if nHARQ and sHARQ are multiplexed in the PUCCH transmission. The first nPUCCH format may be or may be configured as PUCCH format 1a/1b and the second nPUCCH format may be or may be configured as PUCCH format 2/2a/2b. The HARQ-ACK bits for sHARQ may be transmitted in a CQI part of the PUCCH format 2a/2b and HARQ-ACK bits for nHARQ may transmitted in an ACK/NACK part of the PUCCH format 2a/2b. HARQ-ACK bits for nHARQ and sHARQ may be transmitted in a CQI part of PUCCH format 2/2a/2b.

In addition, a first nPUCCH format may be PUCCH format 1a/1b and a second nPUCCH format may be PUCCH format 3. A first nPUCCH format may be PUCCH format 1a and a second nPUCCH format may be PUCCH format 1b. When PUCCH format 1b may be utilized, the bit location(s) for nHARQ and sHARQ may be predetermined. For example, the first HARQ-ACK bit in the format may be used for nHARQ and the second HARQ-ACK bit may be used for sHARQ, or vice versa. Bundling may be utilized if more than one HARQ-ACK bit for nHARQ or more than one HARQ-ACK bit for sHARQ is to be transmitted or is transmitted. For example, if more than one HARQ-ACK bit for nHARQ may be or is to be transmitted, the one or more HARQ-ACK bits for nHARQ may be bundled. If more than one HARQ-ACK bit for sHARQ may be or is to be transmitted, the one or more HARQ-ACK bits for sHARQ may be bundled. The nHARQ and sHARQ HARQ-ACK bits may or may also be bundled separately.

An nPUCCH format may be a PUCCH format such as a legacy PUCCH format. One or more sPUCCH formats may be used where a first sPUCCH format may be used if sHARQ is transmitted, for example if only sHARQ is transmitted, and a second sPUCCH format may be used if sHARQ and nHARQ are multiplexed in the sPUCCH transmission.

One or more PUCCH types that may be an nPUCCH type or a sPUCCH type may be used for nHARQ or sHARQ transmission. An associated DCI for nPDSCH or sPDSCH may indicate the corresponding PUCCH type to use. For example, a WTRU may receive an indication related to PUCCH type from a DCI associated with sPDSCH and the WTRU may determine the multiplexing of nHARQ and sHARQ based on the indication. A PUCCH type may be a PUCCH format and vice versa.

A PUCCH type may be determined based on the number of HARQ-ACK types that may be transmitted where a HARQ-ACK type may be nHARQ or sHARQ. For example, a first PUCCH type may be used if one HARQ-ACK type such as nHARQ or sHARQ may be transmitted and a second PUCCH type may be used if more than one HARQ-ACK type such as nHARQ and sHARQ may be transmitted.

A WTRU may determine the presence of an nPDSCH in an earlier subframe based on a PUCCH type indicated in a DCI. For example, for a subframe in which a WTRU may transmit one or more sHARQs, the WTRU may determine whether to transmit or also transmit nHARQ based on a PUCCH type indication. The nHARQ may be associated with a nPDSCH that may have been present but the WTRU may not have received or successfully received. The WTRU may determine the presence of nPDSCH associated with nHARQ for the subframe for the HARQ transmission based on a PUCCH type indication. The PUCCH type indication may be received by the WTRU with a DCI associated with a sPDSCH transmission for which the sHARQ is to be transmitted. Moreover, a PUCCH type indication may be replaced by an nPDSCH presence indication. A nPDSCH presence indication may be provided or received in an nTTI such as an nTTI that may be associated with the nHARQ transmission or an nTTI that may be associated with the sHARQ transmission in the same uplink subframe as the nHARQ transmission for the transmitted nPDSCH. An nTTI that may be associated with a sHARQ transmission may be the nTTI in which the sPDSCH associated with the sHARQ may be received.

A WTRU may also transmit or may be configured to transmit a nHARQ by using a sPUCCH, for example if the WTRU may or may need to transmit nHARQ and sHARQ in a same subframe. For example, a WTRU may transmit nHARQ by using a sPUCCH in a sTTI when the WTRU may not have any uplink transmissions, for example scheduled or configured uplink transmissions, associated with the sTTI.

A sPUCCH resource in a subframe may be reserved for nHARQ. A WTRU may determine the sPUCCH resource for nHARQ in a subframe. The sPUCCH resource for nHARQ in a subframe may be determined based on higher layer signaling, a dynamic indication from a DCI, a DCI for a sPDSCH, a sPUCCH in a first sTTI in which a WTRU may not be scheduled, a sPUCCH in a reserved sTTI for nHARQ, or the like. For a reserved sTTI, a WTRU-specific manner may be utilized to determine the sTTI. WTRU-specific higher layer signaling may be used to indicate or determine a reserved sTTI. One or more WTRU-specific parameters such as WTRU-ID may be used, for example by a WTRU, to determine a reserved sTTI. The reserved sTTI may be determined in a cell-specific manner or from cell-specific parameters.

A WTRU may determine an available sPUCCH resource in a subframe to transmit nHARQ. A WTRU may transmit nHARQ in a sPUCCH resource when there is an available sPUCCH resource. When a sPUCCH resource is unavailable, a WTRU may or may be configured to drop one or more nHARQs in a subframe, delay the transmission of one or more nHARQs to a later subframe, concurrently transmit a sPUCCH for sHARQ and nPUCCH for nHARQ, or the like. When a sPUCCH resource is unavailable, a WTRU may or may also be configured to multiplex nHARQ and sHARQ in a PUCCH transmission such as an nPUCCH or a sPUCCH transmission, multiplex nHARQ and sHARQ in a PUSCH transmission such as an nPUSCH or a sPUSCH transmission, or the like.

A set of sTTI resources in a subframe may be restricted or reserved for example for sPUCCH or sHARQ or sPUCCH carrying sHARQ. For example, a number such as four sTTI resources may be defined or configured in a subframe and a subset of the number of sTTI resources may be configured in or used by a WTRU. The configuration may identify or restrict the use of the subset of resources for a specific use such as sPUCCH or sHARQ or sPUCCH carrying sHARQ. The UE may use the sTTI resources in the subset for sPUCCH or sHARQ or sPUCCH carrying sHARQ. The sTTI resources that may not be in the subset may be used as an available sPUCCH resource for nHARQ.

Figure 19:
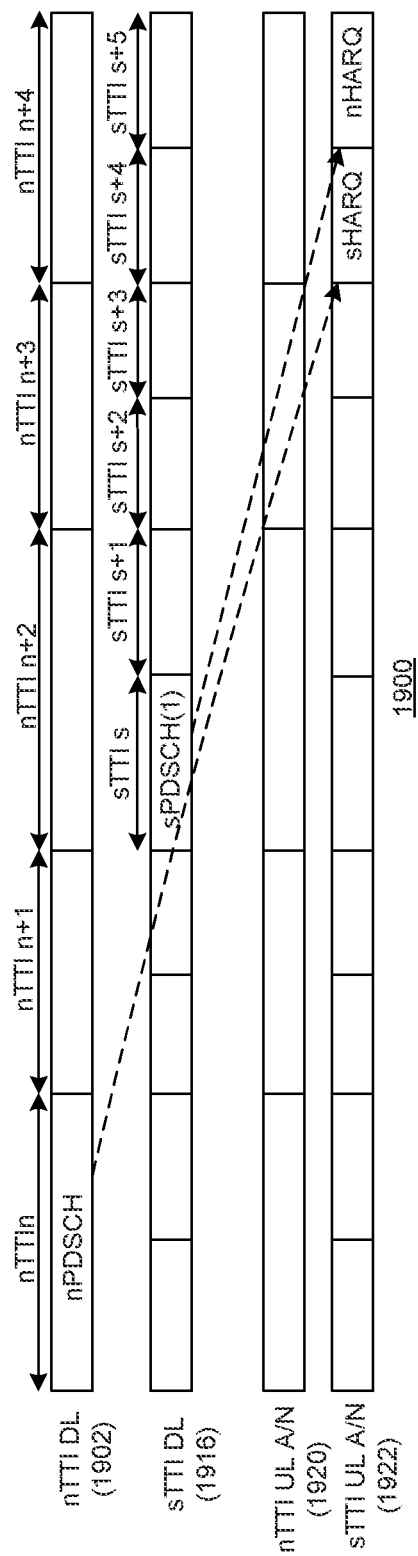
FIG. 19 is an example of a normal HARQ (nHARQ) transmission on an sPUCCH.

FIG. 19 is an example of a HARQ transmission on a sPUCCH. Communication 1900 may comprise nTTI DL 1902, sTTI DL 1916, nTTI UL A/N 1920, and sTTI UL A/N 1922. In the example, an unused sPUCCH resource in a sTTI may be used for nHARQ transmission. In communication 1900, a sPUCCH resource in a second sTTI or sTTI s+5 in nTTI n+4 may be used for nHARQ transmission since a WTRU may not have an uplink transmission associated with the sTTI. An unused sPUCCH resource may be referred to as sPUCCH resource in a sTTI even when a WTRU may not be scheduled for uplink transmission. An unused sPUCCH resource may be an available sPUCCH resource for nHARQ and vice versa.

In an embodiment, one or more sPUCCH resources in a sTTI may be used to transmit nHARQ and sHARQ. For example, Ncs sPUCCH resources in a sTTI may be reserved for a WTRU and one of the reserved sPUCCH resources may be selected or determined based on the HARQ-ACK information (e.g., ACK or NACK) of the nHARQ.

A set of sPUCCH resources may be reserved, determined, configured, or used based on a sPUCCH resource associated with a sPDSCH transmission. For example, a first sPUCCH resource in the set may be determined based on one or more parameters of a sPDSCH transmission and the rest of the sPUCCH resources in the set may be determined as a function of the first sPUCCH resource index. Consecutive Ncs sPUCCH resource indices from the first sPUCCH resource index may be used for a set. The parameters of sPDSCH transmission that may determine the set of sPUCCH resources may include a starting CCE index of the DCI associated with sPDSCH transmission, a starting PRB index of sPDSCH transmission, a starting symbol index of the sPDSCH transmission, a number of PRBs allocated, a MCS level, a transport block size, or the like.

A set of sPUCCH resources may be reserved, determined, configured, or used based on a higher layer configuration or a dynamic indication from a DCI.

In the examples and embodiments, nHARQ and sHARQ may be switched or substituted for each other. In the examples and embodiments, sPUCCH and nPUCCH may be switched or substituted for each other.

For a one bit nHARQ transmission, two sPUCCH resources in a sTTI may be reserved, allocated, or used where one of the two sPUCCH resources may be selected or determined by a WTRU based on HARQ-ACK information of nHARQ. For example, a first sPUCCH resource may be selected to indicate nHARQ ACK and a second sPUCCH resource may be selected to indicate nHARQ NACK. The selected sPUCCH resource may be used for sHARQ transmission. Alternatively, a sPUCCH resource may be selected or determined based on HARQ-ACK information of a sHARQ and the selected or determined sPUCCH resource may be used for nHARQ transmission. HARQ-ACK information may be ACK or NACK.

One or more nPUCCH resources in an nTTI may be used to transmit nHARQ and sHARQ. Ncs nPUCCH resources in an nTTI may be reserved or allocated and one of the Ncs nPUCCH resources may be selected or determined based on HARQ-ACK information of sHARQ. The selected nPUCCH resource may be used to transmit nHARQ.

When a WTRU is scheduled to transmit nPUCCH and sPUCCH in a sTTI, the WTRU may drop the nPUCCH or sPUCCH transmission in the sTTI if the frequency resource of nPUCCH and the frequency resource of sPUCCH are fully or partially overlapped. For the examples given herewith, dropping a transmission may include not making or not transmitting the transmission, scaling the power of the transmission to zero, setting the power of the transmission to zero, substantially zero, or the like. The dropping of nPUCCH in a sTTI may include dropping the nPUCCH symbol(s) that may be located in the sTTI, or dropping the nPUCCH in the subframe. When a sPUCCH in a sTTI is dropped, transmission of the sPUCCH in the sTTI may not occur.

A WTRU may also drop either nPUCCH or sPUCCH in a sTTI independent of or substantially independent of frequency resources overlapping between nPUCCH and sPUCCH. When the frequency resources for nPUCCH and sPUCCH are fully or partially overlapped, a WTRU may drop either nPUCCH or sPUCCH regardless of the available transmission power or energy. When the frequency resource (s) for nPUCCH and sPUCCH are not overlapped, the WTRU may drop either nPUCCH or sPUCCH in a sTTI based on the available transmission power or energy or the WTRU maximum transmission power or energy, for example in or for the sTTI. The available WTRU transmission power or energy may be determined based on whether the total transmission power for transmitting nPUCCH and sPUCCH exceeds the maximum WTRU transmission power, for example, $P_{CMAX}$ or $P_{CMAX,c}$, for example for the sTTI. The maximum WTRU transmission power may be the WTRU configured maximum output power The dropping of nPUCCH or sPUCCH in a sTTI may be determined based on a predefined priority rule of nPUCCH and sPUCCH. For example sPUCCH may be a higher priority than nPUCCH. A WTRU may drop a lower priority channel. A priority rule may also be based on the information type carried in nPUCCH or sPUCCH. An nPUCCH carrying HARQ-ACK may be a higher priority than sPUCCH carrying CSI such as CQI/PMI/RI. A sPUCCH carrying HARQ-ACK may be a higher priority than nPUCCH carrying HARQ-ACK or CSI. Similar priority rules based on information type may be applied to nPDSCH or sPDSCH.

A WTRU may transmit nPUCCH and sPUCCH in a short sTTI, for example concurrently, where nPUCCH and sPUCCH may be located in different frequencies. A WTRU may transmit or may determine to transmit nPUCCH and sPUCCH simultaneously, for example in a sTTI, based on at least one of: (i) receipt of a higher layer configuration for concurrent nPUCCH/sPUCCH transmission; (ii) a WTRU capability to support concurrent nPUCCH/sPUCCH transmission; (iii) a DCI or receipt of a DCI for nPDSCH or sPDSCH that may indicate concurrent nPUCCH/sPUCCH transmission or to transmit nPUCCH/sPUCCH concurrently; or (iv) a total transmission power of nPUCCH and sPUCCH is determined by the WTRU to be lower than a predefined threshold. The predefined threshold may be the WTRU configured maximum output power, $P_{CMAX}$ or $P_{CMAX,c}$.

A WTRU may drop nPUCCH or sPUCCH in a TTI when the WTRU is not configured for concurrent nPUCCH/sPUCCH or when the WTRU does not support concurrent nPUCCH/sPUCCH. A WTRU may drop nPUCCH or sPUCCH in a sTTI when the WTRU does not receive a DCI indicating concurrent nPUCCH/sPUCCH transmission or to transmit nPUCCH/sPUCCH concurrently.

A WTRU may drop nPUCCH or sPUCCH in a sTTI when a total transmission power or energy of nPUCCH and sPUCCH is determined by the WTRU to be higher than a predefined threshold. The predefined threshold may be the WTRU configured maximum output power, $P_{CMAX}$ or $P_{CMAX,c}$. The total transmission power may be determined as a function of a transmission power of nPUCCH (e.g., $P_{nPUCCH}$) and a transmission power of sPUCCH (e.g., $P_{sPUCCH}$).

A sTTI may be or may correspond to one or more symbols (e.g., OFDM or SC-FDMA symbols) such as N symbols where N may be less than 14. A sTTI may correspond to a timeslot. In the examples and embodiments, sTTI may be replaced by nTTI and vice versa.

A WTRU may transmit one or more physical channels or signals such as one or more of a PUSCH, a PUCCH, a PRACH, a SRS, or the like. A WTRU may transmit one or more channels with a TTI such as nTTI. The one or more channel transmissions may be simultaneous or at least partially overlapping or concurrent. If a WTRU determines it would exceed a maximum power during an overlap, the WTRU may scale one or more of the channel powers prior to transmission in order to not exceed the maximum power. The determination may be based on calculated channel powers that may not consider overlap. The scaling of the channels may be based on the priority of the channels, where the priority may be defined or known. For example, a PRACH may have highest priority, a PUCCH may have next highest priority, a PUSCH carrying UCI may have next highest priority, and a PUSCH not carrying UCI may have the next priority.

When a WTRU is to transmit channels with the same TTI, the WTRU may plan in advance based on one or more transmission parameters, such as scheduling parameters, of the channels and may scale the channels as needed. Scaling of the channels may or may also be based on the intended receiver of the channel. For example, transmissions intended for an eNode-B in a dual connectivity scenario may have a minimum guaranteed power that may affect the power allocation and scaling among the channels to be transmitted.

A WTRU may transmit one or more of a PUSCH, a PUCCH, a PRACH, a SRS, or the like. A WTRU may transmit one or more channels with a TTI such as nTTI or sTTI. One or more sTTI channel transmissions, for example, a set of sTTI channel transmissions, may be at least partially overlapping or substantially partially overlapping with one or more or a set of nTTI channel transmissions.

The terminology scaling a channel may be used to represent scaling the power (e.g., the calculated power) of a channel.

A WTRU may transmit one or more channels with a TTI such as a nTTI and/or one or more channels with a TTI such as a sTTI. One or more sTTI transmissions such as a set of sTTI channel transmissions may be at least partially overlapping or concurrent with one or more nTTI channel transmissions such as a set of nTTI channel transmissions. Channel and channel transmission may be used interchangeably herein. A UE may transmit in the UL to one or more eNBs. A UE may transmit in the sidelink to one or more other UEs.

Figure 20:
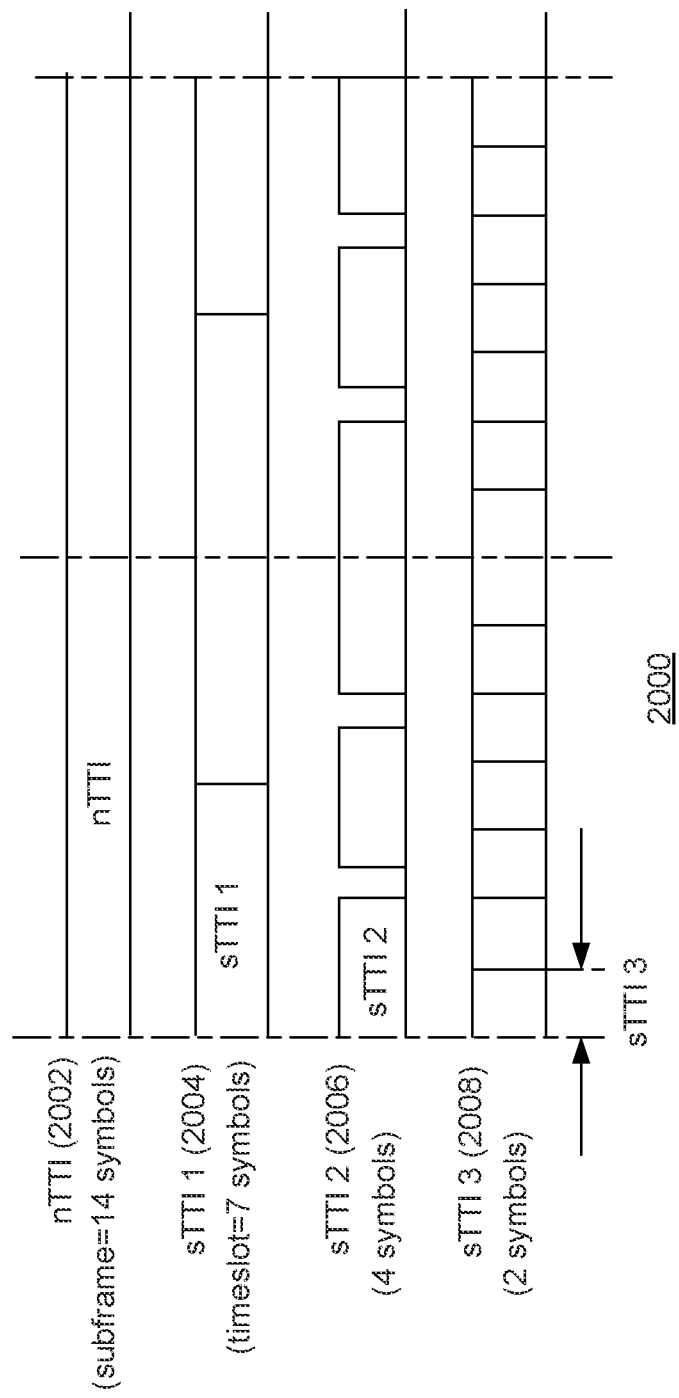
FIG. 20 is an example of overlapping or concurrent TTIs.

FIG. 20 is an example of overlapping or concurrent TTIs in communication 2000 using nTTIs and sTTIs. For examples given herewith, an overlapping portion of a channel or resource may be used to refer to a portion of an nTTI channel/resource that overlaps at least one sTTI channel/resource or the portion of a sTTI channel/resource that overlaps at least one nTTI channel/resource. A sTTI may overlap with a, at least one, or only one nTTI. A nTTI may overlap at least one sTTI. A nTTI may overlap M or at most M sTTIs. A sTTI may be an UL sTTI or a DL sTTI. A nTTI may be an UL nTTI or a DL nTTI.

For a nTTI configuration 2002 with an nTTI of 1 subframe, that may be 14 symbols or 1 ms in length, and a sTTI configuration 2004 with sTTI 1 of 1 timeslot that may be 7 symbols or 0.5 ms, M may be 2. For an nTTI that may be comprised of 14 symbols and sTTI configurations 2006 and 2008 with sTTI 2 or sTTI 3, that may be comprised of 4 or 2 symbols, M may be 3 or 7, respectively. A time or overlap relationship between an nTTI and a sTTI may be fixed or known. For communication 2000, a sTTI may be at least partially overlapped, substantially fully overlapped, or fully overlapped by an nTTI. In another example, a sTTI may overlap or partially overlap, with multiple nTTIs such as 2 nTTIs. For example, nTTI may be the example sTTI 1 and sTTI may be the example sTTI 2. In the example communication 2000, the $2^{nd}$ and $5^{th}$ occurrences of sTTI 2 overlap with 2 occurrences of sTTI 1.

The set of nTTI channels and the set of short or sTTI channels that may be transmitted by a WTRU may be intended for one or the same eNode-B or for one or more serving cells belonging to one or the same eNode-B. An eNode-B may include or use a scheduler that may schedule or may make scheduling decisions for WTRU transmissions. eNode-B and scheduler may be used interchangeably. An eNode-B may schedule the sTTI channels or the nTTI channels. An eNode-B may know, for example exactly or approximately, when the set of sTTI channels and the set of nTTI channels that may be transmitted by a WTRU may partially overlap or be concurrent. The eNode-B may know this information since it may schedule both sets of channels.

Prior to transmission of a set of short or sTTI channels, a WTRU may determine whether the transmission of the set of sTTI channels overlaps or will overlap with the WTRU's transmission of a set of nTTI channels. Prior to the transmission of a set of sTTI channels, a WTRU may determine whether the transmission of the set of sTTI channels would result in the WTRU exceeding a maximum power or budget when the sTTI channels overlap the nTTI channels. The determination may be based on calculations of channel powers, for example without considering overlap constraints.

If a WTRU determines it would exceed a maximum power during an overlap, a WTRU may adjust the power of one or more channels. Such an adjustment may be based on channel priority. A WTRU may adjust (e.g., reduce) the power of a lower priority channel and may not adjust the power of a higher priority channel. A WTRU may transmit the adjusted and/or unadjusted channels.

A WTRU may determine which one or more channel powers to adjust, how to adjust the power of a channel, at what time scale or time increment to adjust the power of a channel, or the like. This determination may be based on a time relationship between the set of short or sTTI channels and the set of nTTI channels that may overlap (e.g., the sTTI/nTTI time relationship), an overlap time between the set of sTTI channels and the set of nTTI channels that may overlap (e.g., the sTTI/nTTI time overlap), or the like.

The determination may also be based on whether or not a WTRU has scheduling information for the set of sTTI channels that may overlap a set of nTTI channels prior to transmission of the set of nTTI channels or prior to the start of the nTTI. For example, the determination may be based on whether or not a WTRU has scheduling information for the set of sTTI channels that may overlap a set of nTTI channels prior to, by at least some time such as a threshold amount of time prior to, transmission of the set of nTTI channels or prior to the start of the nTTI.

The determination may also be based on a channel modulation type or an MCS of a channel that may be overlapped by another channel. The determination may also be based on the presence of a reference signal such as a DM-RS, for example in the overlapped portion of a channel. The determination may also be based on the presence of a reference signal such as DM-RS in a non-overlapped portion of a channel. The determination may also be based on whether or not the set of sTTI channels that may overlap a set of nTTI channels may be intended for the same destination, the same serving cell, the same eNode-B, the same base station, the same access point, or the same MAC entity. The determination may also be based on whether or not the set of sTTI channels that may overlap a set of nTTI channels may be scheduled by the same scheduler, the same serving cell, the same eNode-B, the same base station, the same access point, or the same MAC entity.

For this configuration, adjusting or adjustment of the power of a channel may include scaling at least a portion of the channel, such as in time, or dropping at least a portion of the channel, such as in time.

For some configurations, a WTRU may know sTTI scheduling information in advance of nTTI scheduling. For example, a WTRU may expect to receive the scheduling information for a set of sTTI channels that may overlap a set of nTTI channels prior to or by at least some time such as a threshold value of time prior to or within sufficient time prior to transmission of the set of nTTI channels or prior to the start of the nTTI. Dropping may be the same as scaling the power to zero or setting the power to zero. Adjusting a channel may be used to represent adjusting the power of a channel. Adjusting a channel and adjusting the power of a channel may be used interchangeably.

The terminology overlap portion of a channel may refer to the portion of the channel, for example in time, that overlaps another channel. For example, overlap portion of a channel may be used to refer to the portion of an nTTI channel that overlaps at least one sTTI channel or the portion of an sTTI channel that overlaps at least one nTTI channel. Overlap portion and overlapped portion may be used interchangeably.

Power adjustments may be made when the WTRU has scheduling information. A WTRU may know the sTTI scheduling information in advance of the nTTI. For example, a WTRU may know or may receive the scheduling information for a set of sTTI channels that may overlap a set of nTTI channels prior to, for example by at least some time such as a threshold value of time prior to or in enough time prior to, transmission of the set of nTTI channels or prior to the start of the nTTI.

A WTRU may determine which channel or channels such as short or sTTI or nTTI channels, to adjust prior to the nTTI transmission or prior to the nTTI, for example when a WTRU knows the sTTI scheduling information in advance of the nTTI. A WTRU may determine which channel or channels to adjust based on channel priority rules such as normal or legacy channel priority rules.

For the channels determined to be adjusted, a WTRU may make a channel adjustment for the entire TTI or substantially the entire TTI (e.g., sTTI or nTTI) of the channel, for example when the WTRU knows the scheduling information in advance of the nTTI. As one example, a WTRU may make the adjustment for the entire TTI or substantially the entire TTI (e.g., sTTI or nTTI) of the channel when the overlap is at or above a threshold. The threshold may be fixed, defined (e.g., predefined), configurable, or the like and may be received from a base station such as an eNode-B. The threshold may for example be 3 or 4 symbols.

For an sTTI channel determined to be adjusted, the WTRU may make the adjustment for the entire sTTI or substantially the entire sTTI of the channel, for example, when the WTRU knows the sTTI scheduling information in advance of the nTTI and/or always. For an nTTI channel determined to be adjusted, the WTRU may make the adjustment for the entire nTTI substantially the entire nTTI of the channel when the overlap is above a threshold, for example when the WTRU knows the sTTI scheduling information in advance of the nTTI.

For a channel determined to be adjusted, the WTRU may make the adjustment to, for example, only to, the overlap portion of the channel, for example at least sometimes.

For example, for a channel determined to be adjusted, the WTRU may make, for example, may only make, the adjustment to the overlap portion of the channel when the overlap is below or less than or equal to a threshold, for example, one or two symbols, or between two thresholds, for example, between one and two symbols. The one or two thresholds may be configurable and may be received from a base station or eNode-B. The WTRU may transmit the adjusted and/or unadjusted channels.

A WTRU may not know the sTTI scheduling information in advance of the nTTI. For example, a WTRU may not know, for example, may not receive the scheduling information for a set of sTTI channels that may overlap a set of nTTI channels prior to (e.g., by at least some time such as a threshold value of time prior to or in enough time prior to) transmission of the set of nTTI channels or prior to the start of the nTTI.

A WTRU may determine which channel or channels (e.g., sTTI and/or nTTI channels) to adjust prior to the nTTI transmission or prior to the nTTI, for example when the WTRU may not know sTTI scheduling information in advance of the nTTI. For example, a WTRU may not know or may not receive scheduling information for a set of sTTI channels that may overlap a set of nTTI channels prior to transmission of the set of nTTI channels or prior to the start of the nTTI. A WTRU may determine which channel or channels to adjust based on channel priority rules (e.g., normal or legacy channel priority rules) and/or other rules.

For an nTTI channel to be adjusted, the WTRU may make the adjustment to the overlap portion of the channel, for example, when the WTRU does not know the sTTI scheduling information in advance of the nTTI.

For an sTTI channel to be adjusted, the WTRU may make the adjustment for the entire sTTI (e.g., for substantially the entire sTTI) or for the overlap time between the nTTI and sTTI channels, for example, when the WTRU does not know the sTTI scheduling information in advance of the nTTI.

For an sTTI channel to be adjusted, the WTRU may make the adjustment to the entire sTTI (e.g., for substantially the entire sTTI) when the overlap with the nTTI exceeds a threshold, for example, one symbol or always, for example, when the WTRU does not know the sTTI scheduling information in advance of the nTTI.

For a sTTI channel to be adjusted, the WTRU may make the adjustment to the overlap portion, for example, only the overlap portion, if the overlap with the nTTI is below a threshold, for example, 1 symbol.

A WTRU may perform short or sTTI channel adjustments for an entire sTTI, substantially an entire sTTI, or for the overlap time between the nTTI and sTTI channels. This operation may occur when the sTTI scheduling information in advance of the nTTI is unknown. This operation may also be performed when the entire sTTI overlap with the nTTI exceeds a threshold, for example, a predetermined number of symbols.

For a sTTI channel to be adjusted (e.g., or scaled), a WTRU may make the adjustment to the overlap portion without adjustments to other portions. A WTRU may perform this operation if the overlap with the nTTI is below a threshold, for example, 1 symbol.

For a channel adjustment to be made to a portion of a channel, if the portion to be adjusted includes part of a symbol, a WTRU may adjust the channel in the full symbol (e.g., according to the adjustment determined for the full symbol or symbols). A WTRU may perform this operation if the partial overlap is greater than a threshold.

If the portion of a channel to be adjusted spans full symbols and partial symbols, the rules for determining which channels to adjust may apply, for example, only apply, to the full symbols and/or symbols overlapped by at least a threshold amount. Adjustment for the remaining partially overlapped symbols may be according to other rules or may be left to WTRU implementation.

For a channel adjustment to be made to a portion of a channel, if the portion to be adjusted includes part of a symbol, how to adjust power in the partially overlapped symbol to not exceed a maximum power during that partially overlapped symbol may be according to different rules or may be left to WTRU implementation, for example if the partial overlap is below a threshold.

If a portion of a channel to be adjusted spans full symbols and partial symbols, the rules for determining which channels, symbols, or full symbols to adjust may be based on an overlap by at least a threshold amount. In addition, a channel power or energy adjustment in a partially overlapped symbol may be performed by a WTRU to not exceed a maximum power during that partially overlapped symbol according to different rules or thresholds values.

Scaling part of a channel may impact performance, for example for a modulation scheme that may use amplitude information of a constellation such as Quadrature Amplitude Modulation (QAM) or x-QAM, where x may be 16, 64, 256 or another integer. Scaling part of a channel may not impact performance, for example for a modulation scheme that may not use amplitude information of a constellation, for example, BPSK or QPSK.

A WTRU may determine a channel to be adjusted, for example according to an example herein. A WTRU may determine whether to scale or drop a portion of the channel to be adjusted based on the modulation scheme used for the channel, for example based on whether the modulation scheme used for or by the channel may use amplitude. For instance, a WTRU may determine to drop (or scale) a portion of a channel when the modulation scheme used for the channel transmission does not use amplitude, for example when the modulation scheme is QPSK or BPSK.

For example, a WTRU may determine to adjust a portion of a channel, for example in the nTTI/sTTI overlap time. The WTRU may determine whether to scale or drop the portion of the channel based on the modulation scheme used for the channel. For example, the WTRU may determine to scale (or drop) the portion of the channel when the modulation scheme used for the channel transmission uses amplitude, for example when the modulation scheme is QAM or x-QAM. The WTRU may determine to drop (or scale) the portion of the channel when the modulation scheme used for the channel transmission does not use amplitude, for example when the modulation scheme is QPSK. The WTRU may scale or drop the portion of the channel according to the determination.

The WTRU may transmit the partially adjusted channel which may have a portion scaled or dropped, for example based on the modulation scheme used.

Adjusting, for example, scaling and/or dropping, a part (e.g., any part) of a channel may apply to full symbols. If the overlap portion spans one or more full symbols and portions of one or more symbols, a WTRU may apply the adjustment to an entire symbol that may be partially overlapped, for example if the partial overlap is greater than a threshold. A WTRU may not apply the adjustment to the symbol if the overlap is less than a threshold.

A base station (e.g., eNode-B) may be aware of the possibility of adjustment, for example due to a power limitation or budget of a WTRU, and may adapt or account for an adjustment when receiving or decoding channels transmitted by the WTRU. A base station may be aware of the time location of possible adjustment, for example since the nTTI and sTTI transmissions may be based on scheduling by the base station. A base station may be aware of whether a WTRU may scale or drop based on the modulation used for the transmissions. The base station may take this knowledge into account when receiving and/or decoding the channels transmitted by the WTRU.

A WTRU may or may also consider a signal priority, such as a physical layer signal, priority in the determination of which channel or channels to adjust. For example, DM-RS may have a priority. A WTRU may consider the priority of a DM-RS when determining which channel or channels to adjust. DM-RS is used as a non-limiting example. Another single or multi-symbol signal may be used and still be consistent with this disclosure.

For example, a nTTI channel with DM-RS during the overlap time with a short or sTTI channel may have higher priority than the sTTI channel, for example regardless of the relative priorities of the nTTI and sTTI channels when reference signals are not considered. Giving the channel with DM-RS in the overlap high priority may prevent the DM-RS from being scaled or punctured.

A WTRU may determine that a maximum power or energy may be exceeded for or during an overlap between a short or sTTI channel and an nTTI channel. The WTRU may determine that the nTTI channel includes DM-RS in the overlap. DM-RS may have higher priority than one or more channels such as one or more of PUCCH, PUSCH with UCI, and PRACH. If the sTTI channel with which the nTTI channel may overlap is a channel with lower priority than DM-RS, the WTRU may determine to adjust the sTTI channel. If the sTTI channel with which the nTTI channel may overlap is a channel that does not have lower priority than DM-RS, the WTRU may determine which channel to adjust based on its regular rules, for example, channel priority and/or guaranteed power (e.g., guaranteed minimum power) rules.

If an nTTI channel includes multiple DM-RSs and at least one DM-RS in the nTTI is not in an overlap time, the presence of DM-RS in the overlap time may not be considered (e.g., by a WTRU) in the determination of channel priority or channel adjustment. A DM-RS in the overlap time may be scaled or punctured, for example in accordance with one or more examples described herein.

If an nTTI channel includes multiple DM-RSs and at least one DM-RS in the nTTI is prior to the overlap time, the presence of DM-RS in the overlap time may not be considered (e.g., by a WTRU) in the determination of channel priority or channel adjustment. A DM-RS in the overlap time may be scaled or punctured, for example in accordance with one or more examples described herein.

When a WTRU knows sTTI scheduling information in advance of the nTTI, the presence of DM-RS in an overlap time may not be considered (e.g., by the WTRU) in a channel priority or channel adjustment determination. For this configuration, a WTRU may scale or may be able to scale the nTTI channel for an entire nTTI or substantially an entire nTTI and scaling DM-RS may be acceptable. The presence of DM-RS in the overlap time may be considered, for example, by the WTRU, in the channel priority or channel adjustment determination when the WTRU knows the sTTI scheduling information in advance of the nTTI.

A base station may take into account the possibility of DM-RS scaling and/or puncturing in an overlap time and may use or may only use the DM-RS in the non-overlapped time, for example for demodulation of a channel.

An nTTI channel with DM-RS during the overlap time with a short or sTTI channel may have higher priority than the short or sTTI channel, for example, regardless of whether or not the short or sTTI channel includes DM-RS in the overlap, for example since the short or sTTI channel may be adjusted over the entire sTTI or substantially the entire sTTI.

In certain configurations (e.g., sometimes or always), an nTTI DM-RS may have priority over a short or sTTI DM-RS. For example, an nTTI DM-RS may have priority over a short or sTTI DM-RS when a WTRU may not know sTTI scheduling information in advance of the nTTI. A short or sTTI channel with DM-RS during the overlap time with an nTTI channel may have higher priority than the nTTI channel, for example when the nTTI channel does not include DM-RS in the overlap. For a short or sTTI channel to be adjusted, a WTRU may make the adjustment to the entire sTTI or substantially the entire sTTI when the short or sTTI channel includes DM-RS or when the overlap portion of the channel includes DM-RS.

A WTRU may or may also consider a TTI length priority in the determination of which channel or channels to adjust. For example, for channels with the same channel and/or signal priorities, but different TTI length, TTI length priority may be used. A short or sTTI channel may have higher priority than an nTTI channel or vice versa. Which TTI length has higher priority may be configured. Configuration may be on a serving cell basis.

One or more DM-RS patterns may be defined, configured, and/or used, for example, by a WTRU. Configuration may be provided, for example, by a base station, to a WTRU and/or received by a WTRU. The one or more DM-RS patterns may be considered a set of patterns. One of the set may be or may be configured as the default, regular, or normal pattern. A pattern may indicate in what symbol or symbols a WTRU may transmit DM-RS, for example when transmitting a PUCCH or PUSCH channel.

A WTRU may use or modify a DM-RS pattern of channel (e.g., a short or sTTI channel or an nTTI channel) based on an indication that may be provided. The indication may be provided and/or received in a scheduling grant, a DL control channel such as PDCCH or EPDCCH, a DCI format, or the like. The indication may be referred to as a DM-RS indicator. The indication may be provided by a base station. The indication may be received by the WTRU.

A DM-RS indicator may indicate a DM-RS pattern to use when transmitting, for example in the UL. For example, a DM-RS indicator in a DL grant may indicate a pattern to use when transmitting a PUCCH that may contain the ACK/NACK for a DL transmission. A DM-RS indicator in an UL grant may indicate a pattern to use when transmitting a PUSCH scheduled by the UL grant. A WTRU may receive the indication. The WTRU may transmit a channel, for example, the granted PUSCH or the PUCCH associated with the DL grant, using the indicated DM-RS pattern.

A DM-RS indicator may indicate whether or not to include DM-RS (e.g., any DM-RS) in the UL transmission. Based on the received DM-RS indicator, the WTRU may transmit the channel with a DM-RS pattern, for example, the indicated DM-RS pattern, or without a DM-RS pattern. A DM-RS indicator may indicate to move, for example, from its default or regular location, or place the DM-RS of a first channel, for example, a short or sTTI channel, such that it aligns with the DM-RS of a second channel, for example, an nTTI channel, with which the first channel may overlap. A WTRU may use or modify a DM-RS pattern of a first channel (e.g., a short or sTTI channel) such that one or more DM-RS aligns (e.g., in time) with the DM-RS in a second channel, e.g., an nTTI channel, for example, an overlapping second channel. The WTRU may use or modify the DM-RS of the first channel based on a received DM-RS indicator that may indicate to do so.

In one or more examples described herein, the first channel may be a short or sTTI channel and the second channel may be a nTTI channel. Alternatively, the first channel may be an nTTI channel and the second channel may be a short or sTTI channel, for example when the WTRU knows the sTTI scheduling information in advance of the nTTI.

A WTRU may determine that a first channel, for example, a short or sTTI channel and a second channel, for example, an nTTI channel may overlap. A WTRU may use or modify a DM-RS pattern of the first channel such that one or more DM-RS align (e.g., in time) with the DM-RS in the second channel. This operation may be performed by a WTRU based on a determination that the first and second channels may overlap. In addition, a WTRU may use or modify the pattern autonomously, for example without explicit indication from a base station. A WTRU may use or modify the pattern autonomously, for example when the overlapping short or sTTI and nTTI channels may be intended for the same eNode-B or for serving cells of the same eNode-B.

A WTRU may use or modify a DM-RS pattern of a second channel (e.g., an nTTI channel) such that one or more DM-RS of the second channel that may have overlapped with the first channel does not overlap with the second channel. A WTRU may use or modify the DM-RS pattern of the second channel based on a received indication, e.g., from a base station, or autonomously (e.g., without an explicit indication). A WTRU may have or may be configured to have a configured or default DM-RS pattern for the second channel. A WTRU may move at least one DM-RS of the second channel that may overlap with a first channel to a symbol after the end of the overlap such as the first symbol after the overlap.

A WTRU may puncture data intended for a symbol (e.g., the later symbol) to be used for DM-RS. A WTRU may change at least one intended symbol for data. For example, if DM-RS in symbol 5 is moved to symbol 8, the data intended for symbols 6,7, and 8 may be shifted to symbols 5, 6, and, 7 respectively.

Transmissions by a WTRU may be prioritized. The set of nTTI channels and the set of short or sTTI channels that may be transmitted by a WTRU may be intended for different base stations (e.g., eNode-Bs) or for one or more serving cells belonging to different base stations (e.g., eNode-Bs). A base station may schedule the short or sTTI channels and another base station may schedule the nTTI channels. A base station may not know when the set of short or sTTI channels and the set of nTTI channels that may be transmitted by a WTRU may overlap.

Prior to transmission of a set of short or sTTI channels, a WTRU may determine whether the set of sTTI channels may overlap a set of nTTI channels and whether a maximum power or energy may be exceeded during the overlap. If or when a WTRU determines it would exceed a maximum power or energy during the overlap, the WTRU may adjust the power or energy of one or more channels.

Embodiments that may be described for WTRU communication with one base station, eNode-B or scheduler may be applied to WTRU communication with more than one base station, eNode-B or scheduler and vice versa. The application to one scenario or another is for non-limiting exemplary purposes.

For an nTTI, a WTRU may use a virtual grant or allocation for one or more short or sTTI channels to determine the power or energy available for the nTTI channels, for example when the scheduling information for the short or sTTI channels is not known prior to, for example, a threshold amount of time prior to, the nTTI transmission. The terms grant and allocation may be used interchangeably. A virtual allocation may be a configured allocation that may have a configured set of one or more parameters. A virtual allocation may be configured by higher layer signaling, for example, from a base station. The parameters may include at least one of: a channel indicator, for example an indication of a PUSCH and/or PUCCH channel; and/or scheduling information, for example, resource allocation information for a PUSCH and/or PUCCH. A virtual allocation may be determined, for example, by the WTRU, based on at least one previous transmission on an sTTI, such as an sTTI transmission, for example, an UL sTTI transmission and/or a DL sTTI transmission, in the previous nTTI or subframe. A virtual allocation may be determined, for example, by the WTRU, based on at least one previous transmission on the sTTI, such as one or more sTTI transmissions, for example, sTTI UL transmissions and/or DL transmissions in the last N nTTIs. For example, N may be 1 or 2. N may be configurable by higher layers. N may be a function of one or more of sTTI length, a maximum sTTI length, and/or nTTI length A virtual allocation may be based on the scheduling or resource allocation for at least one UL and/or DL channel or transmission, for example at least one UL and/or DL channel scheduled, allocated, or transmitted in a previous nTTI or subframe. For example, if a WTRU transmitted a sPUSCH in the previous nTTI (e.g., the previous subframe), the WTRU may use the scheduling information and/or the calculated power, or a scaled version of a resource allocation of a previous PUSCH for that sPUSCH as the scheduling information or calculated power for a virtual sPUSCH for the current nTTI. In another example, the WTRU may use a scaled version of a previous PUSCH's calculated power for the virtual sPUSCH. The scale factor may be configured and/or may be a function of the time elapsed since the sPUSCH was transmitted, for example if the last sPUSCH was transmitted more than one nTTI earlier.

A WTRU may determine the power allocation for the nTTI channels in the usual way using the virtual short or sTTI channels and/or virtual short or sTTI channel powers in place of actual short or sTTI channels and/or channel powers. The WTRU may determine the power allocation for the entire nTTI or substantially the entire nTTI. The WTRU may apply the determined power allocation for the nTTI. The WTRU may adjust the power for the nTTI during the nTTI, for example, if a short or sTTI channel that was not accounted for, for example, a short or sTTI channel that was scheduled after the start of the nTTI transmission, is scheduled and/or allocated. For the calculation of the power of a channel for the virtual sTTI, the WTRU may use the pathloss that was used for the actual transmission when the channel was previously transmitted, or the WTRU may calculate the power using a more recent or current pathloss.

A virtual channel may be applicable to or only applicable to one or more channel types. For example, virtual channel types may be applicable to one or more of PUCCH, PUSCH, and PUSCH carrying UCI. A WTRU may use DL traffic, for example, a previous PDSCH scheduling and/or reception, to determine virtual PUCCH allocation. A WTRU may use UL traffic, for example, a previous PUCCH allocation or transmission, to determine a virtual PUCCH allocation. A WTRU may use UL traffic, for example, a previous PUSCH scheduling and/or transmission, to determine virtual PUSCH allocation.

A WTRU may use or may determine to use a virtual allocation for a sTTI based on the number, Ncstti, of short or sTTI channels scheduled, allocated, and/or transmitted in the previous M nTTIs. M may be 1, 2, or any number and may be configured by higher layers. If Ncstti exceeds a threshold (e.g., if the WTRU determines that Ncstti exceeds a threshold), a WTRU may use a virtual allocation for one or more short or sTTI channels when determining the power for an nTTI.

If Ncstti does not exceed a threshold (e.g., if the WTRU determines that Ncstti does not exceed a threshold), the WTRU may not use a virtual allocation for one or more sTTI channels when determining the power for an nTTI. For example, if no short or sTTI channels were scheduled, allocated, and/or transmitted in the last M nTTI, the WTRU may not use a virtual allocation for the power determination for the nTTI.

If a short or sTTI transmission, for example a short or sTTI transmission that may not have been accounted for in the determination of the nTTI power, is scheduled or allocated, and it is determined that maximum power may be exceeded for or during the sTTI, one or more short or sTTI or nTTI channels or signals may be adjusted or modified to avoid exceeding the maximum power, for example in accordance with one or more of the embodiments described herein.

A WTRU may include an indication in an nTTI transmission to indicate, for example to a base station, that the transmission of a channel was modified, for example due to a maximum power condition encountered with one or more short or sTTI channels. A WTRU may include the indication in a last symbol, in one or more PRBs that may be configured or used for such indication, or the like.

A WTRU may be configured for and/or may use an nTTI on a first serving cell and an sTTI on a second serving cell. The first and second serving cells may be the same serving cell or different serving cells. A WTRU may use carrier aggregation for example, to aggregate the carriers of the first and second serving cells. The first and second serving cells may have or may belong to the same or separate schedulers, MAC-entities, base stations and/or eNode-Bs. Dual connectivity may apply to the first and second serving cells.

For a TTI, for example, an nTTI or an sTTI, a WTRU or MAC entity, for example, using a PH reporting procedure of a WTRU or MAC entity, may determine whether at least one PHR may have been triggered.

A MAC entity may transmit a PHR, for example when a WTRU determines that a PHR may have been triggered. A WTRU may transmit a PHR, for example, in a MAC-CE and/or on a PUSCH or sPUSCH channel, for example when the WTRU determines that a PHR may have been triggered. A WTRU may transmit a PHR on a channel, for example, a PUSCH or sPUSCH, for which the WTRU may have a resource grant or allocation, for example when the WTRU may have UL resources that may be for a new transmission.

A MAC entity may or may be configured, for example, by signaling, to prioritize transmission of a PHR and/or other MAC-CE on one TTI length over another TTI length. In an example, a MAC entity that may be configured with and/or may use an nTTI and an sTTI may, or may only, determine whether at least one PHR may have been triggered for, for example, for one of, an nTTI or an sTTI. In another example, a MAC entity that may be configured with and/or may use an nTTI and an sTTI may or may only transmit a PHR in an nTTI resource, for example, a PUSCH or sTTI resource, for example, sPUSCH, when the nTTI resource and an sTTI resource may both be available.

An sTTI, for example, an UL sTTI may overlap with a, for example, at least one or only one, nTTI, for example, an UL nTTI. An nTTI may overlap at least one sTTI. An nTTI may overlap M, for example, at most M, sTTIs.

A PHR, for example a PHR that may be transmitted in a nTTI, may include a PH for the nTTI and one or more PH that may correspond to a sTTI that may overlap with the nTTI. A PHR that may be transmitted in a sTTI may include a PH for the sTTI and one or more PH that may correspond to a nTTI that may overlap with the sTTI.

A WTRU may send, for example, transmit a PHR, for example to a base station. A PHR may include at least one of the following, for example a WTRU may include at least one of the following in a PHR: a PH that may correspond to an nTTI (nTTI PH), for example an nTTI that may overlap with an sTTI for which PH may be reported; a PH that may correspond to a sTTI (sTTI PH), for example an sTTI that may overlap with an nTTI for which PH may be reported; a set of sTTI PHs, for example an sTTI PH for a or each sTTI in a set of sTTIs that may overlap with an nTTI for which PH may be reported; an indication that an sTTI channel or the impact of an sTTI or sTTI channel may be included in the calculation and/or determination of at least one of: a power, a maximum power that may be reported, and/or a PH that may be reported, for example for an nTTI; an indication of an sTTI, for example, which sTTI, for which PH may be reported or included in a PHR, for example an indication of an sTTI within a set of sTTIs that may overlap with an nTTI for which PH may be reported; a $P_{CMAX,c}$ that may correspond to a nTTI; a $P_{CMAX,c}$ that may correspond to a sTTI; a virtual/real indicator flag or field (V-flag) for a nTTI PH that may indicate whether the corresponding nTTI PH may be real or virtual, for example, may be based on a real transmission or a reference format; a virtual/real indicator flag or field (V-flag) for a sTTI PH that may indicate whether the corresponding sTTI PH may be real or virtual, for example, may be based on a real transmission or a reference format; a power management flag or field, for example, a P-flag for a or each PH that may be reported that may indicate whether power backoff due to power management may be applied, for example, in the determination of a $P_{CMAX,c}$ that may be used in the calculation and/or determination of the PH that may be reported.

A PH, for example, a sTTI PH and/or a nTTI PH that may be included in a PHR may be real or virtual. PH determination and/or reporting may be configured, provided, supported, and/or used, for example when supporting an nTTI and an sTTI. As used herein, the terms calculate or calculation and determine or determination may be substituted for each other in the examples and embodiments disclosed.

There may be one or more PH types. For example, a type 1 PH may be a PH for a PUSCH. A type 1 PH may be calculated from or based on a PUSCH power. A type 1 PH may not include, for example, may not be calculated from or based on, a PUCCH channel power. A type 1 PH may include the effects of a PUSCH transmission, for example, the scheduling of a PUSCH transmission, on a maximum power that may be used to determine the PH. A type 1 PH may not include the effects of a PUCCH transmission, for example, the scheduling of a PUCCH transmission, on a maximum power that may be used to determine the PH. A type 1 PH may be a real PH when a PUSCH may be transmitted in the TTI for which the PH may be calculated. A type 1 PH may be a virtual PH, for example, a reference format may be used, when a PUSCH may not be transmitted in the TTI for which the PH may be calculated.

In an example, a type 2 may be a PH for a PUSCH and/or a PUCCH. A type 2 PH may be calculated from or based on a PUSCH power and/or a PUCCH power. A type 2 PH may be calculated from or based on a PUSCH power, for example when a PUSCH transmission may occur in the TTI for which the PH may be calculated. A type 2 PH may be calculated from or based on a PUCCH power, for example when a PUCCH transmission may occur in the TTI for which the PH may be calculated. A type 2 PH may include the effects of a PUSCH transmission and/or PUCCH transmission, for example, that may occur in the TTI for which the PH may be calculated, on a maximum power that may be used to determine the PH.

A reference format may be used for a PUSCH and/or PUCCH when the PUSCH and/or PUCCH may not be transmitted in the TTI for which the PH may be calculated. A type 2 PH may be considered or indicated as virtual, when both the PUSCH and PUCCH may use a reference format.

A PH type may apply to a TTI type or length or to a channel of a TTI type or length. For example a type A PH may be an sTTI PH, for example, for an sTTI in which and/or for which a PH may be reported. An sTTI PH may be a type A PH.

A type A PH may be a PH for an sPUSCH. A type A PH may be a type 1 PH where the PUSCH may be a sPUSCH. A type B PH may be a PH for an nPUSCH. A type B PH may be a type 1 PH where the PUSCH may be a nPUSCH. A type C PH may be a PH for an nPUSCH and/or an sPUSCH that may at least partially overlap. A type C PH may be calculated from or based on an nPUSCH power and/or an sPUSCH power, for example the power of one or more of an nPUSCH and sPUSCH that may overlap. A type C PH may be calculated from or based on an nPUSCH power, for example when the nPUSCH transmission may occur in a TTI, for example, a nTTI, for which the PH may be calculated. A type C PH may be calculated from or based on an nPUSCH power, for example when the nPUSCH transmission may occur in a TTI, for example, a nTTI, in which or for which the PH may be reported. A type C PH may be calculated from or based on an nPUSCH power, for example when the nPUSCH transmission may overlap a sTTI in which or for which the PH may be reported. A type C PH may be calculated from or based on an sPUSCH power, for example when the sPUSCH transmission may occur in a TTI (e.g., sTTI) for which the PH may be calculated. A type C PH may be calculated from or based on a sPUSCH power, for example when the sPUSCH transmission may occur in a TTI (e.g., sTTI) in which or for which the PH may be reported. A type C PH may be calculated from or based on an sPUSCH power, for example when the sPUSCH transmission may overlap an nTTI in which or for which the PH may be reported. A type C PH may include the effects of a nPUSCH transmission and/or sPUSCH transmission, for example, that may occur in or overlap with the TTI for which the PH may be calculated, on a maximum power tat may be used to determine the PH.

A type D PH may be a PH for an nPUSCH and/or an nPUCCH. A type D PH may be a type 2 PH where the PUSCH may be an nPUSCH and the PUCCH may be a nPUCCH. A type E PH may be a PH for an sPUSCH and/or an sPUCCH. A type D PH may be a type 2 PH where the PUSCH may be an sPUSCH and the PUCCH may be an sPUCCH. A type F PH may be a PH for an nPUSCH, an sPUSCH, an nPUCCH, and/or an sPUCCH. A type F PH may be calculated from or based on an nPUSCH power as described herein for one or more of PH types B, C, D. A type F PH may be calculated from or based on an sPUSCH power as described herein for one or more of PH types A, C, E. A type F PH may be calculated from or based on an nPUCCH power as described herein for PH types D. A type F PH may be calculated from or based on an sPUCCH power as described herein for PH type E. A type F PH may include the effects of a nPUSCH transmission, an sPUSCH transmission, an nPUCCH transmission and/or an sPUCCH transmission, for example, that may occur in or overlap with the TTI for which the PH may be calculated, on a maximum power that may be used to determine the PH.

An sTTI PH may be a PH of at least one of types: A, C, E, and/or F. An nTTI PH may be a PH of at least one of types: B, C, D, and/or F. A PHR may include one or more PH types, for example, for a serving cell, for example one or more of PH types 1, 2, A, B, C, D, E, and/or F. A PH may be a real PH or a virtual PH. A real PH may use or be based on real transmission parameters, for example, scheduling information. A virtual PH may use or be based on a reference format, for example, reference scheduling information.

A PH may be a real PH when a channel that may be used to determine the PH may be transmitted in the TTI for which the PH may be calculated. A PH may be a real PH when scheduling information for a channel that may be used to determine the PH may be available for the PH calculation, for example, for the TTI for which the PH may be calculated.

A PH may be a virtual PH when a channel that may be used to determine the PH may not be transmitted in the TTI for which the PH may be calculated. A PH may be a virtual PH when scheduling information for a channel that may be used to determine the PH may not be available for the PH calculation, for example, for the TTI for which the PH may be calculated.

For a PHR that may be reported in an nTTI: at least one of power, maximum power, and PH may be determined based on nTTI scheduling and available, for example, worst case available, overlapping sTTI scheduling; and/or the PHR may include an nTTI PH and a sTTI PH for one or more overlapping sTTIs.

As used herein the terms scheduling and scheduling information may be used interchangeably. Scheduling information may include at least one of: a resource grant or allocation that may include a number of RBs and/or a frequency location such as a frequency location for a set of RBs, a TBS or number of coded bits, a number of UCI or HARQ feedback bits, processing parameters such as a modulation and coding scheme (MCS), and the like. Scheduling information may be received, decoded, and/or determined prior to a transmission. Availability of scheduling information, for example, of a sTTI for an nTTI, may be a function of when the scheduling information may be received, decoded, and/or determined for example prior to a transmission, for example, the nTTI transmission.

Scheduling information may be for a channel such as a PUSCH or a PUCCH. Scheduling information may be a function of a type of bits, for example, UCI or data bits, that may be transmitted in a TTI or on a channel. Scheduling information for an UL transmission may be determined based on a DL transmission. For example, a number of HARQ feedback or UCI bits that may be transmitted may be determined based on a DCI that may provide a DL grant.

Calculation and/or determination of an nTTI PH and one or more associated values, for example, that may be used in the calculation and/or determination of the PH, may use scheduling information for the nTTI. An associated value may be at least one of a power or a maximum power.

For an nTTI of a serving cell, for example, a first serving cell, a WTRU may determine a power, for example, for a channel such as a physical channel of the serving cell, a maximum power, for example, for the serving cell, and/or a PH based on at least a scheduled transmission, for example, the parameters of a scheduled transmission such as a number of RBs for the scheduled transmission, for the serving cell nTTI. A scheduled transmission may be a PUSCH transmission or a PUCCH transmission. A scheduled transmission may be a transmission for which resources may be granted or allocated implicitly or explicitly. A PUCCH or sPUCCH transmission, for example, for transmission of HARQ feedback, may be considered a scheduled transmission.

A maximum power for a serving cell, for example, a first serving cell may be impacted by another serving cell, for example, a second serving cell, that may be an intra-band serving cell, for example, a contiguous intra-band serving cell. A WTRU may determine a maximum power based on at least a scheduled transmission for another serving cell, for example, a second serving cell, nTTI, for example, an intra-band serving cell nTTI, that may overlap the serving cell nTTI, for example fully or by at least a fixed or configured amount.

Calculation and/or determination of an nTTI PH and one or more associated values may use scheduling information for an overlapping sTTI, for example when the scheduling information may be available. For a serving cell, for example, a first serving cell, nTTI, a WTRU may determine a power, for example, for a channel such as a physical channel of the serving cell, a maximum power, for example, for the serving cell, and/or a PH based on a scheduled transmission for a sTTI of the serving cell (and/or another, for example, a second, serving cell) that may overlap with the serving cell nTTI, for example when the scheduling information for the sTTI may be available.

Scheduling information may be available or considered available when the WTRU may have the scheduling information for the sTTI, for example, at least an amount of time prior to the start of the nTTI that may be enough time to use the scheduling information.

The amount of time may be a number of sTTIs, for example, UL or DL sTTIs, a number of symbols, and/or a number of time samples. The amount of time may be fixed or configured. The amount of time may be WTRU-specific. The amount of time may be a function of a timing advance, for example, applied timing advance, and/or a receive-transmit (Rx-Tx) time difference, for example for the serving cell. An Rx-Tx time difference may be the time difference between a WTRU's receive timing and transmission timing.

In an example, WTRU Rx-Tx time difference may be defined as TUE_RX−TUE_TX. TUE_RX may be the WTRU received timing of downlink time unit (e.g., subframe or radio frame) #i, for example from the serving cell, that may be defined by the first detected path in time. TUE_TX may be the WTRU transmit timing of uplink time unit (e.g., subframe or radio frame) #i. The reference point for the WTRU Rx-Tx time difference measurement may be the WTRU antenna connector.

An nTTI PH may use one sTTI from a set of sTTIs. For an nTTI that may overlap a set of sTTIs, the calculation and/or determination, for example, of a power, a maximum power, and/or a PH, may use at least one or only one of the set of sTTIs.

The calculation and/or determination may, for example, use an sTTI from among a set of sTTIs where the sTTI may be at least one of: an sTTI for which the WTRU may have scheduling information (e.g., available scheduling information); an sTTI with the most scheduled RBs; an sTTI that may result in the largest maximum power reduction allowance, for example, maximum MPR and/or maximum additional MPR (A-MPR), for example for use in determining a maximum power, e.g., $P_{CMAX,c}$; an sTTI that may result in the largest maximum power reduction allowance that may be related to the placement of the scheduled resources, for example, near or not near band edge, for example for use in determining a maximum power, e.g., $P_{CMAX,c}$; and/or an sTTI that may result in a lowest maximum power, e.g., for a PH calculation that may be an nTTI PH calculation.

A WTRU may include at least one of the following in a PHR, for example a PHR that may be transmitted in an nTTI: a sTTI PH for an sTTI or a sTTI in a set of sTTIs that the WTRU may use in the determination of the power, maximum power, and/or PH for the nTTI transmission; and/or an indication of a sTTI which may be a sTTI among a set of sTTIs, for example that the WTRU may use to determine a power, maximum power, and/or PH that may be reported in the PHR.

Scheduling information availability may be a function of a TTI length, for example at least one of an sTTI length, for example, UL and/or DL sTTI length, and an nTTI length, for example, UL and/or DL nTTI length. Scheduling information availability may be a function the time between a TTI that schedules or causes a transmission and a TTI in which the transmission may be made.

Some scheduling information may not be available for a first TTI, for example, an sTTI, that may overlap with a second TTI, for example, an nTTI. In a non-limiting example, a WTRU may be configured with an nTTI for a first cell (cell 1) and an sTTI for a second cell (cell 2). An sTTI may overlap with one nTTI and an nTTI may overlap with M sTTIs. A WTRU may or may only receive scheduling information for N of the M sTTIs within enough time, for example, within a threshold amount of time, prior to the start of a nTTI to be able to use that information, for example for calculation and/or determination of power, maximum power, and/or PH where the calculation and/or determination may be for the nTTI.

For example, scheduling information may be received a number of TTIs prior to transmission. In a non-limiting example, the number may be 4. Referring to sTTI 3 in the example in FIG. 20, 7 sTTIs are overlapped with a nTTI. The scheduling for transmission in the fifth sTTI would be received in the first sTTI when scheduling information is received 4 sTTIs prior to transmission. The scheduling information for the fifth sTTI may be received after the start of the transmission of the nTTI and may not be available or usable, for example for a calculation and/or determination for the nTTI. In this example, N may be less than or equal to 4.

An sTTI PH may use sTTI scheduling. Calculation and/or determination of an sTTI PH and one or more associated values may use scheduling information for the sTTI. For a serving cell (e.g., a first serving cell) sTTI, a WTRU may determine a power (e.g., for a channel such as a physical channel of the serving cell), a maximum power (e.g., for the serving cell), and/or a PH based on a scheduled transmission (e.g., the parameters of a scheduled transmission such as a number of RBs for the scheduled transmission) for the serving cell sTTI.

A WTRU may determine a maximum power based on at least a scheduled transmission for another serving cell (e.g., a second serving cell) sTTI, for example, an intra-band serving cell sTTI, that may overlap the serving cell sTTI, for example fully or by at least a fixed or configured amount.

An sTTI PH may use nTTI scheduling. Calculation and/or determination of an sTTI PH and one or more associated values may use scheduling information for an overlapping nTTI, for example when the scheduling information may be available. For a sTTI that may be overlapped by one nTTI, scheduling information for the nTTI may or may always be available.

For a serving cell, for example, a first serving cell sTTI, a WTRU may determine a power, for example, for a channel such as a physical channel of the serving cell, a maximum power, for example, for the serving cell), and/or a PH based on a scheduled transmission for a nTTI of the serving cell (and/or another, e.g., a second, serving cell) that may overlap with the serving cell sTTI, for example when the scheduling information for the nTTI may be available. Scheduling information may be available or considered available when the WTRU may have the scheduling information for the nTTI, for example, at least an amount of time prior to the start of the sTTI that may be enough time to use the scheduling information.

A configuration may be provided, for example, by a base station. Configuration may be received and/or used, e.g., by a WTRU. A WTRU may be configured with and/or may use an nTTI and/or an sTTI, for example on the same or different serving cells. A WTRU may and/or may be configured to report PH in or for an nTTI, an nTTI only, and/or in or for a sTTI. A WTRU may report PH in or for a sTTI, for example when or only when configured to report PH in or for a sTTI.

Some exemplary PH Reporting examples are disclosed herein. In one example, a Cell1 nTTI with a trigger overlaps a Cell 2 sTTI.

In an example of PH reporting, a WTRU may be triggered for a PHR (e.g., a WTRU may determine that a PH may be triggered) in or for an nTTI, for example for a first cell (e.g., a first serving cell). The WTRU may have resources granted, allocated, and/or available for an nPUSCH, for example, for the nTTI, on the first cell. The grant or allocation may be for new data. The WTRU may determine an nTTI PH, for example for the first cell.

The WTRU may determine whether it may have at least one sTTI, for example on a second cell (e.g., a second serving cell) that may overlap with the nTTI. The WTRU may determine an sTTI PH (e.g., at least one or only one sTTI PH) for example when the WTRU may have (e.g., when the WTRU may determine that it may have) at least one overlapping sTTI on a second cell (e.g., a second serving cell). The WTRU may determine an sTTI PH, for example for the second cell.

The WTRU may send, transmit, include or report a determined nTTI PH and/or a determined sTTI PH, for example on the nPUSCH. The WTRU may send a MAC-CE that may include an nTTI PH and/or an sTTI PH, for example on the nPUSCH.

A reported PH may be real or virtual. A reported nTTI PH may, for example be a type B PH or a type C PH. A reported sTTI PH may, for example be a type A PH or a type C PH. For transmissions that may include a control channel, for example, nPUCCH and/or sPUCCH, one or more of types D, E, and/or F may be determined, reported and/or used. As used herein, the terms send, transmit, and report may be used interchangeably in examples and embodiments.

Figure 21:
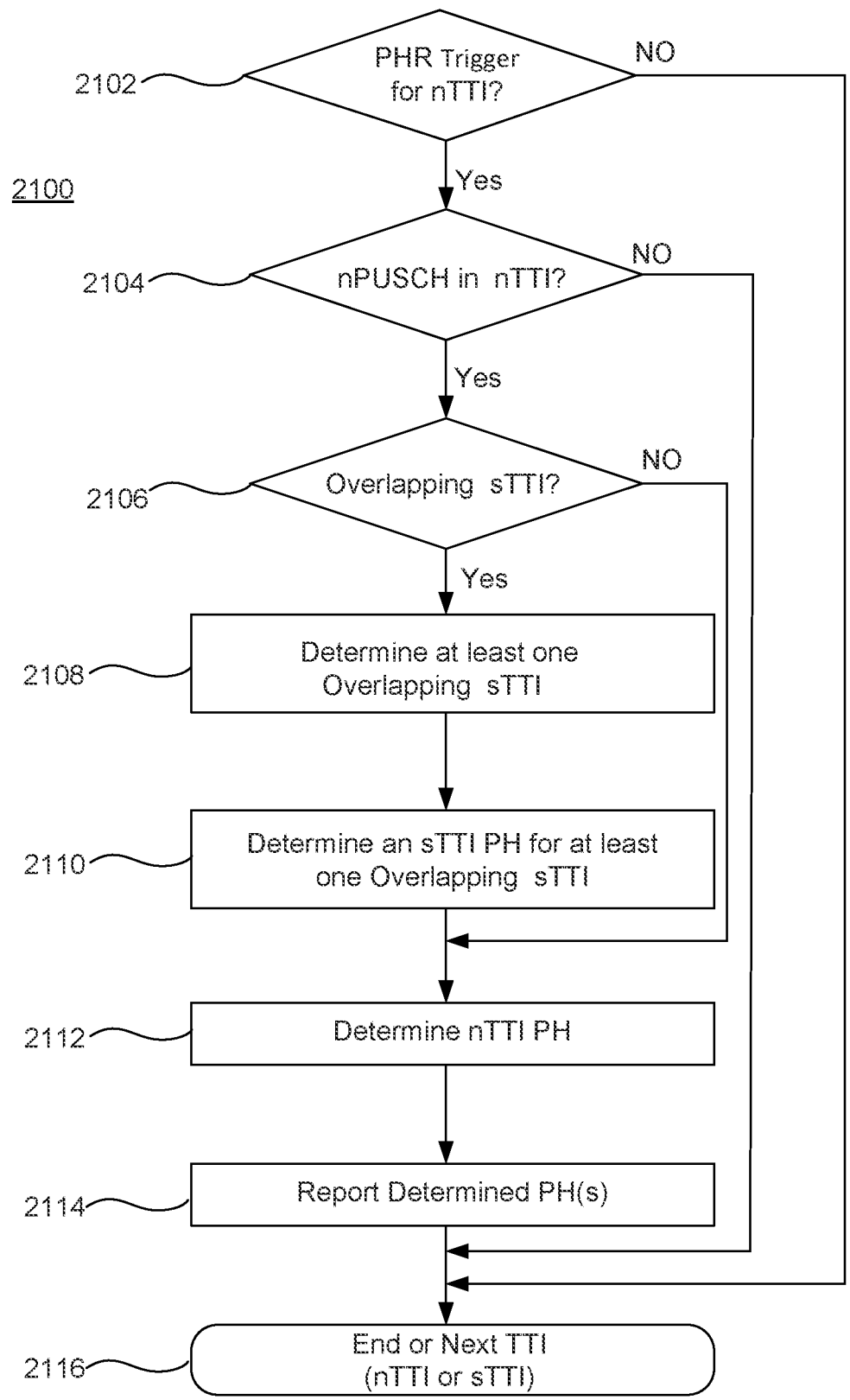
FIG. 21 is an example of power headroom (PH) reporting.

FIG. 21 is an example of PH reporting 2100. The steps shown may be performed in another order. In the example 2100, a WTRU may be triggered for a PHR 2102 (e.g., a WTRU may determine that a PHR may be triggered) in or for an nTTI, for example for a first cell (e.g., a first serving cell). The WTRU may determine whether it has resources granted, allocated, and/or available for an nPUSCH (e.g., for the nTTI), for example on the first cell 2104. The WTRU may further determine whether the nPUSCH resources may be used for PH transmission or reporting. If the WTRU determines that it has nPUSCH resources in or for the nTTI at 2104 that may be used for PH transmission or reporting, the WTRU may determine whether there is or whether it has an overlapping sTTI 2106, for example for a second cell (e.g., a second serving cell). If the WTRU determines there is or that it has an overlapping sTTI at 2106, the WTRU may determine at least one overlapping sTTI at 2108 and a sTTI PH for at least one determined overlapping sTTI at 2110. The WTRU may determine an nTTI PH at 2112 and may transmit or report the determined PH(s) at 2114. The PH reporting procedure may end and/or restart for the next TTI at 2116. If there is no PHR trigger for nTTI, the WTRU may not transmit a PH and the procedure may end or the WTRU may wait for the next TTI at 2116. If the WTRU determines there are no nPUSCH resources in the nTTI that may be used for transmitting or reporting PH in the nTTI at 2104, the procedure may end or the WTRU may wait for the next TTI at 2116. If the WTRU determines there is no overlapping sTTI or that it has no overlapping sTTI at 2106, the WTRU may determine an nTTI PH at 2112 and may proceed with steps 2114 and 2116.

In an example, a Cell1 nTTI with a trigger overlaps a Cell 2 sTTI. In an example of PH reporting, a WTRU may be triggered for a PHR (e.g., a WTRU may determine that a PH may be triggered) in or for an nTTI, for example for a first cell (e.g., a first serving cell). The WTRU may have resources granted, allocated, and/or available for an nPUSCH (e.g., for the nTTI) on the first cell. The grant or allocation may be for new data. The WTRU may determine the power for the nPUSCH.

The WTRU may or may also have scheduling information, a grant, and/or an allocation for a short or sTTI channel (e.g., a channel for an sTTI) on a second cell (e.g., a second serving cell). An sPUSCH is used as a non-limiting example of an sTTI channel. Another channel may be used such as an sPUCCH.

The sTTI channel, for example, sPUSCH, may overlap fully or at least partially with the nPUSCH. For example the resources (e.g., in time) for, and/or the transmission of, the sTTI channel may overlap with the resources (e.g., in time) for, and/or the transmission of, the nPUSCH. The sTTI may overlap (e.g., fully or at least partially) with the nTTI (e.g., the nTTI for which a PHR may be triggered). The WTRU may determine the sTTI channel (e.g., sPUSCH) power.

The WTRU may determine at least one maximum power. For example, the WTRU may determine a maximum power for the first cell and/or the second cell. The WTRU may determine a maximum power, e.g., $P_{CMAX,c}$ for the first cell and the second cell, for example when the first and second cells may be the same cell or when they may be intra-band, for example, contiguous intra-band, cells. The WTRU may determine a maximum power, e.g., $P_{CMAX,c}1$ for the first cell and a maximum power, e.g., $P_{CMAX,c}2$ for the second serving cell. $P_{CMAX,c}1$ and $P_{CMAX,c}2$ may be the same. $P_{CMAX,c}1$ and $P_{CMAX,c}2$ may be different, for example when the first and second cell may be different cells that may be inter-band and/or non-contiguous (e.g., non-contiguous intra-band) cells.

The WTRU may determine an nTTI PH (e.g., for the nPUSCH), for example for the first serving cell. The WTRU may determine an sTTI PH (e.g., for the sPUSCH), for example for the second serving cell.

An nTTI PH may be $P_{CMAX,c}$ or $P_{CMAX,c}1$ minus the determined nPUSCH power. An sTTI PH may be $P_{CMAX,c}$ or $P_{CMAX,c}2$ minus the determined sPUSCH power. An nTTI PH or sTTI PH may be determined based on the nPUSCH power and/or sPUSCH power.

The WTRU may send, transmit, include or report a determined nTTI PH and/or a determined sTTI PH, for example on the nPUSCH. The WTRU may send a MAC-CE that may include an nTTI PH and/or an sTTI PH, for example on the nPUSCH. The WTRU may include $P_{CMAX,c}$ in the PHR. The WTRU may include $P_{CMAX,c}1$ and/or $P_{CMAX,c}2$ in the PHR.

A reported nTTI PH may, for example be a type B PH or a type C PH. A reported sTTI PH may, for example be a type A PH or a type C PH. For transmissions that may include a control channel (e.g., nPUCCH and/or sPUCCH), one or more of types D, E, and/or F may be determined, reported and/or used.

Alternatively, the WTRU may send, transmit, include or report a determined nTTI PH and/or a determined sTTI PH, for example on an sPUSCH that may overlap with the nPUSCH.

In an example a Cell1 nTTI with a trigger overlaps M Cell 2 sTTIs. In another example of PH reporting, a WTRU may be triggered for a PHR (e.g., a WTRU may determine that a PH may be triggered) in or for an nTTI, for example for a first cell (e.g., a first serving cell). The WTRU may have resources granted, allocated, and/or available for an nPUSCH (e.g., for the nTTI) on the first cell. The grant or allocation may be for new data. The WTRU may determine the power for the nPUSCH.

M sTTIs, for example, on or for a second cell, may overlap, for example, fully or at least partially, with an nTTI, for example, on or for a first cell, for example the nTTI for which a PHR may be triggered.

The WTRU may, e.g., may also, have scheduling information, a grant, and/or an allocation for at least one sTTI channel in N or each of N sTTIs on a second cell (e.g., a second serving cell). The N sTTIs may be a subset of the M sTTIs that may overlap with the nTTI. The N sTTIs may overlap (e.g., fully or at least partially) with the nTTI. One or more (e.g., all) of the sTTI channels in the N sTTIs may overlap with the nPUSCH.

An overlap may be fully or at least partially overlapping. One or more of the sTTI channels may be an sPUSCH. One or more of the sTTI channels may be an sPUCCH. The WTRU may determine or choose at least one of the M sTTIs to use for at least PH reporting. The WTRU may determine at least one of the N sTTIs to use for at least PH reporting. A determined sTTI may be the kth sTTI among the M sTTIs.

A determined sTTI may, for example, be at least one of: an sTTI determined according to WTRU implementation; an sTTI for which the WTRU may have scheduling information for an sPUSCH; an sTTI for which the WTRU may have scheduling information for an sPUCCH; a first for example earliest in time sTTI among the N or M sTTIs for which the WTRU may have scheduling information for an sPUSCH or an sPUCCH; an sTTI among the N or M sTTIs for which a power reduction allowance (e.g., at least one of or a combination of MPR, A-MPR, P-MPR, etc.) may be the largest; an sTTI among the N or M sTTIs for which a maximum power may be the lowest; and/or a first (e.g., earliest in time) sTTI among the M sTTIs, for example regardless of whether the WTRU may have scheduling information (e.g., for a sPUSCH or sPUCCH) for the sTTI.

The WTRU may determine, for example by choosing, an sTTI channel, for example, sPUSCH, from among the sTTI channels in the N sTTIs to use for at least PH reporting. The determined sTTI channel may correspond to the kth sTTI among the M sTTIs.

The determined sTTI channel may, for example, be at least one of: an sTTI channel determined according to WTRU implementation; an sPUSCH or sPUCCH, for example an sPUSCH or sPUCCH for which the WTRU may have scheduling information; a first, for example, earliest in time, sPUSCH among the sPUSCHs for which the WTRU may have scheduling information; a first, for example, earliest in time, sPUCCH among the sPUCCHs for which the WTRU may have scheduling information; an sTTI channel among the sTTI channels for which a power reduction allowance (e.g., at least one of or a combination of MPR, A-MPR, P-MPR, etc.) may be the largest; and/or an sTTI channel among the sTTI channels for which a maximum power may be the lowest.

The WTRU may determine the power for a determined sTTI channel. The WTRU may determine the power for an sTTI channel in a determined sTTI. The WTRU may determine at least one maximum power. For example, the WTRU may determine a maximum power for the first cell and/or the second cell. The WTRU may determine an nTTI PH, for example, for the nPUSCH. The nTTI PH may be $P_{CMAX,c}$ or $P_{CMAX,c}1$ minus the determined nPUSCH power.

The WTRU may determine an sTTI PH, for example for a determined or chosen sTTI channel. The WTRU may determine an sTTI PH for a determined or chosen sTTI, for example based on the determined power for one or more sTTI channels in the determined or chosen sTTI.

The sTTI PH may be $P_{CMAX,c}$ or $P_{CMAX,c}2$ minus at least one determined sTTI channel power.

The WTRU may send, transmit, include or report a determined nTTI PH and/or a determined sTTI PH, for example on the nPUSCH. The WTRU may send a MAC-CE that may include a nTTI PH and/or an sTTI PH, for example on the nPUSCH. The WTRU may include $P_{CMAX,c}$ in the PHR. The WTRU may include $P_{CMAX,c}1$ and/or $P_{CMAX,c}2$ in the PHR.

Alternatively, the WTRU may send, transmit, include or report a determined nTTI PH and/or a determined sTTI PH, for example on an sPUSCH that may overlap with the nPUSCH.

The WTRU may include an indication in the PHR to indicate to which sTTI or sTTI channel (e.g., sPUSCH and/or sPUCCH) the sTTI PH may correspond. For example, the WTRU may include an indication that the sTTI PH may correspond to the kth sTTI among the M sTTIs that may overlap with the nTTI. For example, the WTRU may include the value of k or k−1.

A number of bits (B) may be used for the indication. The value of B may be fixed or configured. B may for example be 1, 2, or 3. B may be a function of the sTTI length and/or the nTTI length. For example, for an nTTI of 1 subframe or 14 symbols, B may be 1 for an sTTI of 1 timeslot or 7 symbols, B may be 1 or 2 for an sTTI of 4 symbols, and/or B may be 2 or 3 for an sTTI of 2 symbols.

Alternatively, the WTRU may determine an sTTI PH for at least one (e.g., each) of the M sTTIs that may overlap the nTTI. The determined sTTI PH may be real or virtual. The WTRU may send, transmit, include or report a determined nTTI PH and/or a determined sTTI PH (e.g., M sTTI PHs), for example on the nPUSCH (or sPUSCH that may overlap the nPUSCH).

In an example a Cell1 sTTI with a trigger overlaps a Cell 2 nTTI. In an example of PH reporting, a WTRU may be triggered for a PHR (e.g., a WTRU may determine that a PH may be triggered) in or for an sTTI, for example for a first cell (e.g., a first serving cell). The WTRU may have resources granted, allocated, and/or available for a sPUSCH (e.g., for the sTTI) on the first cell. The grant or allocation may be for new data. The WTRU may determine the power for the sPUSCH.

The WTRU may or may also, use and/or be configured for operation with an nTTI on a second cell. The sTTI may overlap fully or at least partially with the nTTI.

The WTRU may determine an sTTI PH, for example, for the sPUSCH. The WTRU may determine an nTTI PH, for example for the nTTI that may overlap the sTTI.

The WTRU may determine a real nTTI, for example when the sPUSCH may overlap with an nPUSCH for which resources may be granted or allocated. The WTRU may determine a virtual nTTI PH, for example when the sPUSCH may not overlap with an nPUSCH.

The WTRU may send, transmit, include or report a determined nTTI PH and/or a determined sTTI PH, for example, on the sPUSCH. The WTRU may send a MAC-CE that may include a nTTI PH and/or an sTTI PH, for example on the sPUSCH. The WTRU may include one or more maximum powers in the PHR, for example at least one of $P_{CMAX,c}$, $P_{CMAX,c}1$ and/or $P_{CMAX,c}2$.

Alternatively, the WTRU may send, transmit, include or report a determined nTTI PH and/or a determined sTTI PH on an nPUSCH, for example, when the PHR trigger may be prior to (e.g., in enough time prior to) the start of the nTTI.

Figure 22:
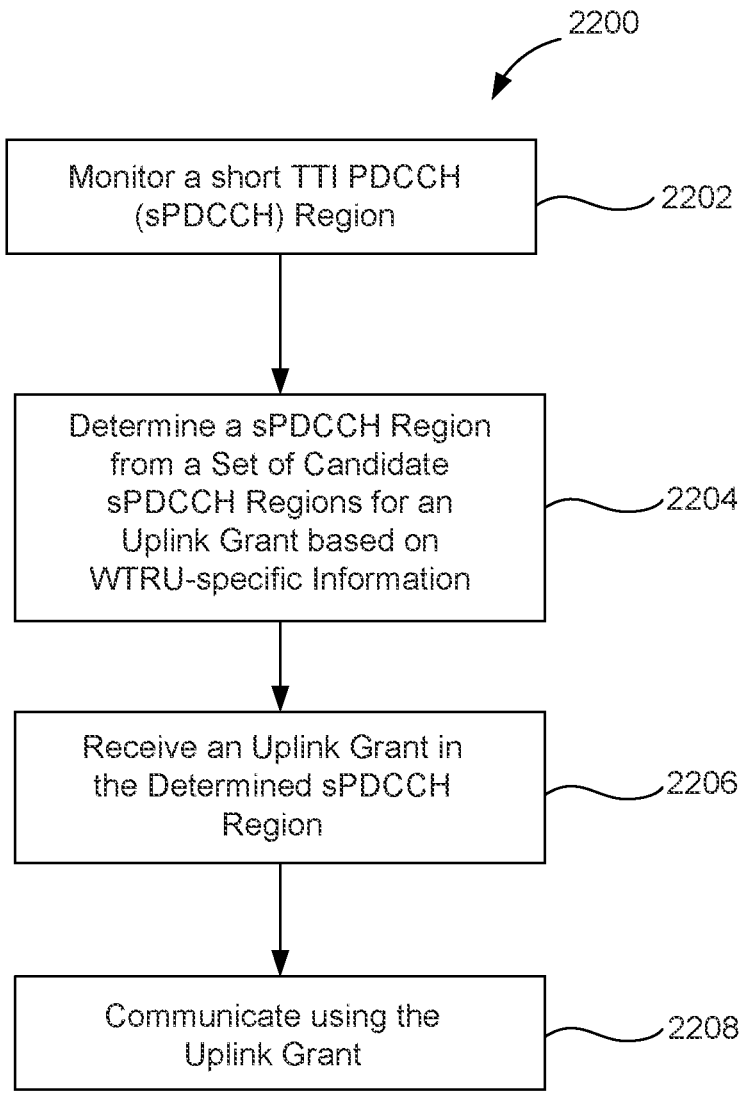
FIG. 22 is an example of sPDCCH region determination.

FIG. 22 is an example of sPDCCH region determination 2200. A WTRU may monitor a short TTI PDCCH (sPDCCH) region (2202). A WTRU may perform monitoring when a downlink sTTI length configured to be shorter than an uplink sTTI length. A WTRU may determine a sPDCCH region from a set of candidate sPDCCH regions for an uplink grant based on WTRU-specific parameters (2204). The WTRU-specific parameters may include a WTRU-ID. An uplink grant may be received by a WTRU in the determined sPDCCH region (2206). A WTRU may communicate in a network using the uplink grant (2208).

Although features and elements are described above in particular combinations, one of ordinary skill in the art will appreciate that each feature or element can be used alone or in any combination with the other features and elements. In addition, the methods described herein may be implemented in a computer program, software, or firmware incorporated in a computer-readable medium for execution by a computer or processor. Examples of computer-readable media include electronic signals (transmitted over wired or wireless connections) and computer-readable storage media. Examples of computer-readable storage media include, but are not limited to, a read only memory (ROM), a random access memory (RAM), a register, cache memory, semiconductor memory devices, magnetic media such as internal hard disks and removable disks, magneto-optical media, and optical media such as CD-ROM disks, and digital versatile disks (DVDs). A processor in association with software may be used to implement a radio frequency transceiver for use in a WTRU, UE, terminal, base station, RNC, or any host computer.

What is claimed is:

1. A wireless transmit/receive unit (WTRU) comprising:
a processor; and
a transceiver;
the processor and the transceiver configured to receive configuration information for reporting a power headroom (PH) associated with each of a plurality of cells, wherein a first cell of the plurality of cells uses first time intervals each having a first length and a second cell of the plurality of cells uses second time intervals each having a second length, and wherein the first length is at least two times the second length;

the transceiver configured to transmit, in one of the first time intervals, a first uplink transmission using a first carrier frequency, wherein the first carrier frequency is associated with the first cell; and the processor and the transceiver configured to transmit, in an earliest in time one of the second time intervals that is fully overlapped by the one of the first time intervals, based on the received configuration information, a report including information indicating a first PH corresponding to the one of the first time intervals and a second PH corresponding to the earliest in time one of the second time intervals that is fully overlapped by the one of the first time intervals.

2. The WTRU of claim 1, wherein the report is transmitted in a second uplink transmission using a second carrier frequency, and wherein the second carrier frequency is associated with the second cell.

3. The WTRU of claim 2, wherein the first length is 1 millisecond (ms) and the second length is 0.5 ms.

4. The WTRU of claim 1, wherein the first cell is associated with a first base station that uses a first radio access technology (RAT) and the second cell is associated with a second base station that uses a second RAT.

5. The WTRU of claim 1, wherein the report including information indicating the first PH corresponding to the one of the first time intervals and the second PH corresponding to the earliest in time one of the second time intervals is included in the first uplink transmission associated with the first cell.

6. The WTRU of claim 1, wherein the report including information indicating the first PH corresponding to the one of the first time intervals and the second PH corresponding to the earliest in time one of the second time intervals is a type 1 PH report.

7. The WTRU of claim 2, wherein the first PH corresponding to the one of the first time intervals and the second PH corresponding to the earliest in time one of the second time intervals are determined respectively based on a computed transmit power for the first uplink transmission and a computed transmit power for the second uplink transmission, and wherein the first uplink transmission and the second uplink transmission are transmitted on a physical uplink shared channel (PUSCH).

8. A method performed by a wireless transmit/receive unit (WTRU), the method comprising:

receiving configuration information for reporting a power headroom (PH) associated with each of a plurality of cells, wherein a first cell of the plurality of cells uses first time intervals each having a first length and a second cell of the plurality of cells uses second time intervals each having a second length, and wherein the first length is at least two times the second length;

transmitting, in one of the first time intervals, a first uplink transmission using a first carrier frequency, wherein the first carrier frequency is associated with the first cell; and transmitting, in an earliest one in time of the second time intervals that is fully overlapped by the one of the first time intervals, based on the received configuration information, a report including information indicating a first PH corresponding to the one of the first time intervals and a second PH corresponding to the earliest in time one of the second time intervals that is fully overlapped by the one of the first time intervals.

9. The method of claim 8, wherein the report is transmitted in a second uplink transmission using a second carrier frequency, and wherein the second carrier frequency is associated with a second cell.

10. The method of claim 9, wherein the first length is 1 millisecond (ms) and the second length is 0.5 ms.

11. The method of claim 8, wherein the first cell is associated with a first base station that uses a first radio access technology (RAT) and the second cell is associated with a second base station that uses a second RAT.

12. The method of claim 8, wherein the report including information indicating the first PH corresponding to the one of the first time intervals and the second PH corresponding to the earliest in time one of the second time intervals is included in the first uplink transmission associated with the first cell.

13. The method of claim 8, wherein the report including information indicating the first PH corresponding to the one of the first time intervals and the second PH corresponding to the earliest one in one of the second time intervals is a type 1 PH report.

14. The method of claim 9, wherein the first PH corresponding to the one of the first time intervals and the second PH corresponding to the earliest one in time of the second time intervals are determined respectively based on a computed transmit power for the first uplink transmission and a computed transmit power for the second uplink transmission, and wherein the first uplink transmission and the second uplink transmission are transmitted on a physical uplink shared channel (PUSCH).

* * * * *